United States Patent
Woo et al.

(10) Patent No.: US 11,170,768 B2
(45) Date of Patent: Nov. 9, 2021

(54) DEVICE FOR PERFORMING TASK CORRESPONDING TO USER UTTERANCE

(71) Applicant: Samsung Electronics Co., Ltd., Gyeonggi-do (KR)

(72) Inventors: Kyoung Gu Woo, Seoul (KR); Kyu Young Kim, Gyeonggi-do (KR); Hyun Jin Park, Gyeonggi-do (KR); Injong Rhee, Gyeonggi-do (KR); Woo Up Kwon, Seoul (KR); Dong Ho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/866,119

(22) Filed: Jan. 9, 2018

(65) Prior Publication Data

US 2018/0301150 A1 Oct. 18, 2018

(30) Foreign Application Priority Data

Apr. 17, 2017 (KR) .................. 10-2017-0049396
Jul. 17, 2017 (KR) .................. 10-2017-0090581

(51) Int. Cl.
*G06F 3/0484* (2013.01)
*G06F 3/0488* (2013.01)
(Continued)

(52) U.S. Cl.
CPC .......... *G10L 15/22* (2013.01); *G06F 3/04842* (2013.01); *G06F 3/167* (2013.01);
(Continued)

(58) Field of Classification Search
CPC . G10L 15/265; G10L 15/22; G10L 2015/223; G10L 15/1822
(Continued)

(56) References Cited

U.S. PATENT DOCUMENTS

| 8,370,342 B1 * | 2/2013 | Li ................... G06F 17/30905 707/708 |
| 8,626,511 B2 | 1/2014 | LeBeau et al. |

(Continued)

FOREIGN PATENT DOCUMENTS

EP    3 327 719    5/2018

OTHER PUBLICATIONS

European Search Report dated Aug. 13, 2018 issued in counterpart application No. 18167798.0-1210, 10 pages.

*Primary Examiner* — Daniel C Washburn
*Assistant Examiner* — Oluwadamilola M Ogunbiyi
(74) *Attorney, Agent, or Firm* — The Farrell Law Firm, P.C.

(57) ABSTRACT

An electronic device includes a touchscreen display, a microphone, at least one speaker, a processor and a memory which stores instructions that cause the processor to receive a user utterance including a request for performing a task with the electronic device, to transmit data associated with the user utterance to an external server, to receive a response from the external server including sample utterances representative of an intent of the user utterance and the sample utterances being selected by the external server based on the user utterance, to display the sample utterances on the touchscreen display, to receive a user input to select one of the sample utterances, and to perform the task by causing the electronic device to follow a sequence of states associated with the selected one of the sample utterances.

8 Claims, 42 Drawing Sheets

(51) Int. Cl.

| | | |
|---|---|---|
| *G06F 3/16* | (2006.01) | |
| *G10L 15/18* | (2013.01) | |
| *G10L 15/22* | (2006.01) | |
| *G10L 15/26* | (2006.01) | |
| *G10L 15/30* | (2013.01) | |

(52) U.S. Cl.
   CPC .............. *G10L 15/18* (2013.01); *G10L 15/26* (2013.01); *G10L 15/30* (2013.01); *G06F 3/0488* (2013.01); *G10L 15/1822* (2013.01); *G10L 2015/221* (2013.01); *G10L 2015/223* (2013.01); *G10L 2015/225* (2013.01)

(58) Field of Classification Search
   USPC ........................................................ 704/275
   See application file for complete search history.

(56) References Cited

U.S. PATENT DOCUMENTS

| | | | |
|---|---|---|---|
| 9,378,740 B1* | 6/2016 | Rosen | G10L 15/1822 |
| 9,645,575 B2 | 5/2017 | Watson | |
| 2003/0144843 A1* | 7/2003 | Belrose | H04N 1/00127 |
| | | | 704/270.1 |
| 2004/0122666 A1* | 6/2004 | Ahlenius | G10L 15/22 |
| | | | 704/231 |
| 2005/0172027 A1* | 8/2005 | Castellanos | H04L 41/5009 |
| | | | 709/229 |
| 2011/0184730 A1 | 7/2011 | LeBeau et al. | |
| 2011/0289080 A1* | 11/2011 | Murdock | G06F 17/30651 |
| | | | 707/728 |
| 2013/0275164 A1 | 10/2013 | Gruber et al. | |
| 2014/0310255 A1* | 10/2014 | Cardell | G06F 16/951 |
| | | | 707/706 |
| 2015/0134341 A1* | 5/2015 | Tamura | G06F 3/04842 |
| | | | 704/275 |
| 2015/0148919 A1 | 5/2015 | Watson | |
| 2015/0150280 A1 | 6/2015 | Cocchi et al. | |
| 2015/0162020 A1* | 6/2015 | Deshmukh | G10L 15/18 |
| | | | 704/235 |
| 2015/0199967 A1* | 7/2015 | Reddy | G10L 25/30 |
| | | | 704/249 |
| 2015/0205782 A1* | 7/2015 | Subramanya | H04L 51/08 |
| | | | 704/9 |
| 2015/0293597 A1* | 10/2015 | Mishra | G06F 1/163 |
| | | | 715/810 |
| 2015/0348554 A1 | 12/2015 | Orr et al. | |
| 2016/0155442 A1* | 6/2016 | Kannan | G06F 3/167 |
| | | | 704/275 |
| 2016/0203002 A1* | 7/2016 | Kannan | G06F 3/167 |
| | | | 715/708 |
| 2016/0225370 A1* | 8/2016 | Kannan | G10L 15/22 |
| 2017/0032782 A1* | 2/2017 | Imamura | G06F 3/16 |
| 2017/0102918 A1* | 4/2017 | Gazdzinski | G06Q 30/0251 |
| 2017/0140755 A1* | 5/2017 | Andreas | G10L 15/1822 |
| 2017/0235284 A1 | 8/2017 | Watson | |
| 2017/0287479 A1* | 10/2017 | Tamura | G06F 3/167 |
| 2018/0032514 A1* | 2/2018 | Venkataraman | G06F 16/48 |
| 2018/0150280 A1* | 5/2018 | Rhee | G06F 3/04817 |
| 2018/0167490 A1* | 6/2018 | Morton | H04L 67/34 |
| 2018/0173692 A1* | 6/2018 | Greenberg | G06F 3/04817 |
| 2018/0285070 A1* | 10/2018 | Yoon | G06F 3/167 |
| 2019/0147870 A1* | 5/2019 | Taki | G10L 25/84 |
| | | | 704/233 |
| 2020/0051554 A1* | 2/2020 | Kim | G10L 15/18 |

* cited by examiner

DEVICE FOR PERFORMING TASK CORRESPONDING TO USER UTTERANCE

PRIORITY

This application claims priority under 35 U.S.C. § 119(a) to Korean Patent Applications filed in the Korean Intellectual Property Office on Apr. 17, 2017 and assigned Serial Number 10-2017-0049396, and on Jul. 17, 2017 and assigned Serial Number 10-2017-0090581, the entire disclosures of which are incorporated herein by reference.

BACKGROUND

1. Field of the Disclosure

The present disclosure relates generally to an electronic device, and more particularly, to performing a task corresponding to user utterance.

2. Description of the Related Art

In addition to a conventional input scheme using a keyboard or a mouse, the latest electronic devices have supported voice input. For example, an electronic device such as a smartphone or a tablet PC may recognize the voice of a user input in a state where a speech recognition service is executed and may execute an action corresponding to a voice input or may provide the result found, depending on the voice input.

Speech recognition services are being developed based on processing a natural language. The processing of the natural language refers to a technology that grasps the intent of the user utterance and provides the user with a result suitable for the intent.

SUMMARY

Various embodiments of the present disclosure provide an electronic device that performs a task suitable for the intent of the user when an ambiguous user utterance is received.

In accordance with an aspect of the present disclosure, an electronic device includes a housing, a touchscreen display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, a processor positioned inside the housing and electrically connected with the touchscreen display, the microphone, the at least one speaker, and the wireless communication circuit, and a memory positioned inside the housing and electrically connected with the processor. The memory stores instructions that, when executed, cause the processor, in a first instance, to receive a first user utterance through the microphone, the first user utterance including a first request for performing a first task with the electronic device, to transmit first data associated with the first user utterance to an external server through the wireless communication circuit, to receive a first response from the external server through the wireless communication circuit, the first response including information, for performing the first task, about a first sequence of states of the electronic device, and to perform the first task by causing the electronic device to follow the first sequence of states, and in a second example, cause the processor to receive a second user utterance through the microphone, the second user utterance including a second request for performing a second task with the electronic device, to transmit second data associated with the second user utterance to the external server through the wireless communication circuit, to receive a second response from the external server through the wireless communication circuit, the second response including one or more sample utterances representative of an intent of the user utterance and the one or more sample utterances being selected by the external server based on the second user utterance, to display the one or more sample utterances on the touchscreen display, to receive a first user input for selecting one of the one or more sample utterances through the microphone or the touchscreen display, and to perform the second task by causing the electronic device to follow a second sequence of states associated with the selected one of the one or more sample utterances.

In accordance with an aspect of the present disclosure, an electronic device includes a housing, a touchscreen display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, a processor positioned inside the housing and electrically connected with the touchscreen display, the microphone, the at least one speaker, and the wireless communication circuit, and a memory positioned inside the housing and electrically connected with the processor. The memory stores instructions that, when executed, cause the processor to receive a user utterance through the microphone, the user utterance including a request for performing a task with the electronic device, to transmit data associated with the user utterance to an external server through the wireless communication circuit, to receive a response from the external server through the wireless communication circuit, the response including a plurality of sample utterances and the plurality of sample utterances includes a first sample utterance corresponding to a first path rule and a second sample utterance corresponding to a second path rule, and the first path rule and the second path rule being generated by the external server based on the data associated with the user utterance, to display the plurality of sample utterances on the touchscreen display, to receive a first user input for selecting one of the plurality of sample utterances through the microphone or the touchscreen display, and to perform the task by causing the electronic device to follow a sequence of states associated with the selected one of the plurality of sample utterances.

In accordance with an aspect of the present disclosure, a computer-readable storage medium storing instructions, when executed by a processor of an electronic device, cause the electronic device to receive a user utterance, the user utterance including a request for performing a task with the electronic device, to transmit data associated with the user utterance to an external server, to receive a response from the external server, the response including one or more sample utterances representative of an intent of the user utterance and the one or more sample utterances are selected by the external server based on the user utterance, to display the one or more sample utterances, to receive a first user input for selecting one of the one or more sample utterances, and to perform the task by causing the electronic device to follow a sequence of states associated with the selected one of the one or more sample utterances.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar elements may be marked by the same or similar reference numerals.

DETAILED DESCRIPTION

Figure 1:
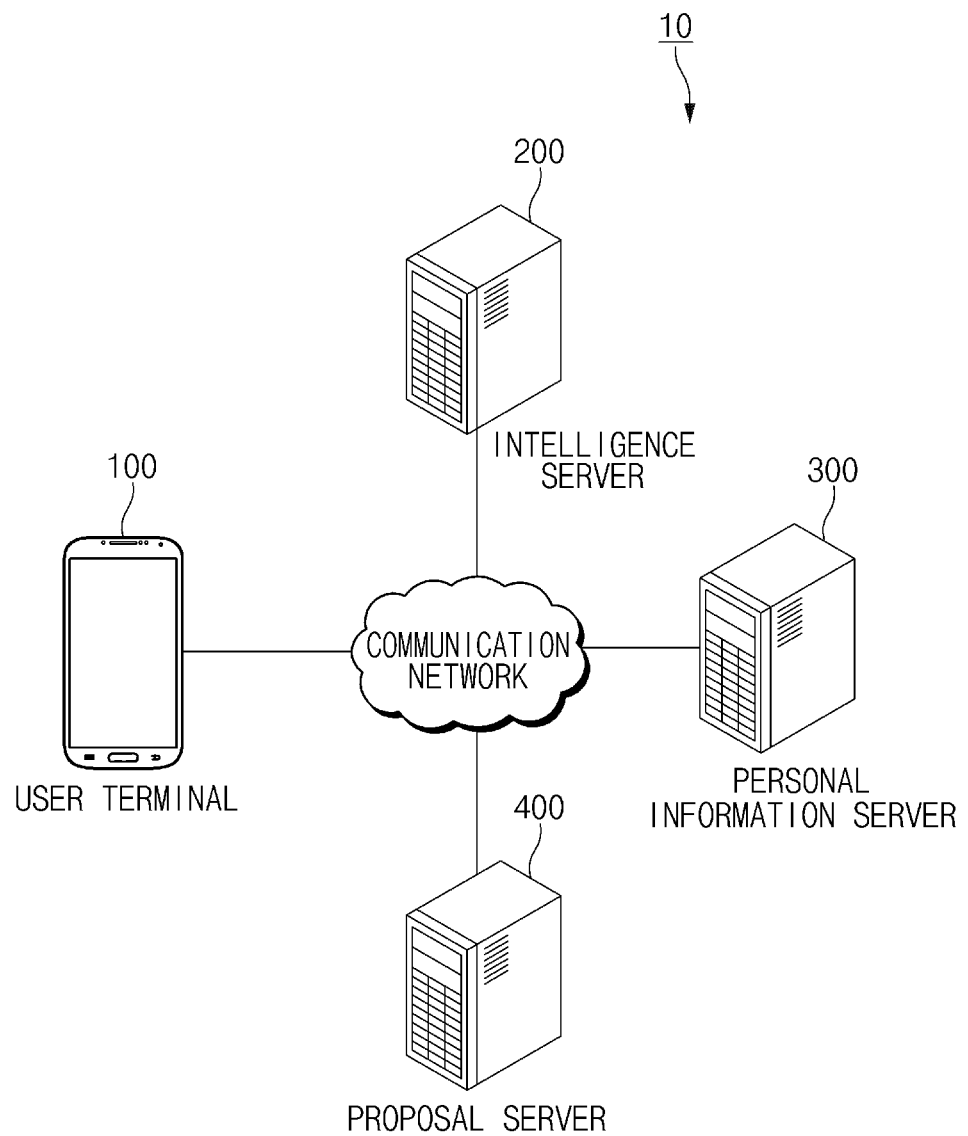
FIG. 1 illustrates an integrated intelligent system, according to embodiments of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Various embodiments of the present disclosure and terms used herein are not intended to limit the technologies described in the present disclosure to specific embodiments, and it should be understood that the embodiments and the terms include modifications, equivalents, and/or alternatives on the corresponding embodiments described herein. With regard to the description of the drawings, similar elements may be marked by similar reference numerals. The terms of a singular form may include plural forms unless otherwise specified. In the disclosure, the expressions "A or B", "at least one of A and/or B", "A, B, or C", or "at least one of A, B, and/or C", may include any and all combinations of one or more of the associated listed items. Expressions such as "first", or "second", may express their elements regardless of their priority or importance and may be used to distinguish one element from another element. However, the present disclosure is so not limited. When an element is referred to as being "(operatively or communicatively) coupled with/to" or "connected to" another element, it may be directly coupled with/to or connected to the other element, or an intervening element may be present.

The expressions "adapted to" or "configured to" used herein may be interchangeably used with the expressions "suitable for", "having, the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor, such as an embedded processor, for performing corresponding operations or a generic-purpose processor, such as a central processing unit (CPU) or an application processor (AP), which performs corresponding operations by executing one or more software programs which are stored in a memory device, such as the memory 2830.

FIG. 1 illustrates an integrated intelligent system, according to embodiments of the present disclosure.

An integrated intelligent system 10 may include a user terminal 100, an intelligence server 200, a personal information server 300, or a proposal server 400.

The user terminal 100 may provide a service necessary for a user through an application program (app), such as an alarm app, a message app, or a picture (gallery) app, stored in the user terminal 100. The user terminal 100 may execute and operate another app through an intelligence or speech recognition app stored in the user terminal 100. A user input for launching and operating the other app through the intelligence app of the user terminal 100 may be received. The user input may be received through a physical button, a touch pad, a voice input, or a remote input. Various types of terminals or electronic devices, which are connected to the Internet, such as a mobile phone, a smartphone, personal digital assistant (PDA), or a notebook computer, may correspond to the user terminal 100.

The user terminal 100 may receive user utterance as a user input and may generate an instruction for operating an app based on the user utterance. As such, the user terminal 100 may operate the app by using the instruction.

The intelligence server 200 may receive a voice input of a user from the user terminal 100 over a communication network and may change the voice input to text data. The intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, select an app depending on the path rule, and execute an action included in the path rule in the selected app.

The user terminal 100 may execute the action and display a screen corresponding to a state of the user terminal 100 in a display. In another example, the user terminal 100 may execute the action and may not display the result obtained by executing the action in the display. For example, the user terminal 100 may execute a plurality of actions and may display only the result of a part of the plurality of actions in the display. Or, the user terminal 100 may display only the result, which is obtained by executing the last action, in the display. Furthermore, the user terminal 100 may receive the user input to display the result obtained by executing the action in the display.

The personal information server 300 may include a database in which user information is stored and may receive the user information, such as context information or information about execution of an app, from the user terminal 100 and may store the user information in the database. The intelligence server 200 may be used to receive the user information from the personal information server 300 over the communication network and to generate a path rule associated with the user input. The user terminal 100 may receive the user information from the personal information server 300 over the communication network, and may use the user information as information for managing the database.

The proposal server 400 may include a database for storing information about a function in a terminal, introduction of an application, or a function to be provided. The proposal server 400 may include a database associated with a function that a user utilizes by receiving the user information of the user terminal 100 from the personal information server 300. The user terminal 100 may receive information about the function to be provided from the proposal server 400 over the communication network and may provide the information to the user.

Figure 2:
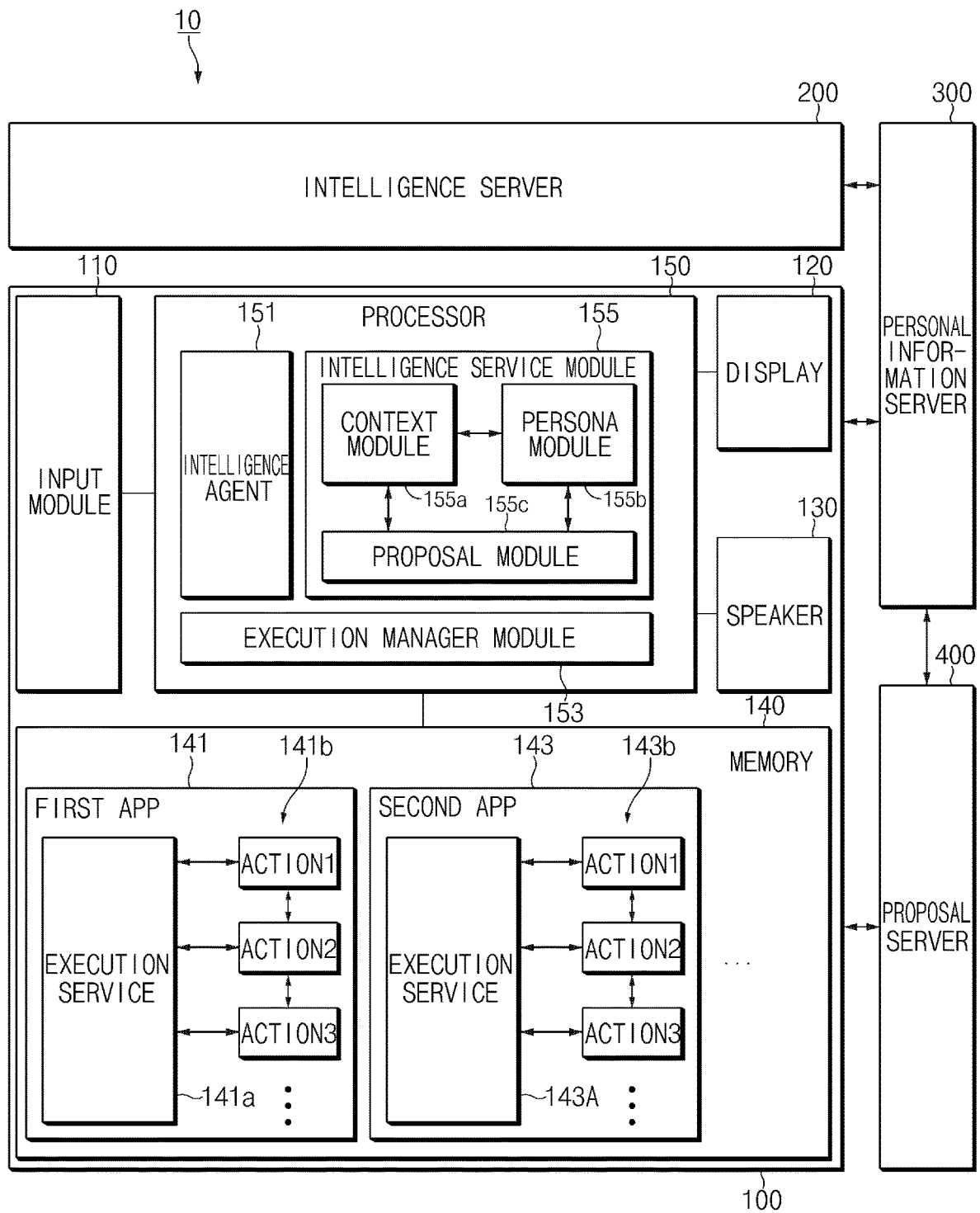
FIG. 2 is a block diagram of a user terminal of an integrated intelligent system, according to an embodiment of the present disclosure.

FIG. 2 is a block diagram of a user terminal of an integrated intelligent system, according to an embodiment of the present disclosure.

The user terminal 100 may include an input module 110, a display 120, a speaker 130, a memory 140, or a processor 150. Elements of the user terminal 100 may be seated in a housing of the user terminal 100, or may be positioned on the housing.

The input module 110 may receive a user input from a user from the connected external device, such as a keyboard or a headset. The input module 110 may include a touch screen, such as a touch screen display, coupled to the display 120, or may include a hardware key, or a physical key, placed in the user terminal 100, or the housing of the user terminal 100.

According to an embodiment of the present disclosure, the input module 110 may include a microphone 111 capable of receiving user utterance as a voice signal. The input module 110 may include a speech input system and may receive the utterance of the user as a voice signal through the speech input system.

The display 120 may display an image, a video, and/or an execution screen of an application, such as a graphic user interface (GUI) of an app.

The speaker 130 may output a voice signal generated in the user terminal 100 to the outside.

The user terminal 100 may further include a wireless communication circuit that supports various communications, may establish a communication channel between the user terminal 100 and the intelligence server 200, and may support the execution of wireless communication through the established communication channel.

The memory 140 may store a plurality of apps 141 and 143. The plurality of apps 141 and 143 stored in the memory 140 may be selected, launched, and executed depending on the user input.

The memory 140 may include a database capable of storing information necessary to recognize the user input, and may include a log database capable of storing log information. The memory 140 may include a persona database capable of storing user information.

The memory 140 may store the plurality of apps 141 and 143, which may be loaded by an execution manager module 153 of the processor 150 to operate. The plurality of apps 141 and 143 may include execution services 141a and 143a performing a function, or a plurality of actions (or unit actions) 141b and 143b. The execution services 141a and 143a may be generated by the execution manager module 153 of the processor 150 and may execute the plurality of actions 141b and 143b.

When the actions 141b and 143b of the apps 141 and 143 are executed, an execution state screen according to the execution of the actions 141b and 143b may be displayed in the display 120. The execution state screen may be a screen in a state where the actions 141b and 143b are completed, or the execution state screen may be a screen in a state where the execution of the actions 141b and 143b is in partial landing, such as in the case where a parameter necessary for the actions 141b and 143b is not input.

The execution services 141a and 143a may execute the actions 141b and 143b depending on a path rule. The execution services 141a and 143a may be activated by the execution manager module 153, may receive an execution request from the execution manager module 153 depending on the path rule, and may execute the actions 141b and 143b of the apps 141 and 143 depending on the execution request. If the execution of the actions 141b and 143b is completed, the execution services 141a and 143a may transmit completion information to the execution manager module 153.

In the case where the plurality of the actions 141b and 143b are respectively executed in the apps 141 and 143, the plurality of the actions 141b and 143b may be sequentially executed. If the execution of one action (action 1) is completed, the execution services 141a and 143a may open the next action (action 2) and transmit completion information to the execution manager module 153 Opening an arbitrary action, such as action 1 and action 2, is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141b and 143b to an execution service, such as action 2. In the case where the plurality of apps 141 and 143 are executed, the plurality of apps 141 and 143 may be sequentially executed. For example, if receiving the completion information after the execution of the last action of the first app 141, the execution manager module 153 may transmit the execution request of the first action of the second app 143 to the execution service 143a.

In the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

The memory 140 may store an intelligence app, such as a speech recognition app, operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input, such as an input through a hardware key, an input through a touch screen, or a specific voice input, received through the input module 110.

The processor 150 may control overall actions of the user terminal 100. For example, the processor 150, may control the input module 110 to receive the user input, may control the display 120 to display an image, may control the speaker 130 to output the voice signal, and may control the memory 140 to read or store necessary information.

The processor 150 may include the intelligence agent 151, the execution manager module 153, or an intelligence service module 155. The processor 150 may drive the intelligence agent 151, the execution manager module 153, or the intelligence service module 155 by executing instructions stored in the memory 140. The action executed by the intelligence agent 151, the execution manager module 153, or the intelligence service module 155 is an action executed by the processor 150.

The intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. The intelligence service module 155 may manage information of the user and may use the information of the user to process the user input.

The intelligence agent 151 may transmit and process the user input received through the input module 110 to the intelligence server 200.

Before transmitting the user input to the intelligence server 200, the intelligence agent 151 may pre-process the user input. To pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. The intelligence agent 151 may include all the pre-processing elements for performance. In another embodiment, the intelligence agent 151 may include a part of the pre-processing elements to operate at low power.

The intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. The wake up recognition module of the intelligence agent 151 may be implemented with a low-power processor, such as a processor included in an audio codec. The intelligence agent 151 may be activated depending on the user input entered through a hardware key. In the case where the intelligence agent 151 is activated, an intelligence app, such as a speech recognition app, operating in conjunction with the intelligence agent 151 may be executed.

The intelligence agent 151 may include a speech recognition module for performing the user input. The speech recognition module may recognize the user input for executing an action in an app and may recognize a limited user (voice) input, such as utterance including a "click" for executing a capturing action when a camera app is being executed, for executing an action such as the wake up instruction in the apps 141 and 143. For example, the speech recognition module for recognizing a user input while assisting the intelligence server 200 may recognize and rapidly process a user instruction in the user terminal 100. According to an embodiment, the speech recognition module for executing the user input of the intelligence agent 151 may be implemented in an app processor.

The speech recognition module, including a wake up module, of the intelligence agent 151 may recognize the user input by using an algorithm for recognizing a voice. The algorithm for recognizing the voice may be at least one of a hidden Markov model (HMM) algorithm, an artificial neural network (ANN) algorithm, or a dynamic time warping (DTW) algorithm.

The intelligence agent 151 may change the voice input of the user to text data and may transmit the voice of the user to the intelligence server 200 to receive the changed text data. As such, the intelligence agent 151 may display the text data in the display 120.

The intelligence agent 151 may receive a path rule from the intelligence server 200 and may transmit the path rule to the execution manager module 153.

The intelligence agent 151 may transmit the execution result log according to the path rule received from the intelligence server 200 to the intelligence service module 155, and the transmitted execution result log may be accumulated and managed in preference information of the user of a persona module 155b.

The execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

The execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

The execution manager module 153 may manage execution states of the actions 141b and 143b of the apps 141 and 143. For example, the execution manager module 153 may receive information about the execution states of the actions 141b and 143b from the apps 141 and 143, and in the case where the execution states of the actions 141b and 143b are in partial landing, such as in the case where a parameter necessary for the actions 141b and 143b are not input, the execution manager module 153 may transmit information about the partial landing to the intelligence agent 151. The intelligence agent 151 may make a request for an input of necessary information, such as parameter information, to the user by using the received information. In the case where the execution state of the actions 141b and 143b are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141b and 143b to a new parameter by using the received parameter information.

The execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

The execution manager module 153 may receive a plurality of path rules and may select a plurality of path rules based on the utterance of the user. In the case where the user utterance specifies the app 141 executing a part of the action 141b but does not specify the app 143 executing any other action 143b, the execution manager module 153 may receive a plurality of different path rules in which the same app 141, such as a gallery app, executing the part of the action 141b is executed and in which different apps 143, such as a message app or a Telegram app, executing the other action 143b. For example, the execution manager module 153 may execute the same actions 141b and 143b, such as the same successive actions 141b and 143b, of the plurality of path rules. In the case where the execution manager module 153 executes the same action, the execution manager module 153 may display a state screen for selecting the different apps 141 and 143 included in the plurality of path rules in the display 120.

The intelligence service module 155 may include a context module 155a, a persona module 155b, or a proposal module 155c.

The context module 155a may collect current states of the apps 141 and 143 from the apps 141 and 143, and may receive context information indicating the current states of the apps 141 and 143 to collect the current states of the apps 141 and 143.

The persona module 155*b* may manage personal information of the user utilizing the user terminal 100, and may collect the usage information and the execution result of the user terminal 100 to manage personal information of the user.

The proposal module 155*c* may predict the intent of the user to recommend an instruction to the user, and may recommend an instruction to the user in consideration of the current state, such as a time, a place, a situation, or an app of the user.

Figure 3:
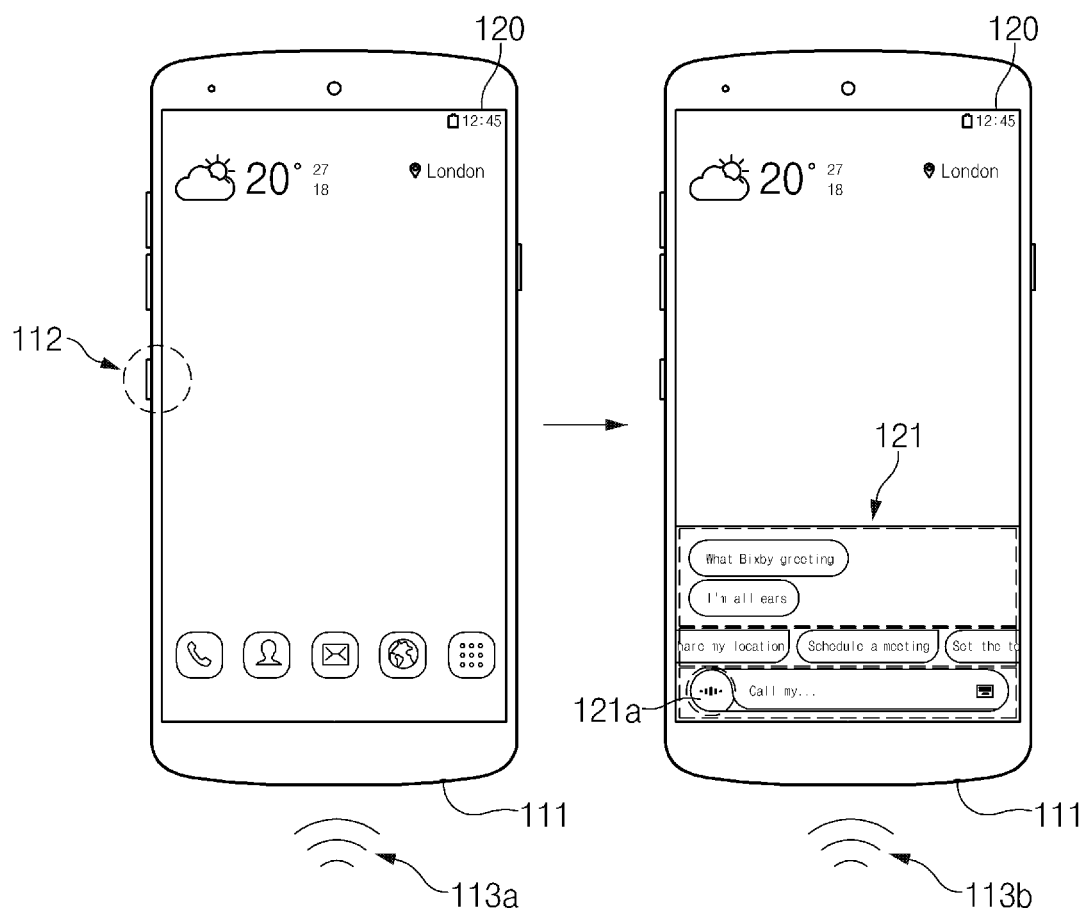
FIG. 3 illustrates that an intelligence app of a user terminal is executed, according to an embodiment of the present disclosure.

FIG. 3 illustrates that an intelligence app of a user terminal is executed, according to an embodiment of the present disclosure.

User terminal 100 receives a user input to execute an intelligence app, such as a speech recognition app, operating in conjunction with the intelligence agent 151.

The user terminal 100 may execute the intelligence app for recognizing a voice through a hardware key 112. In the case where the user terminal 100 receives the user input through the hardware key 112, the user terminal 100 may display a UI 121 of the intelligence app in the display 120. A user may touch a speech recognition button 121*a* of the UI 121 of the intelligence app for the purpose of entering a voice 113*b* in a state where the UI 121 of the intelligence app is displayed in the display 120. Or, while continuously pressing the hardware key 112 to enter the voice 113*b*, the user may enter the voice 113*b*.

The user terminal 100 may execute the intelligence app for recognizing a voice through the microphone 111. In the case where a specified voice, such as wake up, is entered 113*a* through the microphone 111, the user terminal 100 may display the UI 121 of the intelligence app in the display 120.

Figure 4:
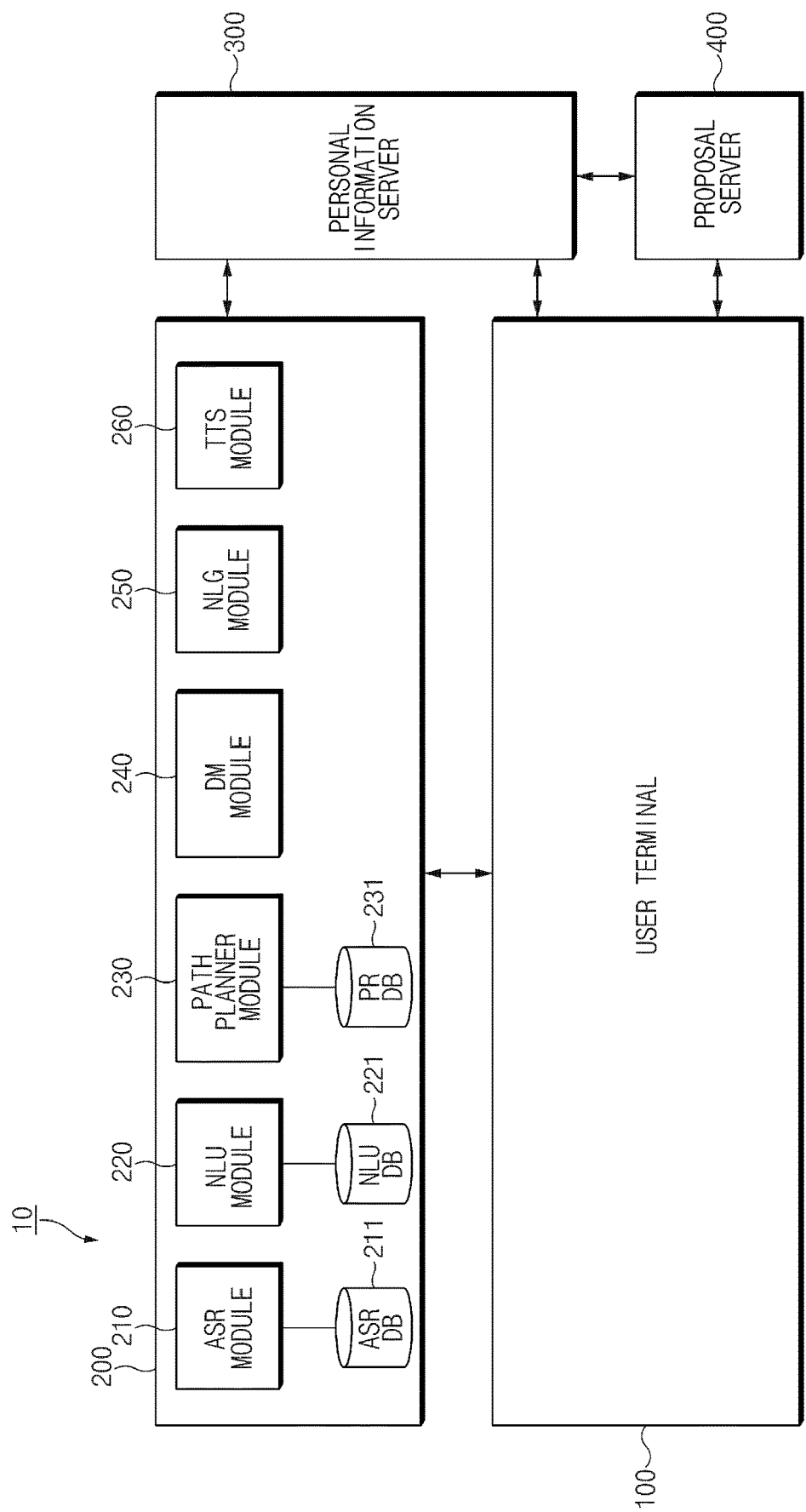
FIG. 4 is a block diagram of an intelligence server of an integrated intelligent system, according to an embodiment of the present disclosure.

FIG. 4 is a block diagram of an intelligence server of an integrated intelligent system, according to an embodiment of the present disclosure.

The intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, the ASR module 210 may change the user input received from the user terminal 100 to text data.

The ASR module 210 may include an utterance recognition module that includes an acoustic model and a language model. The acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

The NLU module 220 may grasp user intent by performing syntactic analysis or semantic analysis that divides the user input into syntactic units, such as words, phrases, or morphemes, and determine which syntactic elements the divided units have. The semantic analysis may be performed by using semantic matching, rule matching, or formula matching. As such, the NLU module 220 may obtain a domain, intent, or parameter, or slot, necessary for the user input to express the intent.

The NLU module 220 may determine the intent of the user and parameter by using a matching rule that is divided into a domain, intent, and parameter, or slot, necessary to grasp the intent. The domain, such as an alarm, may include a plurality of intents, such as alarm settings and alarm cancellation, and one intent may include a plurality of parameters, such as a time, the number of iterations, and an alarm sound. The plurality of rules may include one or more necessary parameters. The matching rule may be stored in an NLU database (NLU DB) 221.

The NLU module 220 may grasp the meaning of words extracted from a user input by using linguistic features, such as grammatical elements, including morphemes and phrases, and may match the meaning of the grasped words to the domain and intent to determine user intent. The NLU module 220 may calculate how many words extracted from the user input is included in each of the domain and the intent, for the purpose of determining the user intent. The NLU module 220 may determine a parameter of the user input by using the words that are the basis for grasping the intent, may determine the user intent by using the NLU DB 221 storing the linguistic features for grasping the intent of the user input, or may determine the user intent by using a personal language model (PLM). For example, the NLU module 220 may determine the user intent by using the personalized information, such as a contact list or a music list. The PLM may be stored in the NLU DB 221, and the ASR module 210 as well as the NLU module 220 may recognize the voice of the user with reference to the PLM stored in the NLU DB 221.

The NLU module 220 may generate a path rule based on the intent of the user input and the parameter, may select an app to be executed, based on the intent of the user input, may determine an action to be executed, in the selected app, and may determine the parameter corresponding to the determined action to generate the path rule. According to an embodiment, the path rule generated by the NLU module 220 may include information about the app to be executed, the action to be executed in the app, and a parameter necessary to execute the action.

The NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

The NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model, for the purpose of generating the path rule. The generated path rule may be stored in a path rule database (PR DB) 231 through the path planner module 230 and may be added to a path rule set of the PR DB 231.

The NLU module 220 may select at least one path rule of the generated plurality of path rules. For example, the NLU module 220 may select an optimal path rule of the plurality of path rules. In the case where only a part of action is specified based on the user utterance, the NLU module 220 may select a plurality of path rules and may determine one path rule of the plurality of path rules depending on an additional input of the user.

The NLU module 220 may transmit the path rule to the user terminal 100 in response to a request for the user input. For example, the NLU module 220 may transmit one path rule corresponding to the user input to the user terminal 100, or the NLU module 220 may transmit the plurality of path rules corresponding to the user input to the user terminal 100. In the case where only a part of action is specified based on the user utterance, the plurality of path rules may be generated by the NLU module 220.

According to an embodiment of the present disclosure, the path planner module 230 may select at least one path rule of the plurality of path rules.

The path planner module 230 may transmit a path rule set including the plurality of path rules to the NLU module 220. The plurality of path rules may be stored in the PR DB 231 connected to the path planner module 230 in the table form. The path planner module 230 may transmit a path rule set corresponding to information, such as OS information or app information, of the user terminal 100, which is received from the intelligence agent 151, to the NLU module 220. A table stored in the PR DB 231 may be stored for each domain or for each version of the domain.

The path planner module 230 may select one path rule or the plurality of path rules from the path rule set to transmit the selected one path rule or the selected plurality of path rules to the NLU module 220. The path planner module 230 may match the user intent and the parameter to the path rule set corresponding to the user terminal 100 to select one path rule or a plurality of path rules and may transmit the selected one path rule or the selected plurality of path rules to the NLU module 220.

The path planner module 230 may generate the one path rule or the plurality of path rules by using the user intent and the parameter. The path planner module 230 may determine the app to be executed and the action to be executed in the app based on the user intent and the parameter for the purpose of generating the one path rule or the plurality of path rules. The path planner module 230 may store the generated path rule in the PR DB 231.

The path planner module 230 may store the path rule generated by the NLU module 220 in the PR DB 231, and the generated path rule may be added to the path rule set stored in the PR DB 231.

The table stored in the PR DB 231 may include a plurality of path rules or a plurality of path rule sets, which may reflect the kind, version, type, or characteristic of a device performing each path rule.

The DM module 240 may determine whether the user intent grasped by the NLU module 220 is clear, based on whether the information of a parameter is sufficient, and whether the parameter grasped by the NLU module 220 is sufficient to perform a task. In the case where the user intent is not clear, the DM module 240 may perform a feedback for making a request for necessary information to the user about the parameter for grasping the user intent.

The DM module 240 may include a content provider module. In the case where the content provider module executes an action based on the intent and the parameter grasped by the NLU module 220, the content provider module may generate the result obtained by performing a task corresponding to the user input. The DM module 240 may transmit the result generated by the content provider module as the response to the user input to the user terminal 100.

The NLG module 250 may change specified information to a text form of a natural language utterance. The specified information may be information about an additional input, information for guiding the completion of an action corresponding to the user input, or information for guiding the additional input of the user, such as feedback information about the user input. The information changed to the text form may be displayed in the display 120 after being transmitted to the user terminal 100 or may be changed to a voice form after being transmitted to the TTS module 260.

The TTS module 260 may change information of the text form to information of a voice form. The TTS module 260 may receive the information of the text form from the NLG module 250, change the information of the text form to the information of a voice form, and transmit the information of the voice form to the user terminal 100. The user terminal 100 may output the information of the voice form to the speaker 130

The NLU module 220, the path planner module 230, and the DM module 240 may be implemented with one module, may determine the user intent and the parameter, and may generate a response, such as a path rule, corresponding to the determined user intent and parameter. As such, the generated response may be transmitted to the user terminal 100.

Figure 5:
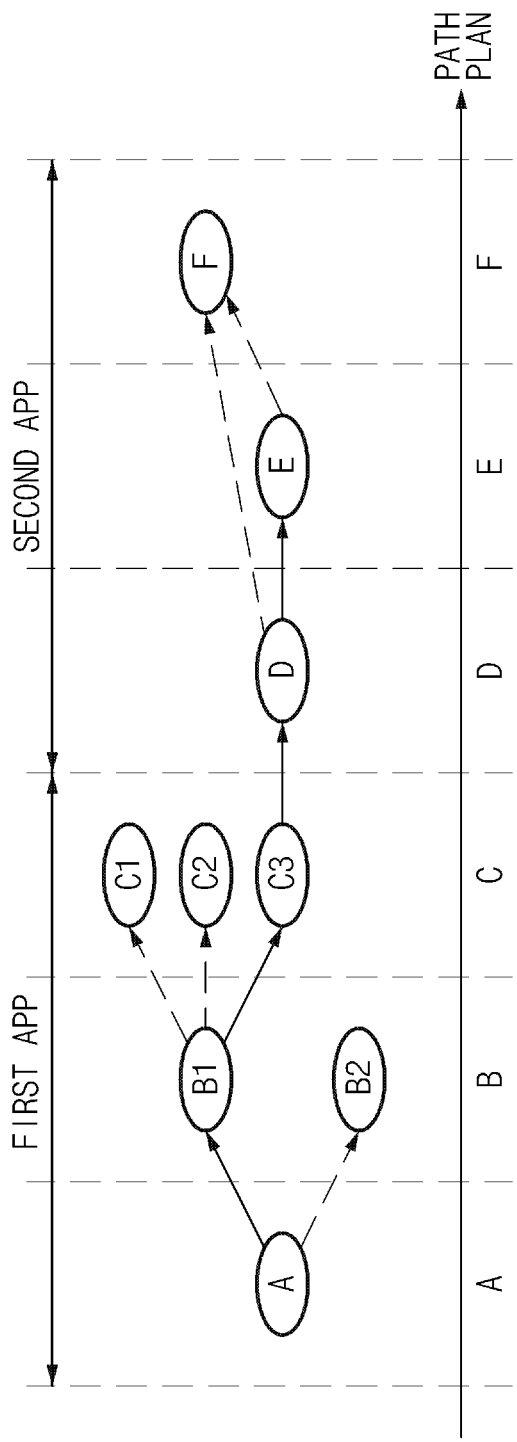
FIG. 5 illustrates a path rule generating method of a natural language understanding module (NLU), according to an embodiment of the present disclosure.

FIG. 5 is a diagram illustrating a path rule generating method of an NLU module, according to an embodiment of the present disclosure.

According to an embodiment, the NLU module 220 may divide the function of an app into unit actions, such as A to F, and may store the divided unit actions in the PR DB 231 The NLU module 220 may store a path rule set, which includes a plurality of path rules A-B1-C1, A-B1-C2, A-B1-C3-D-F, and A-B1-C3-D-E-F divided into unit actions, in the PR DB 231.

The PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. The plurality of path rules implemented in a form of ontology or a graph model may be stored in the PR DB 231.

The NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

In the case where there is no path rule completely matched to the user input, the NLU module 220 may transmit a plurality of rules to the user terminal 100. For example, the NLU module 220 may select a path rule, such as A-B1, partly corresponding to the user input and select one or more path rules, such as A-B1-C1, A-B1-C2, A-B1-C3-D-F, and A-B1-C3-D-E-F, including the path rule, such as A-B1, partly corresponding to the user input and may transmit the one or more path rules to the user terminal 100.

The NLU module 220 may select one of a plurality of path rules based on an input added by the user terminal 100 and transmit the selected one path rule to the user terminal 100. For example, the NLU module 220 may select one path rule, such as A-B1-C3-D-F, of the plurality of path rules, such as A-B1-C1, A-B1-C2, A-B1-C3-D-F, and A-B1-C3-D-E-F, depending on the user input, such as an input for selecting C3, additionally entered by the user terminal 100 for the purpose of transmitting the selected one path rule to the user terminal 100.

The NLU module 220 may determine the intent of a user and the parameter corresponding to the user input, such as an input for selecting C3, additionally entered by the user terminal 100 for the purpose of transmitting the user intent or the parameter to the user terminal 100. The user terminal 100 may select one path rule, such as A-B1-C3-D-F, of the plurality of path rules, such as A-B1-C1, A-B1-C2, A-B1-C3-D-F, and A-B1-C3-D-E-F, based on the transmitted intent or the transmitted parameter.

As such, the user terminal 100 may complete the actions of the apps 141 and 143 based on the selected one path rule.

In the case where a user input in which insufficient information is received by the intelligence server 200, the NLU module 220 may generate a path rule partly corresponding to the received user input and may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information, and may transmit the path rule to be added to the intelligence agent 151. The intelligence agent 151 may transmit the path rule to the execution manager module 153 and may execute the second app 143.

In the case in which the intelligence server 200 receives a portion of missing user input information the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of missing information is received by the intelligence server 200, the NLU module 220 may make a request for the missing information to receive an additional input or may determine a path rule corresponding to the user input by using user information.

Figure 6:
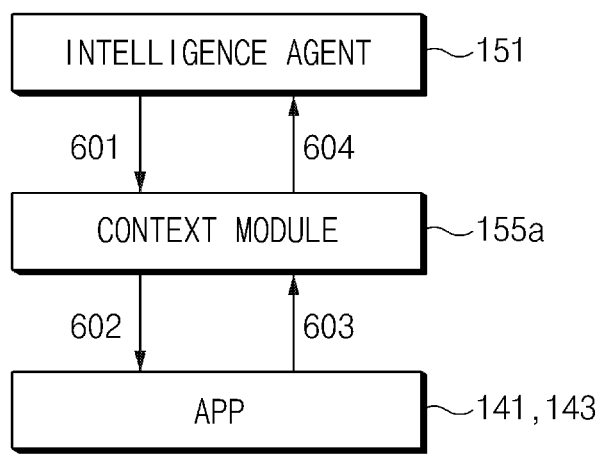
FIG. 6 is a block diagram of a context module of a processor that collects a current state, according to an embodiment of the present disclosure.

FIG. 6 is a block diagram illustrating that a context module of a processor collects a current state, according to an embodiment of the present disclosure.

If receiving a context request from the intelligence agent 151 at 601, the context module 155a may make a request for context information indicating current states of the apps 141 and 143 to the apps 141 and 143 at 602. The context module 155a may receive the context information from the apps 141 and 143 at 603, and may transmit the context information to the intelligence agent 151 at 604.

The context module 155a may receive pieces of context information through the apps 141 and 143. The context information may be information about the most recently executed apps 141 and 143, or may be information, such as information about a corresponding picture in the case where a user watches a picture through a gallery app, about the current states in the apps 141 and 143.

The context module 155a may receive context information indicating a current state of the user terminal 100 from a device platform as well as the apps 141 and 143. The context information may include general context information, user context information, or device context information.

The general context information may include general information of the user terminal 100 and may be verified through an internal algorithm by receiving data through a sensor hub of the device platform. The general context information may include information about current time and space which may include information about current time or a current location of the user terminal 100. The current time may be verified through the time on the user terminal 100, and the information about the current location may be verified through a global positioning system (GPS). The general context information may include information about physical motion including information about walking, running, or driving. The information about the physical motion may be verified through a motion sensor. In the case of the information about driving, boarding and parking may be verified by sensing a Bluetooth connection in a vehicle, and driving may be verified through the motion sensor. The general context information may include user activity information including information about commuting, shopping, or travel. The user activity information may be verified by using information about a place where a user or an app registers in a database.

The user context information may include information about an emotional state of the user including information about the user's happiness, sadness, or anger. The user context information may include information about the current state of the user including information about interest or intent, such as shopping.

The device context information may include information about the state of the user terminal 100 including information about a path rule that the execution manager module 153 performs. The device information may include information about a battery that may be verified through charging and discharging states of the battery. The device information may include information about a connected device and a network that may be verified through a communication interface connected with the device.

Figure 7:
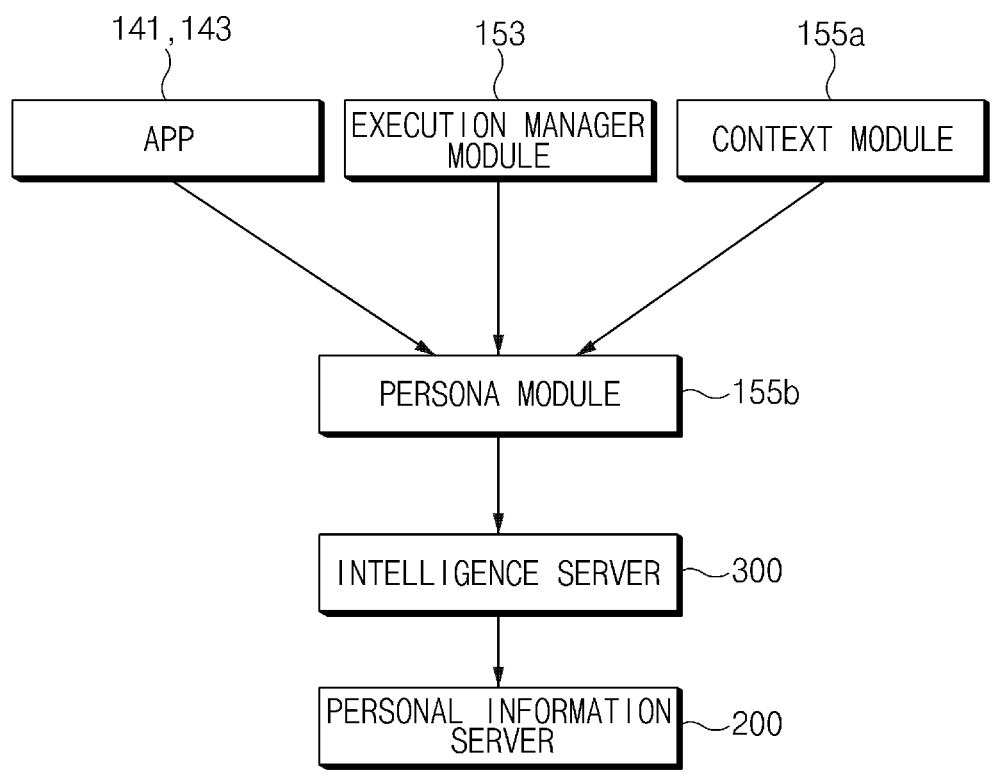
FIG. 7 is a block diagram of a persona module that manages information of a user, according to an embodiment of the present disclosure.

FIG. 7 is a block diagram of a persona module that manages information of a user, according to an embodiment of the present disclosure.

The persona module 155b may receive information of the user terminal 100 from the apps 141 and 143, the execution manager module 153, or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. Data stored in the action log database and the context database may be analyzed by an analysis engine and may be transmitted to the persona module 155b.

The persona module 155b may transmit information received from the apps 141 and 143, the execution manager module 153, or the context module 155a to the proposal module 155c. The persona module 155b may transmit the data stored in the action log database or the context database to the proposal module 155c.

The persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

The persona module 155b may transmit the data stored in the action log database or the context database to the proposal module 155c. User information generated by the persona module 155b may be stored in a persona database. The persona module 155b may periodically transmit the user information stored in the persona database to the personal information server 300. The information transmitted to the personal information server 300 by the persona module 155b may be stored in the persona database. The personal information server 300 may estimate user information necessary to generate a path rule of the intelligence server 200 by using the information stored in the persona database.

The user information estimated by using information that the persona module 155b transmits may include profile information or preference information. The profile information or the preference information may be estimated through an account of the user and accumulated information.

The profile information may include personal information of the user including population statistical information of the user. The population statistical information may include gender or age of the user. The profile information may include life event information which may be estimated by comparing log information with a life event model and may be strengthened by analyzing a behavior pattern. The profile information may include interest information including shopping items of interest, interesting fields, such as sports and politics. The profile information may include activity area information including information about a house or a work place. The information about the activity area may include information about an area where a priority is recorded based on accumulated stay time and the number of visits as well as information about a location of a place. The profile information may include activity time information including information about a wakeup time, a commute time, or a sleep time. The information about the commute time may be estimated by using the activity area information, such as information about a house and a work place. The information about the sleep time may be estimated through an unused time of the user terminal 100.

The preference information may include preference information of the user including information about app preference. The app preference may be estimated through a usage log, such as a time-specific and place-specific usage log of an app. The app preference may be used to determine an app to be executed depending on a current state, such as time or place, of the user. The preference information may include information about contact preference that may be estimated by analyzing information about a contact frequency, such as a time-specific and place-specific frequency of contacting, of a contact. The contact preference may be used to determine a contact to be contacted depending on a current state, such as a contact for duplicate names, of the user. The preference information may include setting information that may be estimated by analyzing information about setting frequency, such as a time-specific and place-specific frequency of setting a value, of a specific setting value. The setting information may be used to set a specific setting value depending on the current state, such as a time, a place, or a situation, of the user. The preference information may include place preference that may be estimated through visit history, such as a time-specific visit history, of a specific place. The place preference may be used to determine a place to visit depending on the current state, such as time, of the user. The preference information may include instruction preference that may be estimated through a usage frequency, such as a time-specific and place-specific usage frequency, of an instruction. The instruction preference may be used to determine an instruction pattern to be used depending on the current state, such as time or place, of the user. In particular, the instruction preference may include information about a menu most frequently selected by the user in the current state of an app being executed by analyzing the log information.

Figure 8:
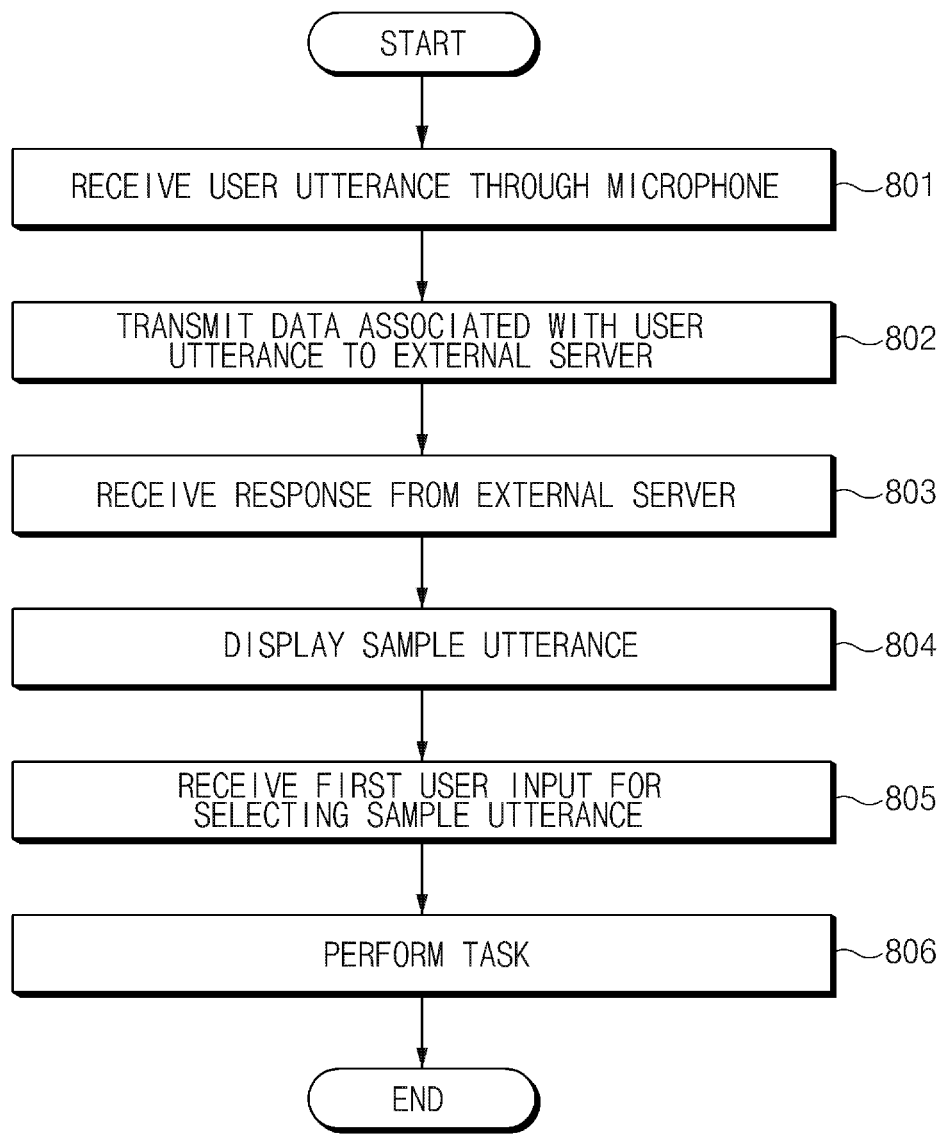
FIG. 8 is a flowchart illustrating a method for performing a task based on a user utterance request, according to an embodiment of the present disclosure.

FIG. 8 is a flowchart illustrating a method for performing a task based on a user utterance request, according to an embodiment of the present disclosure.

Hereinafter, it is assumed that the user terminal 100, or an electronic device, of FIG. 2 performs a process of FIG. 8. In addition, as described in FIG. 8, it is understood that the operation described as being executed by the electronic device 100 is controlled by the processor 150 of the electronic device 100. The operation may be implemented with instructions capable of being performed, or executed, by the processor 150 of the electronic device 100. The instructions may be stored in, for example, a computer-readable recording medium or the memory 140 of the electronic device 100 illustrated in FIG. 2.

In step 801, the processor 150 may receive user utterance through the microphone 111.

The user utterance may include a request for performing a task with the electronic device 100. For example, the user utterance may be "send a Hawaii photo to mom by a message app", and the user utterance may include a request for performing a task of sending a photo taken in Hawaii to mom by using a message app.

In step 802, the processor 150 may transmit data associated with the user utterance to an external server through a wireless communication circuit.

The data associated with the user utterance may include a voice signal corresponding to the user utterance.

The processor 150 may transmit context information indicating a current state of the electronic device 100 to the external server through the wireless communication circuit. The context information may include information of an app being executed or state information of an app being executed. The state information of the app may include a state ID, specific screen information of the app, or specific state information in a specific screen.

In step 803, the processor 150 may receive a response from the external server through the wireless communication circuit.

The received response may include at least one sample utterance representative of the intent of the user utterance, and the at least one sample utterance may be selected by the external server, such as the intelligence server 200, based on the user utterance.

The at least one sample utterance may include the first sample utterance representative of the first intent of the user utterance and the second sample utterance representative of the second intent different from the first intent. The received response may include a plurality of sample utterances, and each sample utterance may indicate a different intent of the user utterance.

The external server may generate at least one path rule based on data associated with the user utterance. The at least one sample utterance may include the first sample utterance corresponding to a first path rule and the second sample utterance corresponding to a second path rule. The received response may include a plurality of sample utterances, and each sample utterance may correspond to a different path rule.

In step 804, the processor 150 may display the at least one sample utterance on the touchscreen display 120. Hereinafter, a method in which the processor 150 displays a sample utterance will be described in detail.

In step 805, the processor 150 may receive the first user input for selecting one of one or more sample utterances through the microphone 111 or the touchscreen display 120. Hereinafter, a method in which the processor 150 receives the first user input will be described in detail.

In step 806, the processor 150 may perform a task associated with the selected sample utterance.

The electronic device 100 may follow a sequence of states associated with the selected one or more sample utterances, and then, the processor 150 may perform a task.

After step 802, in the case where the external server corresponding to the intelligence server 200 clearly determines the intent of the user utterance, the electronic device may perform a task according to the determined intent of the user utterance. However, since a type of the user utterance is not limited, the case where the external server does not clearly determine the intent of the user utterance may occur.

Hereinafter, in the case where the external server does not clearly determine the intent of the user utterance, a method is described in which the external server generates a path rule based on data associated with the user utterance.

Figure 9:
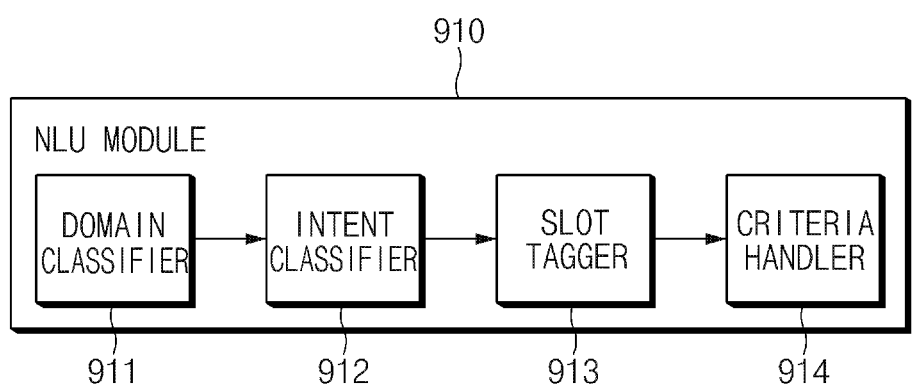
FIG. 9 is a block diagram of an NLU module of the intelligence server, according to an embodiment of the present disclosure.

FIG. 9 is a block diagram illustrating an NLU module of the intelligence server 200, according to an embodiment of the present disclosure.

An NLU module 910 may include a domain classifier 911, an intent classifier 912, a slot tagger 913, a criteria handler 914, and the like. The NLU module 910 of FIG. 9 may correspond to the NLU module 220 of FIG. 2.

The domain classifier 911 may determine a domain, to which a path rule belongs, based on at least one of a text corresponding to user utterance or context information. The domain may correspond to an app used when the path rule is performed The domain classifier 911 may use the text corresponding to the user utterance received from the ASR module 210 and may use the text directly entered by a user.

The context information may include information, or information of an app being executed in background, of an app, which is being executed before the user utterance is entered, or state information of the app. The state information of the app may include a state ID, specific screen information of the app, or specific state information in a specific screen.

The domain classifier 911 may determine a plurality of domains and a confidence level corresponding to each domain. The sum of a plurality of confidence levels may be '1'.

The intent classifier 912 may determine the intent in the domain determined by the domain classifier 911, based on at least one of the text corresponding to the user utterance or the context information. The intent may correspond to an action executed by using an app corresponding to the domain, and the intent classifier 912 may determine a path rule ID corresponding to the intent.

The context information may include information of an app, or background information of an app, which is being executed before the user utterance is entered, or state information of the app.

In the case where the domain classifier 911 determines a plurality of domains, the intent classifier 912 may determine the intent in each of the plurality of domains.

The intent classifier 912 may determine a plurality of intents and may determine a confidence level corresponding to each intent. The sum of a plurality of confidence levels may be '1'.

The slot tagger 913 may generate a slot necessary to perform a path rule, based on the text corresponding to the user utterance and the intent, or the path rule ID, determined by the intent classifier 912. In the case where the intent classifier 912 determines a plurality of intents, the slot tagger 913 may generate the slot for the plurality of intents.

The slot tagger 913 may generate a plurality of slots for each intent and may further determine the confidence level corresponding to each slot.

The criteria handler 914 may change a parameter, which the slot tagger 913 generates, to a format that a path planner module is capable of using. For example, the criteria handler 914 may change the slot of "yesterday" to data of "−1" that has the format of a date.

An NLU module may be implemented with modules such as the domain classifier 911, the intent classifier 912, the slot tagger 913, and the criteria handler 914, and may be implemented with a module in which the modules are integrated.

The NLU module may transmit the path rule ID and the slot to the path planner module. The path planner module may change the slot to the parameter of the path rule, or may generate the path rule by using the context information of the electronic device, and may transmit the path rule to the electronic device.

Figure 10:
FIG. 10 illustrates an action that a path rule includes, according to an embodiment of the present disclosure.

FIG. 10 illustrates an action that a path rule includes, according to an embodiment of the present disclosure.

The path rule that the intelligence server 200 generates by using user utterance may include action 1 to action 5.

Action 1 to action 5 may be actions according to a path rule generated based on the user utterance of "find a Hawaii photo", and action 1 to action 5 may be a task of finding a photo taken in Hawaii by using a gallery app.

Even though the user utterance is received when the electronic device 100 displays a home screen or even though the user utterance is received when the electronic device 100 already executes action 1 and action 2 by an input such as a touch or the like, the intelligence server 200 may generate a path rule that allows the electronic device 100 to find a photo taken in Hawaii by using the gallery app.

The NLU module of the intelligence server 200 may use context information as well as a text corresponding to the user utterance. In the case where the user utterance is received when the electronic device 100 displays the home screen and in the case where the user utterance is received when the electronic device 100 already executes action 1 and action 2 by an input such as a touch, the intelligence server 200 may generate path rules differently.

In the case where the user utterance of "find Hawaii" is received when the electronic device 100 displays the home screen, the intelligence server 200 may generate a path rule for searching for Hawaii in an Internet app.

In the case where the user utterance of "find Hawaii" is received when the electronic device 100 displays the screen of the gallery app, the intelligence server 200 may generate a path rule for searching for a Hawaii photo in the gallery app. At this time, the user intent may be to search for Hawaii on the Internet, but a path rule for finding a Hawaii photo may be generated because the user utterance is received in a state where the gallery app is executed.

To generate a path rule suitable for the user intent, the intelligence server 200 may generate a plurality of path rules and a sample utterance corresponding to each of the plurality of path rules through a method to be described below to transmit the plurality of path rules and the sample utterance to the electronic device 100. A screen in which a plurality of sample utterances that the intelligence server 200 generates are displayed in the electronic device 100 will be described with reference to FIGS. 11A and 11B.

Figure 11A:
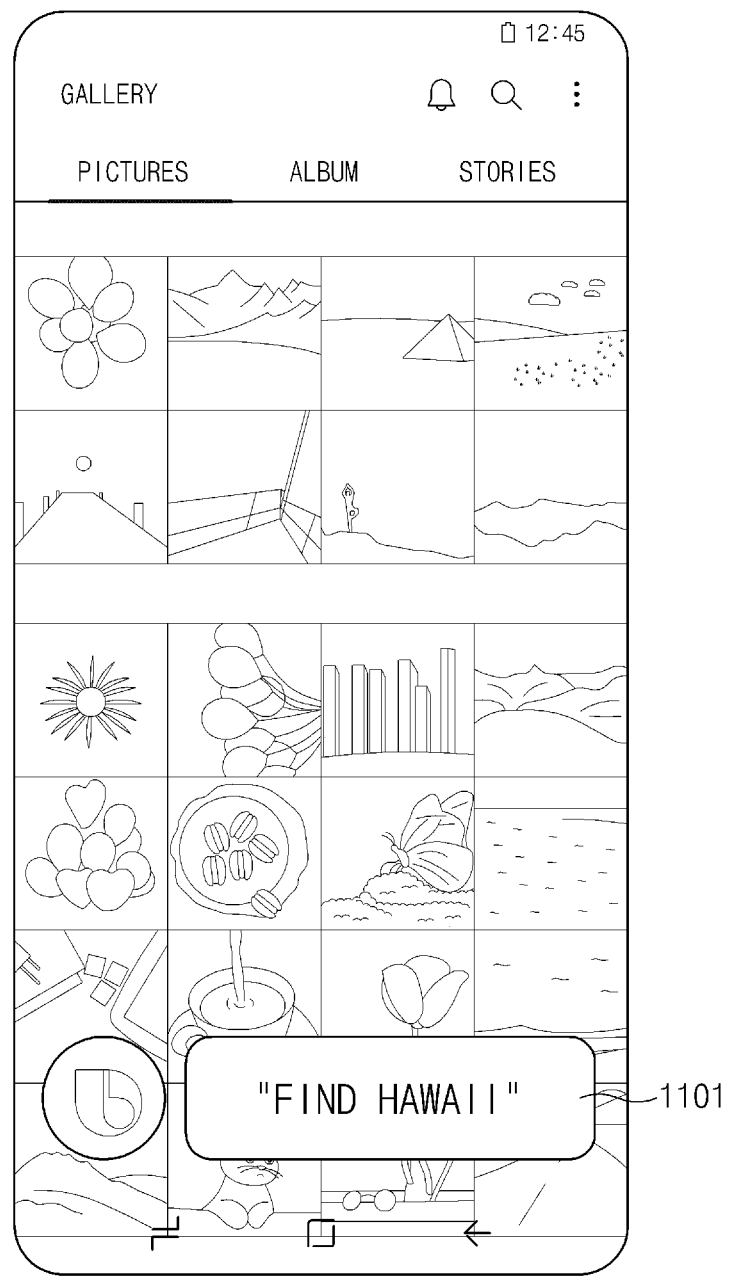
FIG. 11A illustrates a user utterance entered in a state where a gallery app is executed, according to an embodiment of the present disclosure.

FIG. 11A illustrates a user utterance entered in a state where a gallery app is executed, according to an embodiment of the present disclosure.

Figure 11B:
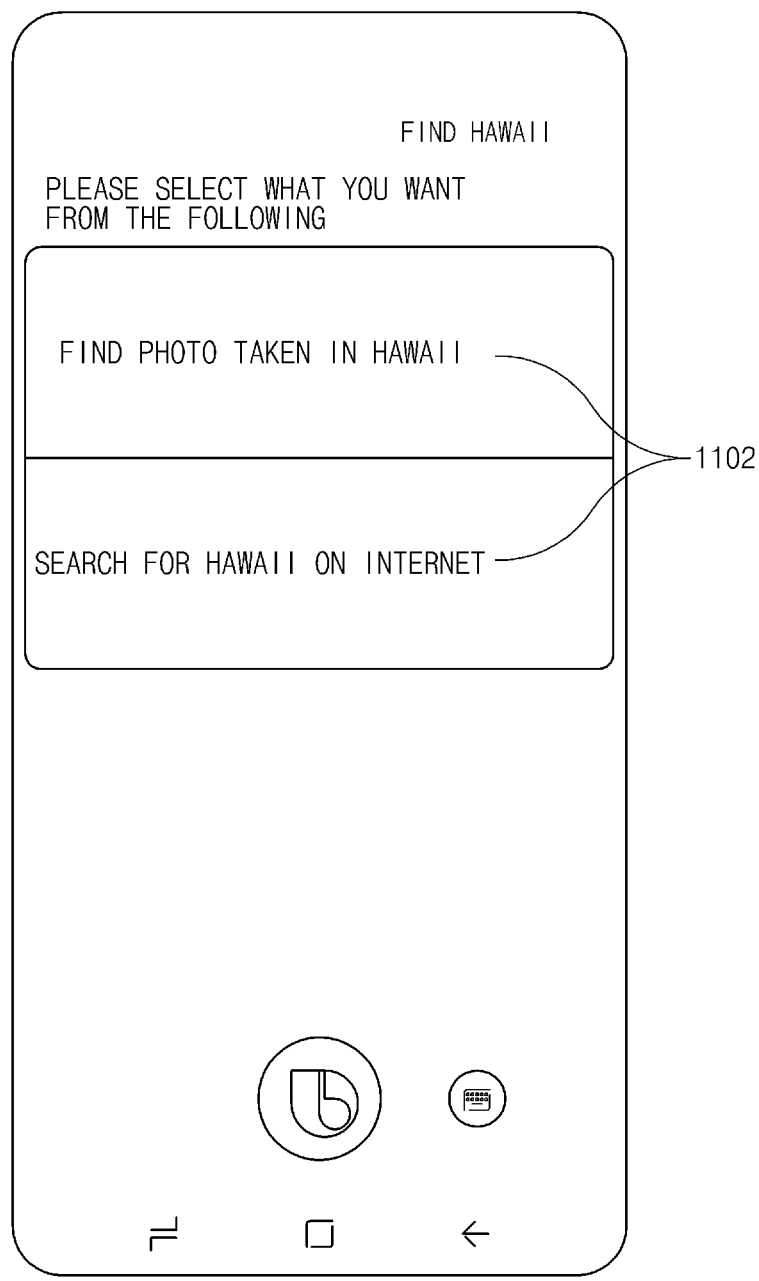
FIG. 11B illustrates a screen in which a plurality of sample utterances are displayed, according to an embodiment of the present disclosure.

FIG. 11B illustrates a screen in which a plurality of sample utterances are displayed, according to an embodiment of the present disclosure.

In an embodiment, the electronic device 100 may receive user utterance 1101 of "find Hawaii" in a screen in which the gallery app is executed as illustrated in FIG. 11A and may transmit the user utterance 1101 to the intelligence server 200.

The intelligence server 200 may generate a path rule for finding a Hawaii photo using the gallery app and a path rule for searching for Hawaii using an Internet app, by using a text corresponding to the user utterance of "find Hawaii" and context information that the app being executed is the gallery app. The intelligence server 200 may generate the sample utterance corresponding to each path rule and may transmit the sample utterance to the electronic device 100.

The electronic device 100 may display a sample utterance 1102 corresponding to the received path rule as illustrated in FIG. 11B, and may receive an input for selecting the sample utterance to perform the path rule corresponding to the selected sample utterance.

Hereinafter, a detailed method in which the intelligence server 200 transmits a plurality of sample utterances will be described with reference to FIG. 12 and FIG. 13.

Figure 12:
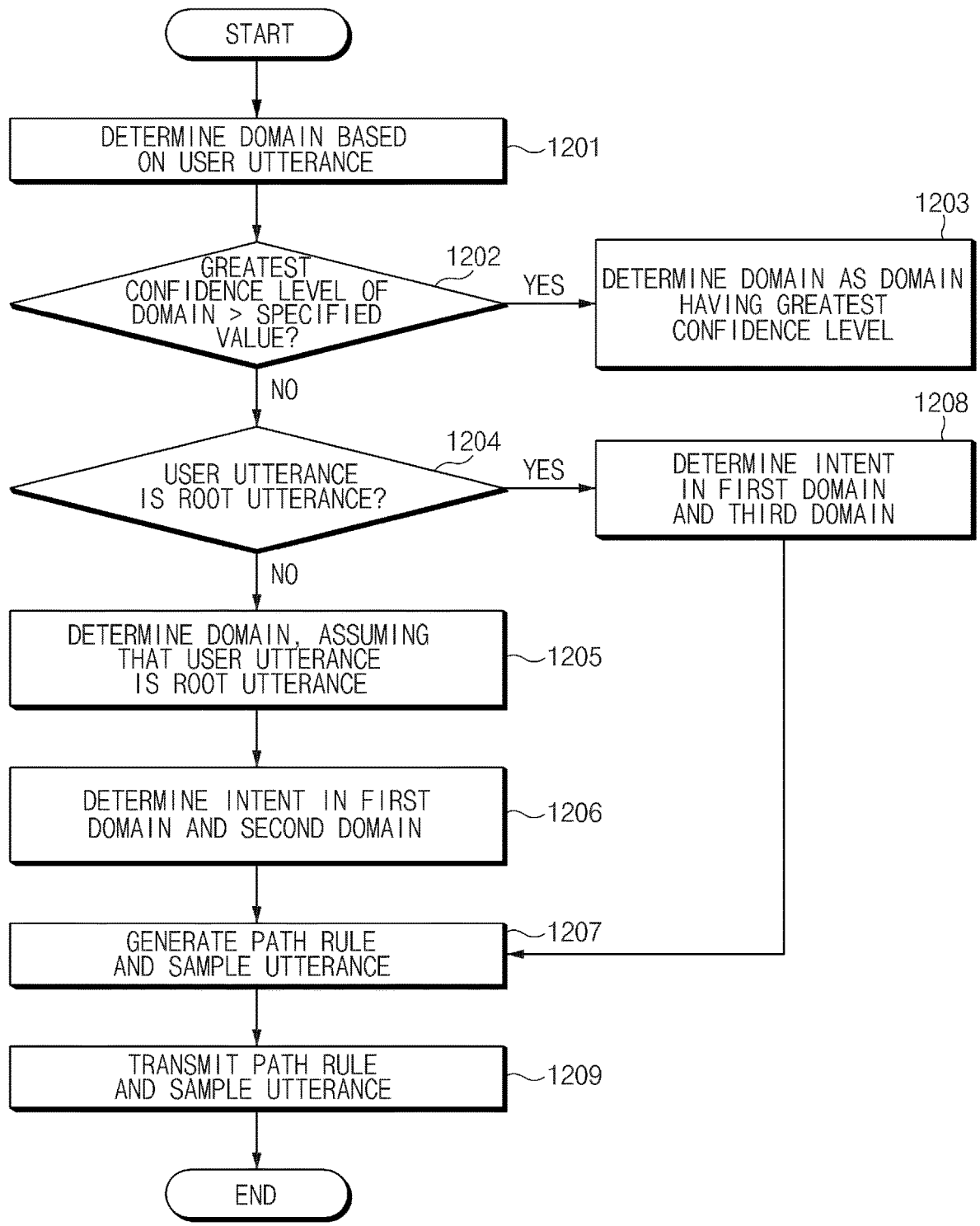
FIG. 12 is a flowchart illustrating a method in which the intelligence server transmits a plurality of sample utterances, according to an embodiment of the present disclosure.

FIG. 12 is a flowchart illustrating a method in which the intelligence server 200 transmits a plurality of sample utterances.

In step 1201, the domain classifier 911 may determine one or more domains (or an app), based on at least one of a text corresponding to user utterance or context information. The domain classifier 911 may further determine a confidence level corresponding to each of the one or more domains.

In step 1202, the intelligence server 200 may determine whether a confidence level of a domain having the highest confidence level exceeds a specified value.

In the case where the result of step 1202 indicates that a confidence level of the domain having the highest confidence level exceeds the specified value, in step 1203, the intelligence server 200 may determine a domain according to the user utterance and the context information as the domain having the highest confidence level.

In the case where the result of step 1202 indicates that a confidence level of the domain having the highest confidence level does not exceed the specified value, in step 1204, the intelligence server 200 may determine whether the user utterance is root utterance, by using the context information. The root utterance may mean user utterance received in a state where an intelligence service is performed when the electronic device 100 displays the home screen. The context information may include information of an app that is being executed before the intelligence service is performed, and the intelligence server 200 may determine whether the user utterance is the root utterance, by using the context information.

In the case where the result of step 1204 indicates that the user utterance is not the root utterance, in step 1205, the domain classifier 911 may determine at least one domain, or app, based on the user utterance, assuming that the user utterance is the root utterance. According to an embodiment, the domain classifier 911 may further determine a confidence level corresponding to each of the one or more domains.

In step 1206, the intent classifier 912 may determine at least one intent in a first domain, which has the highest confidence level, among the one or more domains determined in step 1201 and at least one intent in a second domain, which has the highest confidence level, among the one or more domains determined in step 1205, based on at least one of a text corresponding to the user utterance or the context information. The intent classifier 912 may determine a path rule ID corresponding to the intent and the confidence level corresponding to each of the one or more intents.

In step 1207, the intelligence server 200 may generate a path rule corresponding to each intent, by using the specified number of intents, a confidence level which is high, among one or more intents, or path rule IDs, in the first domain and the user utterance. In addition, the intelligence server 200 may generate a path rule corresponding to each intent, by using the specified number of intents, a confidence level which is high, among the one or more intents in the second domain and the user utterance. The intelligence server 200 may further generate the sample utterance corresponding to the path rule.

The intelligence server 200 may generate two path rules respectively corresponding to two intents, which correspond to the top two intents in order of increasing confidence value, among five intents in the first domain and the user utterance. Furthermore, the intelligence server 200 may generate two path rules respectively corresponding to two intents, which correspond to the top two intents in order of increasing confidence value, among four intents in the second domain and the user utterance. The intelligence server 200 may generate the total of four path rules.

The intelligence server 200 may store representative utterance (RU) that represents the intent of each path rule. The intelligence server 200 may further store representative friendly utterances (RFUs) such that a user easily understands the RU. The intelligence server 200 may generate the sample utterance corresponding to the path rule by using RFU.

For example, the intelligence server 200 may generate the sample utterance of "send a message with a photo taken in Hawaii to Emma" by using the RFU and by using a text of "a photo taken in Hawaii, let me see, send to Emma through a message" corresponding to the user utterance.

The intelligence server 200 may change a parameter in the RFU to a parameter generated from the text corresponding to the user utterance to generate the sample utterance.

For example, the RFU stored in the intelligence server 200 may be "send a message with a photo taken in Hawaii to Emma", and the text corresponding to the user utterance may be "send a photo taken in Tokyo to Tommy through a message". The intelligence server 200 may change "Hawaii" in the RFU to "Tokyo", and may change "Emma" to "Tommy" to generate the sample utterance of "send a message with a photo taken in Tokyo to Tommy".

In the case where the result of step 1204 indicates that the user utterance is the root utterance, in step 1208, the intent classifier 912 may determine at least one intent in each domain, the number of each domain is specified with a high confidence level, among the one or more domains determined in step 1201, based on at least one of the text corresponding to the user utterance or context information. The intent classifier 912 may determine a path rule ID corresponding to the intent and may further determine the confidence level corresponding to each of the one or more intents.

The intent classifier 912 may determine at least one intent in the first domain having the highest confidence level, among the one or more domains determined in step 1201, and at least one intent in a third domain having the second highest confidence level, among the one or more domains determined in step 1201.

The intent classifier 912 may determine at least one intent in only the first domain, having the highest confidence level, among the one or more domains determined in step 1201.

In the case where the result of step 1204 indicates that the user utterance is the root utterance, after step 1208, in step 1207, the intelligence server 200 may generate a path rule corresponding to each intent, by using the specified number of intents, a high confidence level, among one or more intents, or path rule IDs, in the first domain and the user utterance. In addition, the intelligence server 200 may generate a path rule corresponding to each intent, by using the specified number of intents, a high confidence level, among the one or more intents in the third domain and the user utterance and may further generate the sample utterance corresponding to the path rule.

The intelligence server 200 may generate two path rules corresponding to two intents corresponding to the top two confidence values, of five intents in the first domain and the user utterance. Furthermore, the intelligence server 200 may generate two path rules corresponding to two intents corresponding to the top two confidence values, of three intents in the third domain and the user utterance. The intelligence server 200 may generate the total of four path rules.

The intelligence server 200 may generate four path rules corresponding to four intents correspond to the top four confidence values, among five intents in the first domain and the user utterance.

In step 1209, the intelligence server 200 may transmit the generated path rule and the sample utterance corresponding to the path rule to the electronic device 100.

Figure 13:
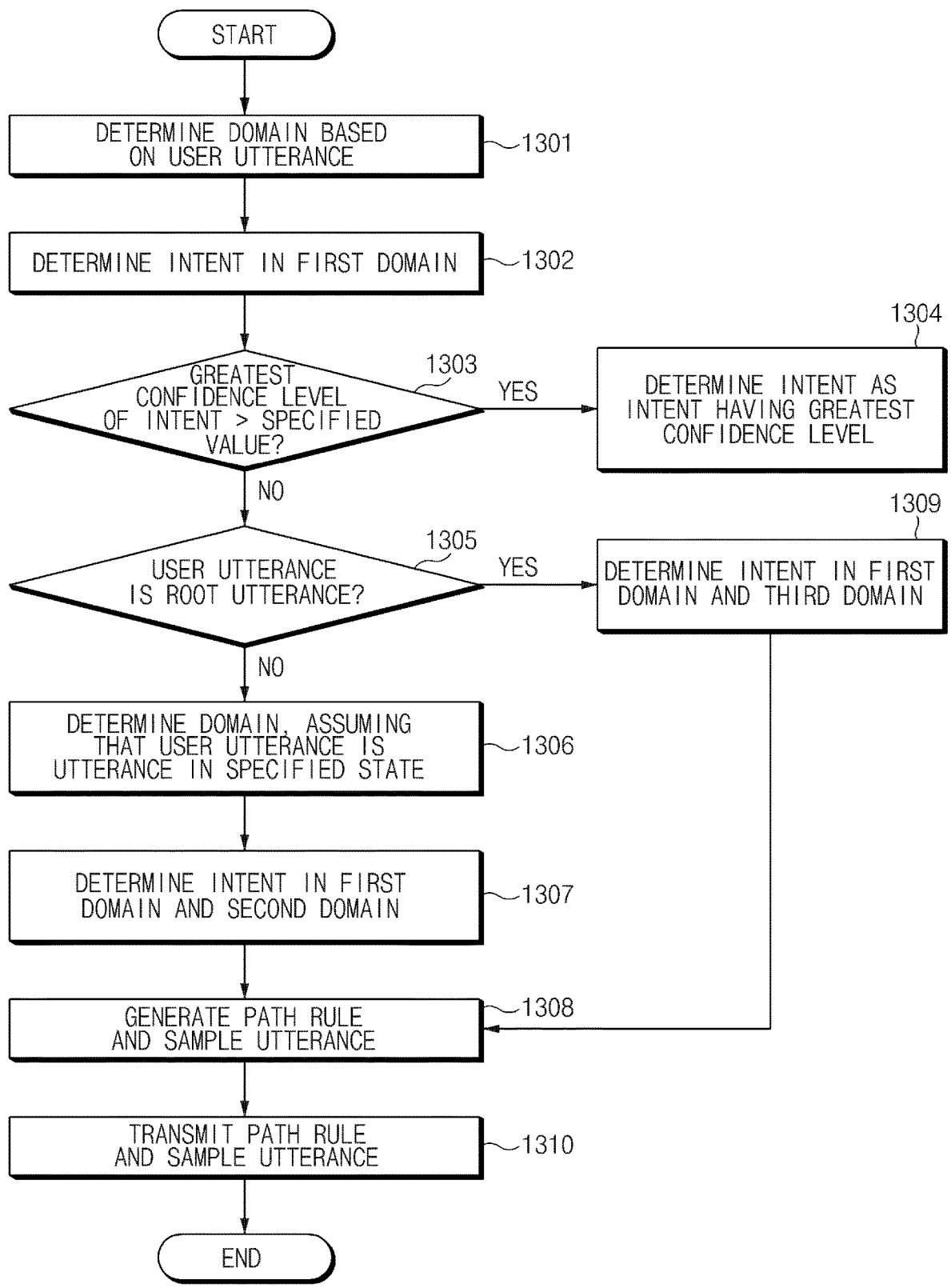
FIG. 13 is a flowchart illustrating a method in which the intelligence server transmits a plurality of sample utterances, according to an embodiment of the present disclosure.

FIG. 13 is a flowchart illustrating a method in which the intelligence server 200 transmits a plurality of sample utterances, according to an embodiment of the present disclosure.

In step 1301, the domain classifier 911 may determine one or more domains, or an app, based on at least one of a text corresponding to user utterance or context information. The domain classifier 911 may further determine a confidence level corresponding to each of the one or more domains.

In step 1302, the intent classifier 912 may determine at least one intent in a first domain having the highest confidence level, among the one or more domains determined in step 1201 based on at least one of a text corresponding to the user utterance or context information. The intent classifier 912 may determine a path rule ID corresponding to the intent and may further determine the confidence level corresponding to each of the one or more intents.

In step 1303, the intelligence server 200 may determine whether a confidence level of the intent having the highest confidence level exceeds a specified value.

In the case where the result of step 1303 indicates that a confidence level of the intent having the highest confidence level exceeds the specified value, in step 1304, the intelligence server 200 may determine the intent according to the user utterance and the context information as the intent having the highest confidence level.

In the case where the result of operation 1303 indicates that the intent having the highest confidence level does not exceed the specified value, in step 1305, the intelligence server 200 may determine whether the user utterance is root utterance, by using the context information. The context information may include information of an app that is being executed before the intelligence service is performed, and the intelligence server 200 may determine whether the user utterance is the root utterance, by using the context information.

In the case where the result of step 1305 indicates that the user utterance is not the root utterance, in step 1306, the domain classifier 911 may determine at least one domain, or an app, based on the user utterance, assuming that the user utterance is the user utterance in a specified state. The domain classifier 911 may further determine a confidence level corresponding to each of the one or more domains.

The specified state may include a state where an intelligence service is executed when the electronic device 100 displays the home screen, a state where the intelligence service is performed when a screen immediately before the screen of the electronic device 100 is displayed, a state where the intelligence service is performed when a specified representative screen of the app that the electronic device 100 is executing is displayed.

In step 1307, the intent classifier 912 may determine at least one intent in a second domain having the highest confidence level, among the one or more domains determined in step 1306 based on at least one of a text corresponding to the user utterance or context information. The intent classifier 912 may determine a path rule ID corresponding to the intent and may further determine the confidence level corresponding to each of the one or more intents.

In the case where the one or more domains determined in step 1306 are the same as the one or more domains determined in step 1301, the intent classifier 912 may determine at least one intent in the second domain, by using context information corresponding to the specified state. The intent classifier 912 may determine at least one intent in the second domain, assuming that the user utterance is received in a state where the intelligence service is performed when a screen immediately before the screen of the electronic device 100 is displayed.

In the case where the result of operation 1305 indicates that the user utterance is not the root utterance, the intelligence server 200 may not perform step 1306, and, in step 1307, the intent classifier 912 may determine at least one intent in the second domain by using context information corresponding to the specified state.

In step 1308, the intelligence server 200 may generate a path rule corresponding to each intent, by using the specified number of intents, having a high confidence level, among one or more intents, or path rule IDs, in the first domain and the user utterance. In addition, the intelligence server 200 may generate a path rule corresponding to each intent, by using the specified number of intents, a confidence level of which is high, among the one or more intents in the second domain and the user utterance. The intelligence server 200 may further generate the sample utterance corresponding to the path rule.

The intelligence server 200 may generate two path rules respectively corresponding to two intents, which correspond to the top two confidence values, among five intents in the first domain and the user utterance. Furthermore, the intelligence server 200 may generate two path rules respectively corresponding to two intents, which correspond to the top two confidence values, among four intents in the second domain and the user utterance. The intelligence server 200 may generate a total of four path rules.

In the case where the result of step 1305 indicates that the user utterance is the root utterance, in step 1309, the intent classifier 912 may determine at least one intent in each of domains, the number of which is specified and the confidence level each of is high, among the one or more domains determined in step 1301, based on at least one of the text corresponding to the user utterance or context information. The intent classifier 912 may determine a path rule ID corresponding to the intent and may further determine the confidence level corresponding to each of the one or more intents.

For example, since the intent classifier 912 determines at least one intent in the first domain in step 1302, the intent classifier 912 may further determine at least one intent in a third domain, which has the second highest confidence level, among the one or more domains determined in step 1301.

In the case where the result of step 1305 indicates that the user utterance is the root utterance, after step 1309, in step 1308, the intelligence server 200 may generate a path rule corresponding to each intent, by using the specified number of intents, a confidence level of which is high, among one or more intents, or path rule IDs, in the first domain and the user utterance. In addition, the intelligence server 200 may generate a path rule corresponding to each intent, by using the specified number of intents having a high confidence level, among the one or more intents in the third domain and the user utterance. The intelligence server 200 may further generate the sample utterance corresponding to the path rule.

The intelligence server 200 may generate two path rules corresponding to two intents by using intents having the top two confidence values, of five intents in the first domain and the user utterance. Furthermore, the intelligence server 200 may generate two path rules corresponding to each intent having the top two confidence values, of three intents in the third domain and the user utterance. In other words, the intelligence server 200 may generate a total of four path rules.

In step 1310, the intelligence server 200 may transmit the generated path rule and the sample utterance corresponding to the path rule to the electronic device 100.

The above-described step 1201 to step 1209 and step 1301 to step 1310 are described assuming that the domain classifier 911 and the intent classifier 912 of the intelligence server 200 are implemented separately. According to various embodiments of the present disclosure, the intelligence server 200 may integrate the domain classifier 911 and the intent classifier 912 and may determine the domain and the intent by using at least one of a text corresponding to the user utterance or context information. The intelligence server 200 may also determine the confidence level corresponding to the domain and the intent, and may generate a plurality of path rules.

The intelligence server 200 may generate a slot based on the text corresponding to the user utterance and the intent determined by the intent classifier 912 and may determine the confidence level corresponding to the slot. The intelligence server 200 may transmit data for revising a parameter corresponding to a slot having a confidence level less than a specified value to the electronic device 100. Hereinafter, an action in which the electronic device 100 revises the parameter will be described.

In the case where the intelligence server 200 does not determine one path rule because the intent determined from the user utterance corresponds to a plurality of domains, the intelligence server 200 may generate a plurality of path rules and may transmit the plurality of path rules to the electronic device 100. The intelligence server 200 may assign a separate path rule ID, such as a conflict path rule ID that causes a plurality of path rules, and may determine the path rule ID as a separate path rule ID.

In the case where the user utterance is "send a message to mom that I'm late", an action of sending a sentence of "I'm late" to mom, which is the determined intent, may be executed by using an e-mail app, a message app, and a messenger app. The intelligence server 200 may determine the path rule ID as the separate path rule ID and may generate a plurality of path rules, which respectively use the e-mail app, the message app, and the messenger app and may transmit the plurality of path rules to the electronic device 100. When performing a path rule, the electronic device 100 may receive a user input for selecting an app to perform a path rule corresponding to the user input. The electronic device 100 may store a setting value of the user's preference app and may perform the path rule corresponding to the setting value.

In the case where the user utterance is "edit this photo", an action of editing the photo may be executed as the determined intent by using the gallery app, a 360 photo editing app, and a moving photo editing app=. The intelligence server 200 may determine the path rule ID as the separate path rule ID and may generate a plurality of path rules, which use the gallery app, the 360 photo editing app, and the moving photo editing app to transmit the plurality of path rules to the electronic device 100. The electronic device 100 may perform the path rule corresponding to type information of a photo corresponding to the editing object. For example, in the case where a type of a photo is a 360 photo, the electronic device 100 may perform the path rule corresponding to the 360 photo editing app.

Hereinafter, in the case where a plurality of path rules that the intelligence server 200 transmits, and the sample utterances corresponding to the plurality of path rules are included in the response that the electronic device 100 receives in step 803, the detailed action of step 804 to step 806 will be executed as described.

In step 804, the processor 150 may display a plurality of sample utterances in the display 120. In step 805, the processor 150 may receive the first user input for selecting one of the plurality of sample utterances through the microphone 111 or the touchscreen display 120. In step 806, the processor 150 may perform a task associated with the selected sample utterance.

In step 805, the plurality of sample utterances may include the first sample utterance representative of the first intent of the user utterance and the second sample utterance representative of the second intent different from the first intent. The plurality of sample utterances may include the first sample utterance corresponding to a first path rule and the second sample utterance corresponding to a second path rule.

The processor 150 may display information on a sequence of states associated with the selected sample utterance in response to the reception of a first user input, and may receive a second user input for selecting the selected sample utterance again. The processor 150 may follow the sequence of the selected sample utterance states to perform a task associated with the sample utterance selected in step 806, in response to the reception of the second user input.

The information on the sequence of states associated with the selected sample utterance may include a description about an action of the sequence, or a path rule, of the states or the utterance making it possible to perform the task.

In step 804, the processor 150 may display a message in the display 120 for receiving a user input saying that there is no sample utterance corresponding to the user utterance. In step 805, the processor 150 may receive the user input saying that there is no sample utterance corresponding to the user utterance. In the case where the processor 150 receives the user input, the processor 150 may display a user utterance sentence and may receive a user input for selecting and revising a portion that is not suitable for the user intent. The processor 150 may transmit the received user input to the intelligence server 200, and the intelligence server 200 may learn the intelligence service based on the received user input.

FIGS. 14A to 14D illustrate displaying the sample utterance and receiving the user input by the electronic device 100.

Figure 14A:
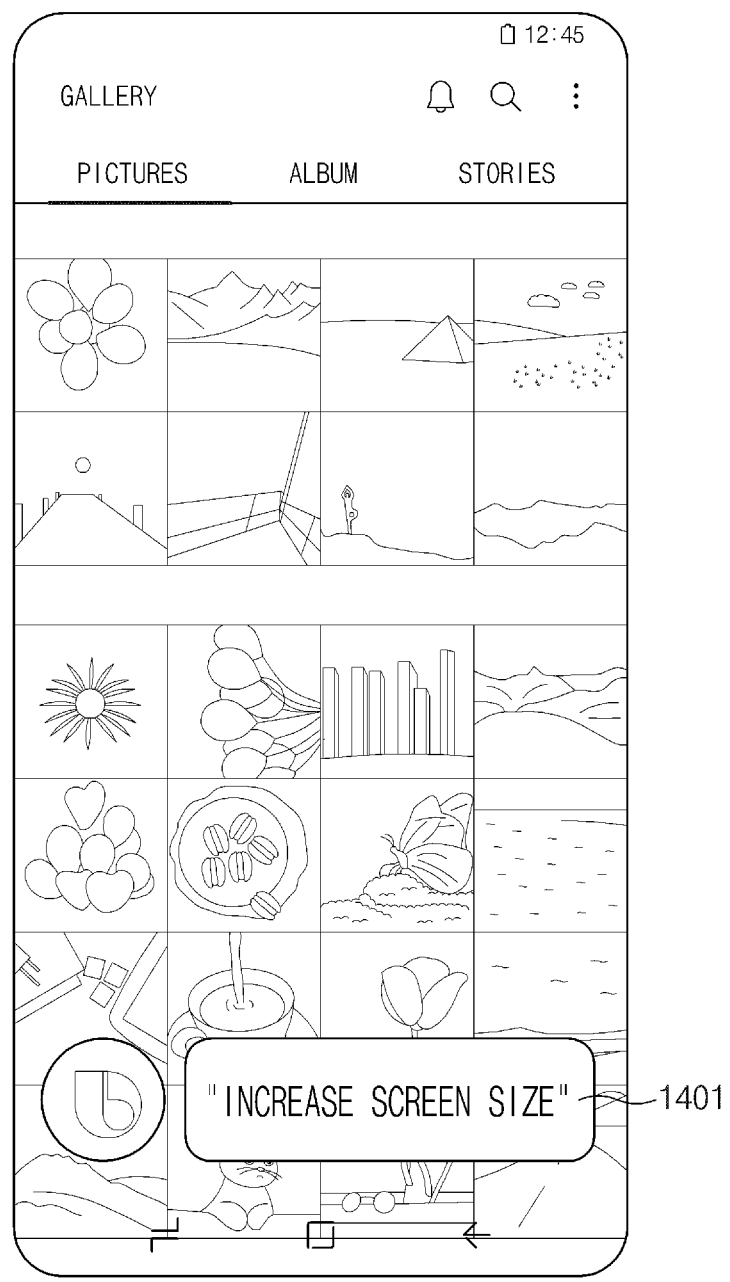
FIG. 14A illustrates a user utterance entered in a state where a gallery app is executed, according to an embodiment of the present disclosure.

FIG. 14A illustrates a user utterance entered in a state where a gallery app is executed, according to an embodiment of the present disclosure.

Figure 14B:
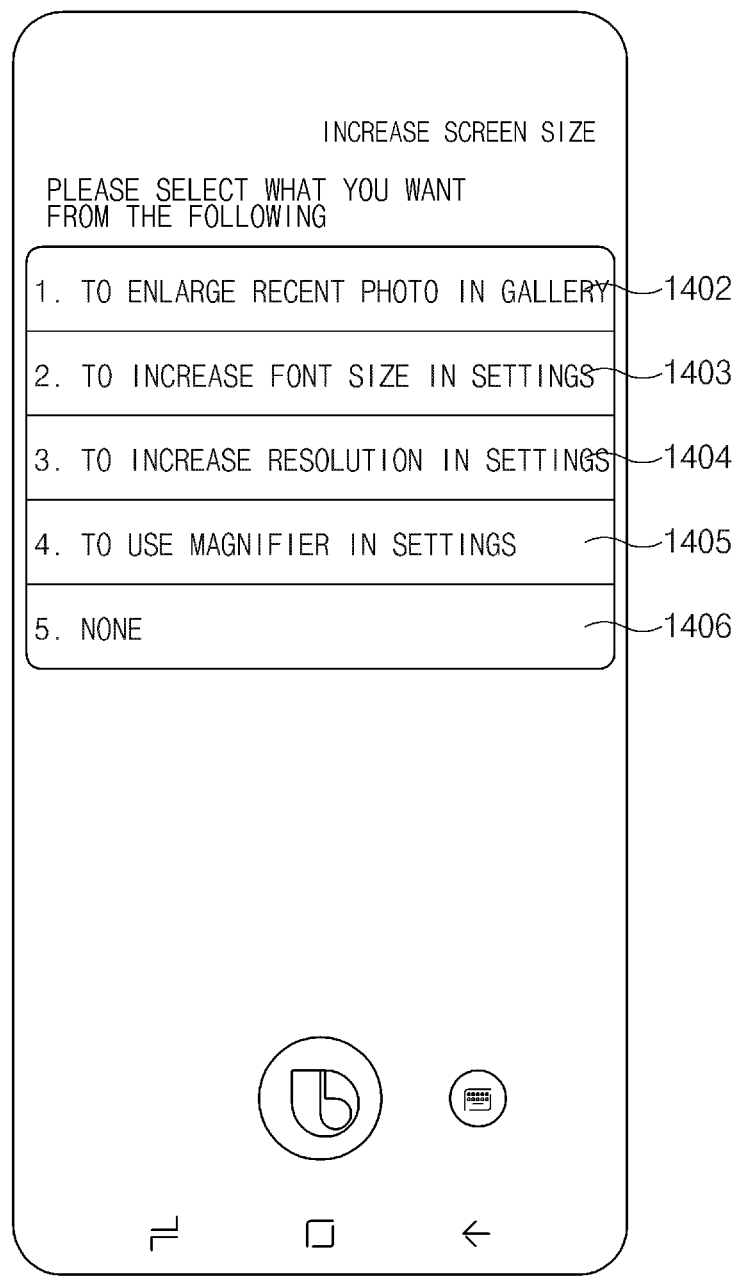
FIG. 14B illustrates a screen in which a plurality of sample utterances are displayed, according to an embodiment of the present disclosure.

FIG. 14B illustrates a screen in which a plurality of sample utterances are displayed, according to an embodiment of the present disclosure.

Figure 14C:
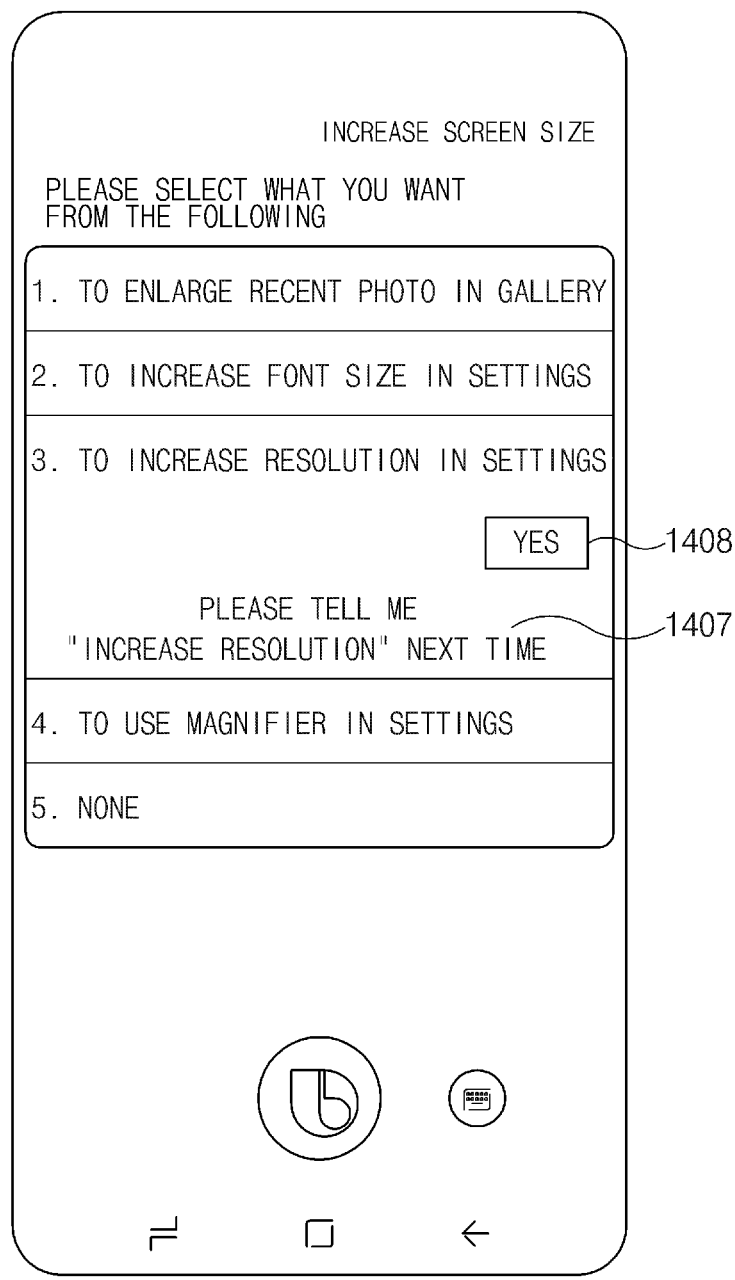
FIG. 14C illustrates a screen in which information associated with the selected sample utterance is displayed, according to an embodiment of the present disclosure.

FIG. 14C illustrates a screen in which information associated with a selected sample utterance is displayed, according to an embodiment of the present disclosure.

Figure 14D:
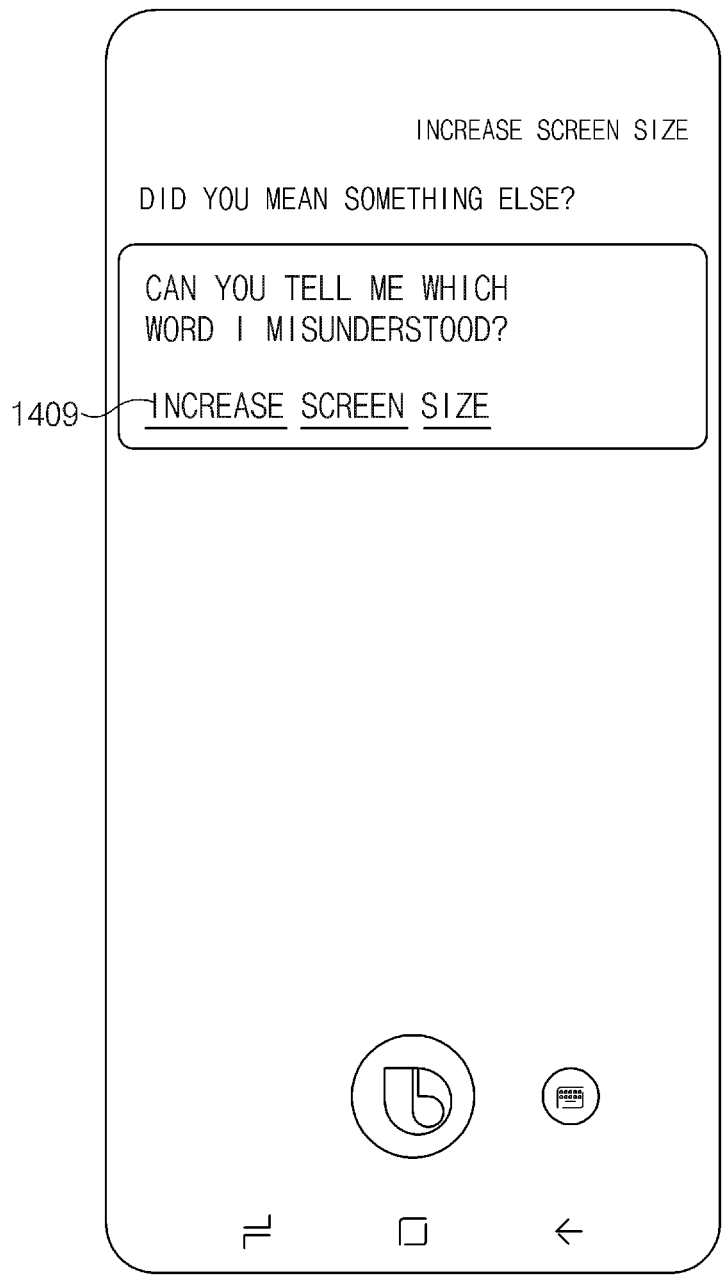
FIG. 14D illustrates a screen in which user intent is entered, according to an embodiment of the present disclosure.

FIG. 14D is a view illustrates a screen in which user intent is entered, according to an embodiment of the present disclosure.

Referring to FIG. 14A, while displaying a photo by using a gallery app, the electronic device 100 may perform an intelligence service to receive user utterance 1401 of "increase screen size". The electronic device 100 may transmit a voice signal corresponding to the user utterance and context information corresponding to displaying a photo using the gallery app, to the intelligence server 200. The intelligence server 200 may transmit a plurality of path rules and a plurality of sample utterances corresponding to the plurality of path rules to the electronic device 100, based on the voice signal and the context information.

The processor 150 may display the received plurality of sample utterances 1402, 1403, 1404, and 1405, and a message 1406 of "None", in the display 120. The electronic device 100 may receive the first user input for selecting one of the plurality of sample utterances through the microphone 111 or the touchscreen display 120. The processor 150 may perform a task associated with the selected sample utterance.

The processor 150 may receive a first user input for selecting the sample utterance 1404 "increase a resolution in settings". According to an embodiment of the present disclosure as illustrated in FIG. 14C, the processor 150 may display a RU 1407 for immediately performing a path rule corresponding to "increase a resolution in settings", in response to the reception of the first user input.

The processor 150 may receive a second user input for selecting "increase a resolution in settings" or for selecting an object 1408 illustrated in FIG. 14C. The processor 150 may perform a path rule corresponding to "increase a resolution in settings" to perform a task, in response to the reception of the second user input.

The user utterance may be "press a screen size". However, the intelligence server 200 may generate a text "increase a screen size" from the user utterance and may transmit a plurality of path rules based on the generated text, the context information and the sample utterances corresponding to the plurality of path rules, to the electronic device 100.

As illustrated in FIG. 14B, the electronic device 100 may display the plurality of sample utterances 1402, 1403, 1404, and 1405 and the message 1406 of "None", in the display 120.

The processor 150 may receive a user input for selecting the message 1406 of "None" illustrated in FIG. 14B. As illustrated in FIG. 14D, in the case where the processor 150 receives the user input, the processor 150 may display "increase a screen size". The processor 150 may receive a user input for selecting and revising an "increase" 1409 being a portion that is not suitable for the user intent. According to an embodiment, the processor 150 may display a list of other candidates corresponding to "increase" and may receive a user input for selecting one of candidates or may receive a text user input or an utterance input.

In step 804, the processor 150 may display, in the display 120, one or more images associated with at least one sample utterance of the plurality of sample utterances, and the displayed one or more images may indicate states corresponding to the sample utterance.

Figure 15:
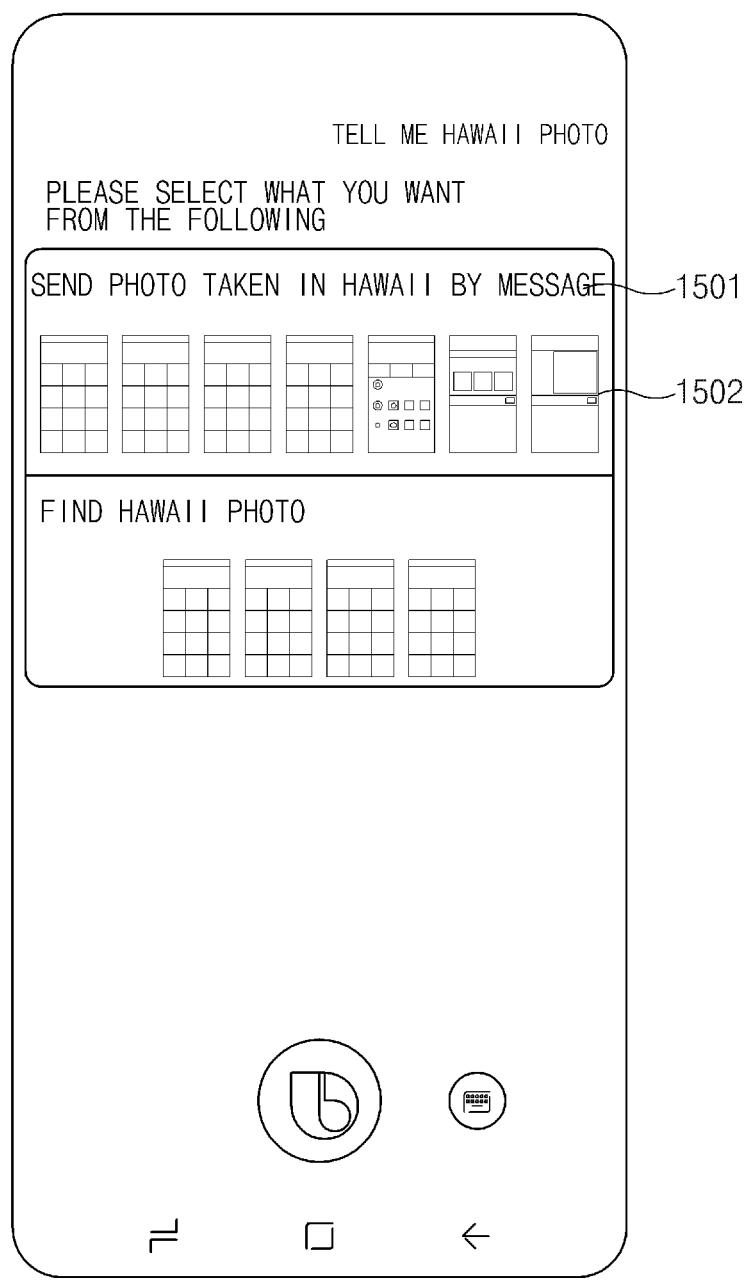
FIG. 15 illustrates a screen in which an image associated with a sample utterance is further displayed, according to an embodiment of the present disclosure.

FIG. 15 illustrates a screen in which an image associated with a sample utterance is displayed, according to an embodiment of the present disclosure.

If each sample utterance 1501 is selected, the processor 150 may display an image 1502 corresponding to states that correspond to a path rule being performed. The displayed state may correspond to each action screen at a point in time when the path rule is performed.

In step 804, the processor 150 may determine the order for displaying one or more sample utterances and may display at least the one or more sample utterances depending on the determined order.

The response received in operation 803 may further include a value corresponding to each of the one or more sample utterances, and a value corresponding to the sample utterance may be a confidence level.

The processor 150 may determine the order for displaying the one or more sample utterances according to a magnitude of the values corresponding to the sample utterances. For example, the processor 150 may display the sample utterances in order of increasing confidence level.

The processor 150 may visually display the one or more sample utterances differently based on the determined order. The processor 150 may display a sample utterance, which corresponds to the first order, from among the one or more sample utterances to be displayed differently, visually, from the remaining sample utterances. The processor 150 may display one or more images corresponding to the sample utterance corresponding to the first order or may display the sample utterance to be greater than the remaining sample utterances.

The processor 150 may determine a method of displaying a sample utterance based on history data of user's selection.

Figure 16A:
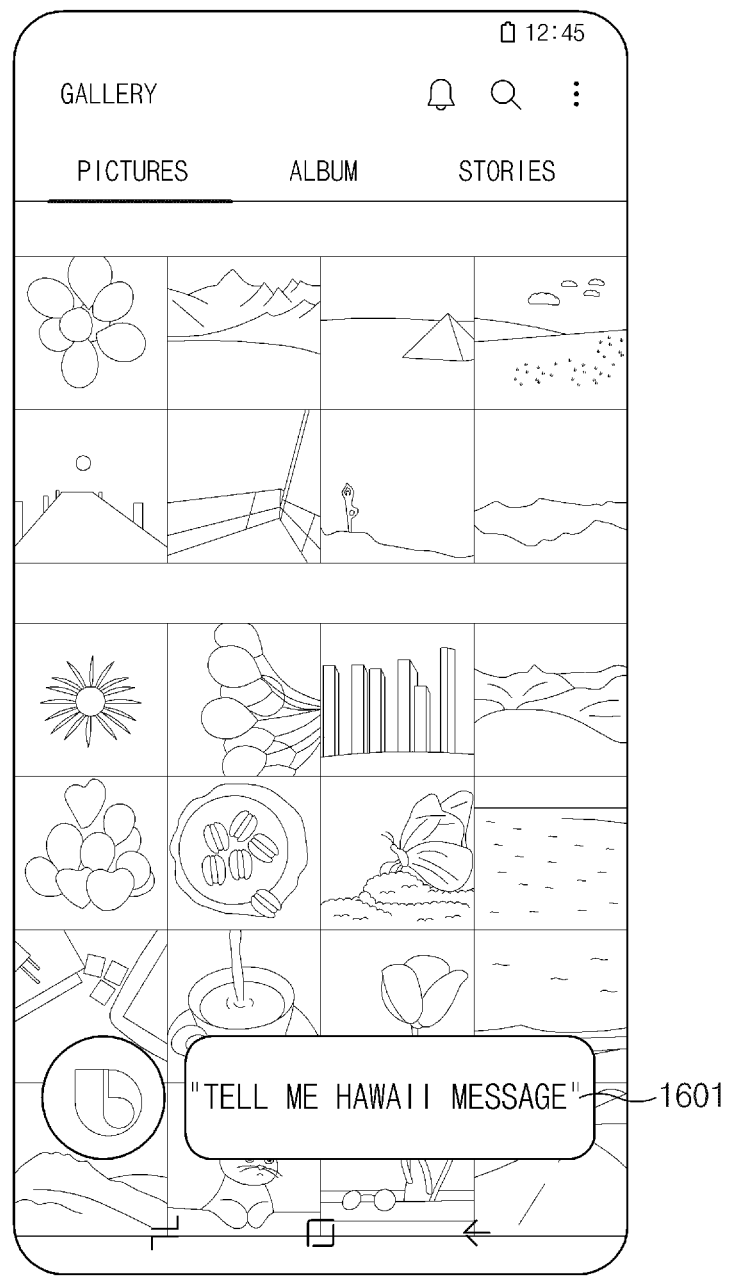
FIG. 16A illustrates a user utterance entered in a state where a gallery app is executed, according to an embodiment of the present disclosure.

FIG. 16A illustrates a user utterance entered in a state where a gallery app is executed, according to an embodiment of the present disclosure.

Figure 16B:
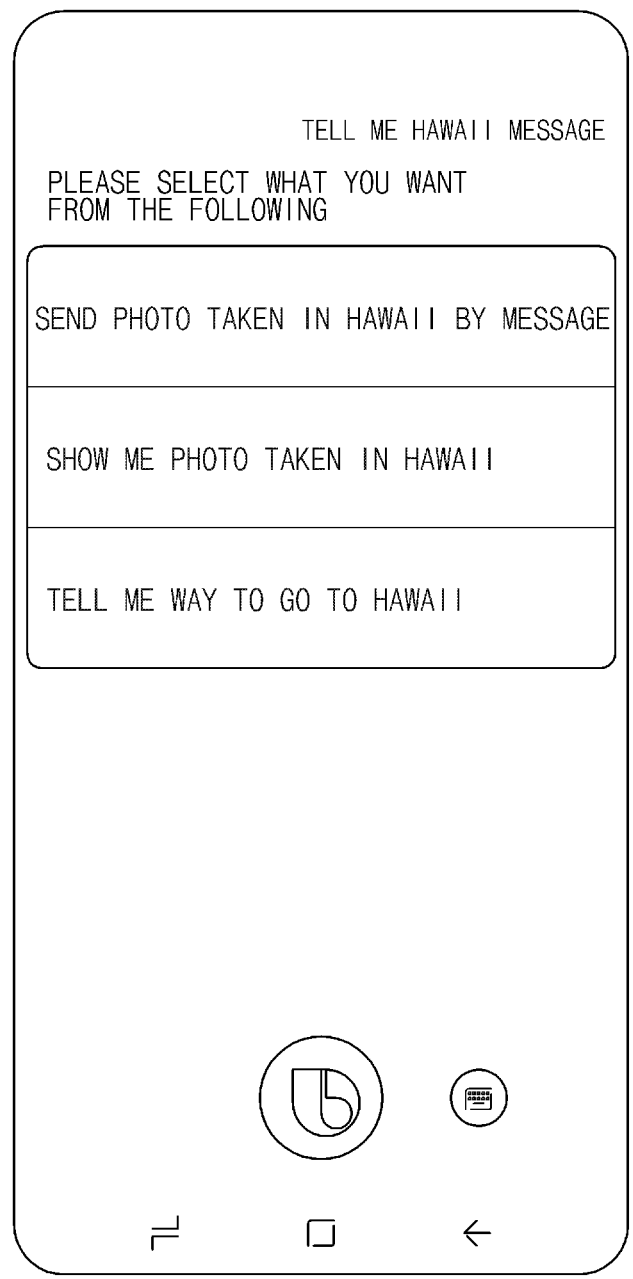
FIG. 16B illustrates a screen in which a sample utterance is displayed depending on a determined order, according to an embodiment of the present disclosure.

FIG. 16B illustrates a screen in which a sample utterance is displayed depending on a determined order, according to an embodiment of the present disclosure.

Figure 16C:
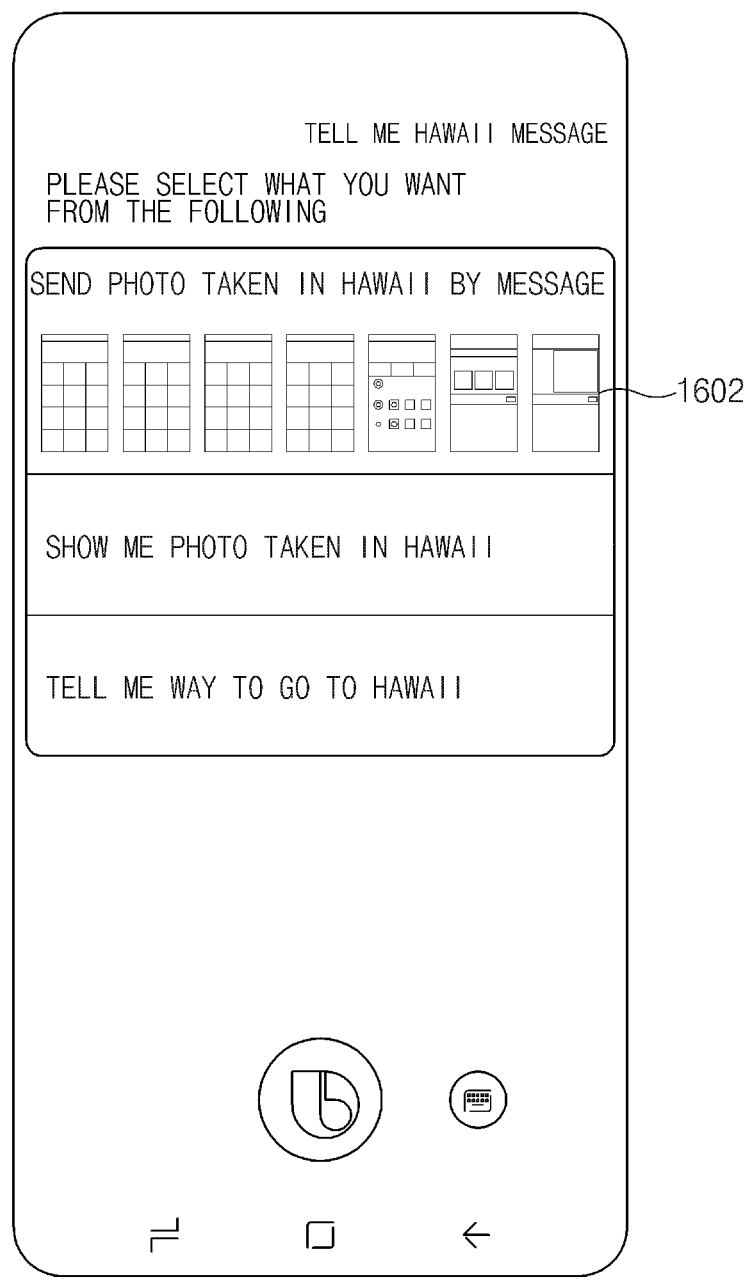
FIG. 16C illustrates a screen in which an image associated with a sample utterance corresponding to a priority is further displayed, according to an embodiment of the present disclosure.

FIG. 16C illustrates a screen in which an image associated with a sample utterance corresponding to a priority is further displayed, according to an embodiment of the present disclosure.

Figure 16D:
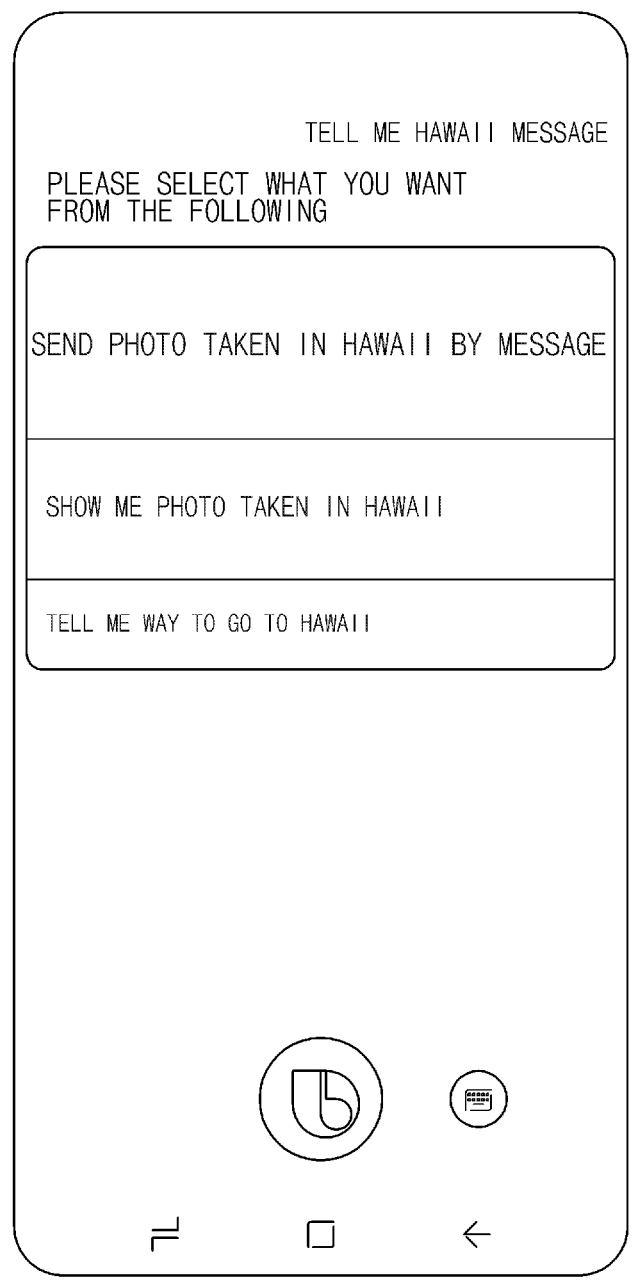
FIG. 16D illustrates a screen in which a size of a sample utterance is displayed to be different depending on the determined order, according to an embodiment of the present disclosure.

FIG. 16D illustrates a screen in which a size of a sample utterance is displayed differently depending on the determined order, according to an embodiment of the present disclosure.

Referring to FIG. 16A, while displaying a photo list using a gallery app, the electronic device 100 may perform an intelligence service to receive a user utterance 1601 of "tell me Hawaii message". The electronic device 100 may transmit a voice signal corresponding to the user utterance and context information corresponding to displaying a photo using the gallery app, to the intelligence server 200. The intelligence server 200 may transmit a plurality of path rules and a plurality of sample utterances corresponding to the plurality of path rules to the electronic device 100, based on the voice signal and the context information, and may further transmit confidence levels corresponding to a plurality of sample utterances.

The plurality of sample utterances may include "send a photo taken in Hawaii by a message", "show me a photo taken in Hawaii", and "tell me a method to go to Hawaii". The confidence level corresponding to each sample utterance may be high in order of "send a photo taken in Hawaii by a message", "show me a photo taken in Hawaii", and "tell me a way to go to Hawaii".

As illustrated in FIG. 16B, the processor 150 may display the plurality of sample utterances in order of increasing confidence level.

As illustrated in FIG. 16C, the processor 150 may display one or more images 1602 associated with "send a photo taken in Hawaii by a message", the confidence level of which is the highest. The images may indicate states corresponding to sample utterances.

As illustrated in FIG. 16D, the processor 150 may display the sample utterance so as to be greater as the confidence level become higher.

According to various embodiments of the present disclosure, the processor 150 may display the sample utterance in a manner of combining at least a part of one or more embodiments in which the above-mentioned sample utterance is displayed.

When receiving a plurality of path rules, the electronic device 100 may immediately perform one path rule which satisfies a specified condition, from among a plurality of path rules, while not receiving a user input for selecting a path rule, as described above. Since the performed path rule is not suitable for the user intent, the electronic device 100 may execute an action, described below. In the case where a confidence level of a path rule, determined by an intelligence server, is greater than a specified value, the following action may be executed.

Figure 17:
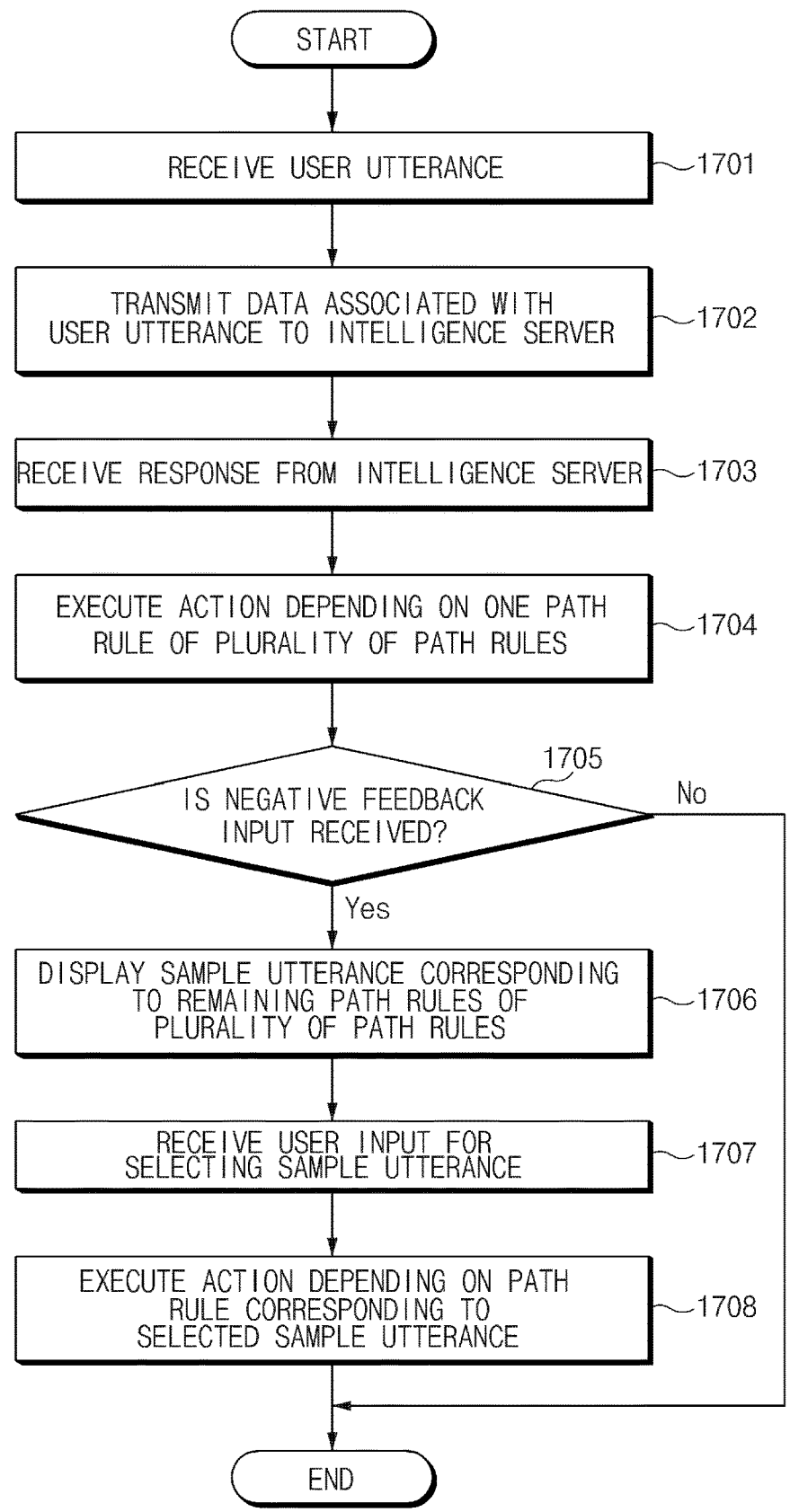
FIG. 17 is a flowchart illustrating a method in which an electronic device receives a feedback input to perform a path rule after performing another path rule, according to an embodiment of the present disclosure.

FIG. 17 is a flowchart illustrating a method in which an electronic device receives a feedback input to perform a path rule after performing another path rule, according to an embodiment of the present disclosure.

In step 1701, the processor 150 may receive a user utterance through the microphone 111.

In step 1702, the processor 150 may transmit data associated with the user utterance to an intelligence server through a wireless communication circuit.

The data associated with the user utterance may include a voice signal corresponding to the user utterance.

The processor 150 may transmit context information indicating a current state of the electronic device to the intelligence server through the wireless communication circuit. The context information may include information about an app being executed or state information of an app being executed, including a state ID, specific screen information of the app, or specific state information in a specific screen.

In step 1703, the processor 150 may receive a response from the intelligence server through the wireless communication circuit.

The received response may include a plurality of path rules and the sample utterance corresponding to each of the plurality of path rules. The plurality of path rules and the sample utterance may be generated or selected by the intelligence server 200 based on the user utterance. The response may further include a confidence level corresponding to each of the plurality of path rules.

In step 1704, the processor 150 may select one path rule of the plurality of path rules and may execute an action depending on the selected path rule.

The processor 150 may select a path rule having a highest confidence level, from among the plurality of path rules.

In step 1705, the processor 150 may receive a feedback input through the microphone 111 or the touchscreen display 120.

The feedback input may correspond to feedback about the result of executing the action, depending on the selected path rule.

Figure 18:
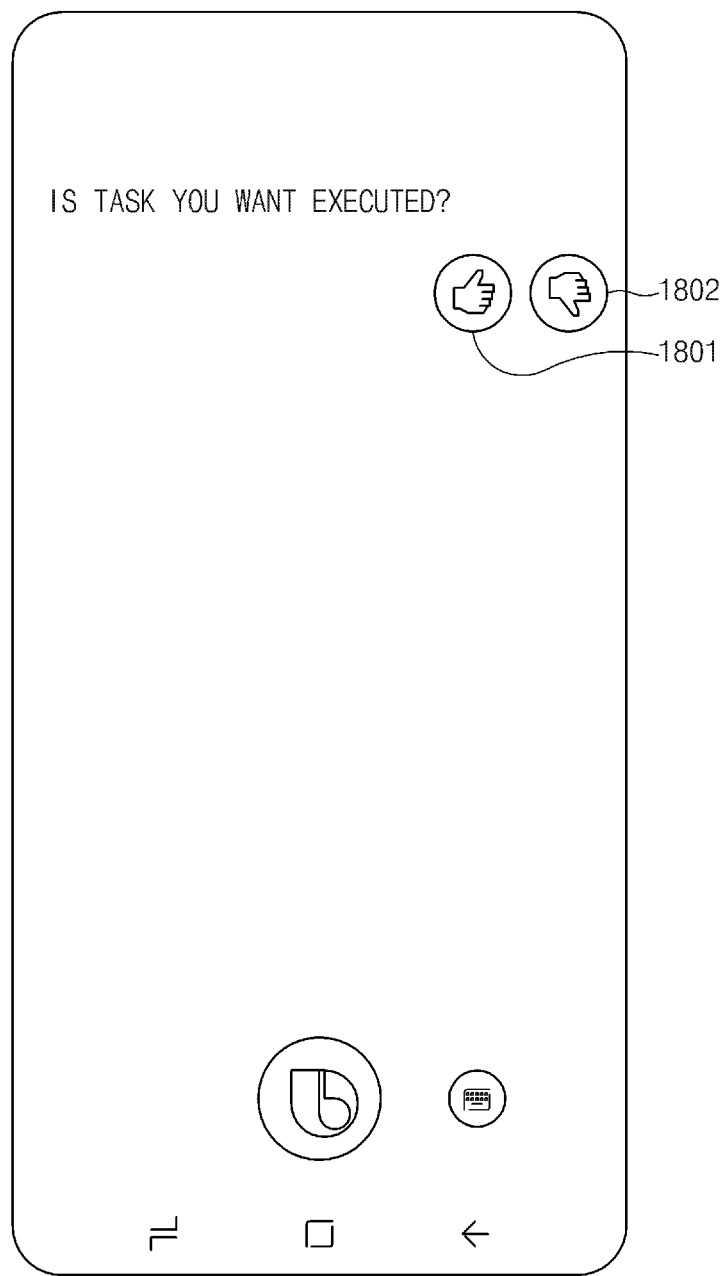
FIG. 18 illustrates a screen in which an electronic device receives a feedback input, according to an embodiment of the present disclosure.

FIG. 18 illustrates a screen in which an electronic device receives a feedback input, according to an embodiment of the present disclosure.

The processor 150 may display a screen in the display 120 to receive a feedback input. Through the microphone 111, the processor 150 may receive positive feedback such as "good" or "yes", or may receive negative feedback such as "not this", "no" or "other".

Through the touchscreen display 120, the processor 150 may receive a touch input for selecting a first object 1801, corresponding to a positive feedback input, or may receive a touch input for selecting a second object 1802, corresponding to a negative feedback input.

Returning to FIG. 17, in the case where the feedback input is a negative input, in step 1706, the processor 150 may display, on the display 120, a sample utterance, which is included in the response and corresponds to the remaining path rules not selected in step 1704.

Figure 19:
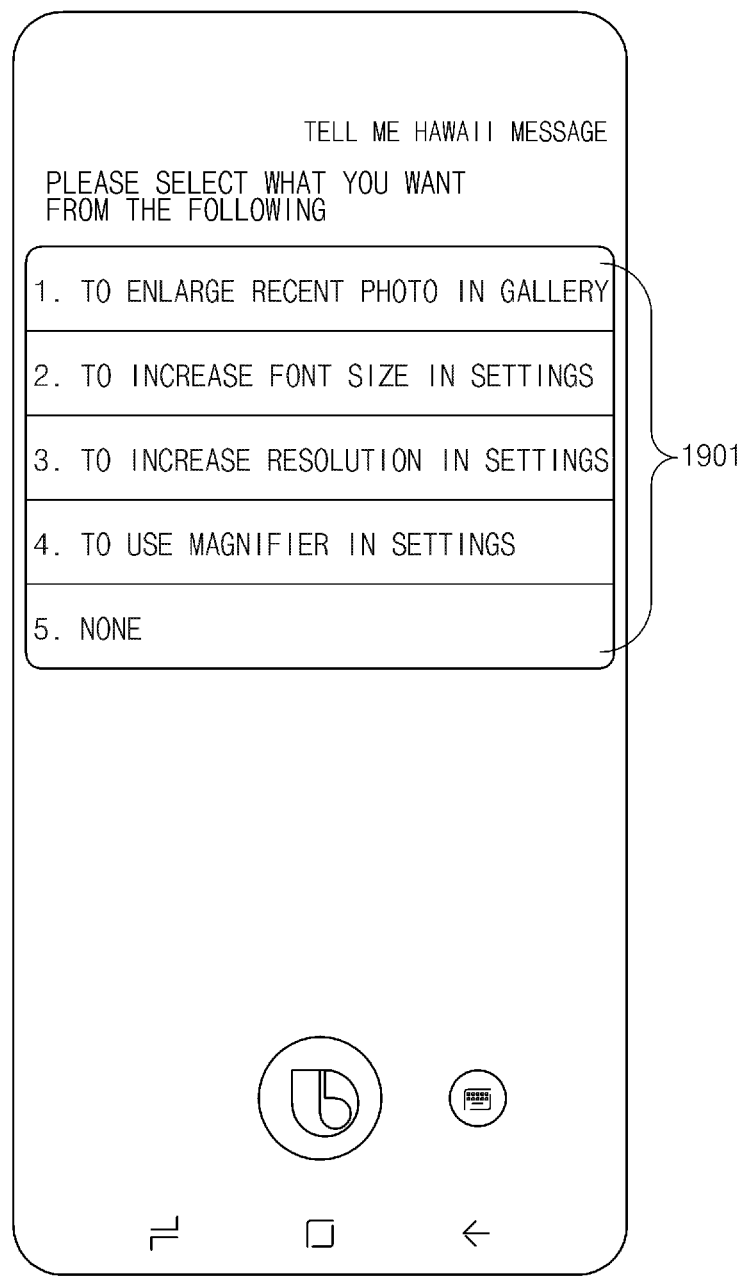
FIG. 19 illustrates a screen in which a sample utterance corresponding to the remaining path rules is displayed, according to an embodiment of the present disclosure.

FIG. 19 illustrates a screen in which a sample utterance corresponding to the remaining path rules is displayed, according to an embodiment of the present disclosure.

The processor 150 may display a plurality of sample utterances 1901 corresponding to the remaining path rules in the display 120.

Returning to FIG. 17, in step 1707, the processor 150 may receive a user input for selecting one of the plurality of sample utterances through the microphone 111 or the touchscreen display 120.

In step 1708, the processor 150 may execute an action depending on the path rule corresponding to the selected sample utterance.

Figure 20:
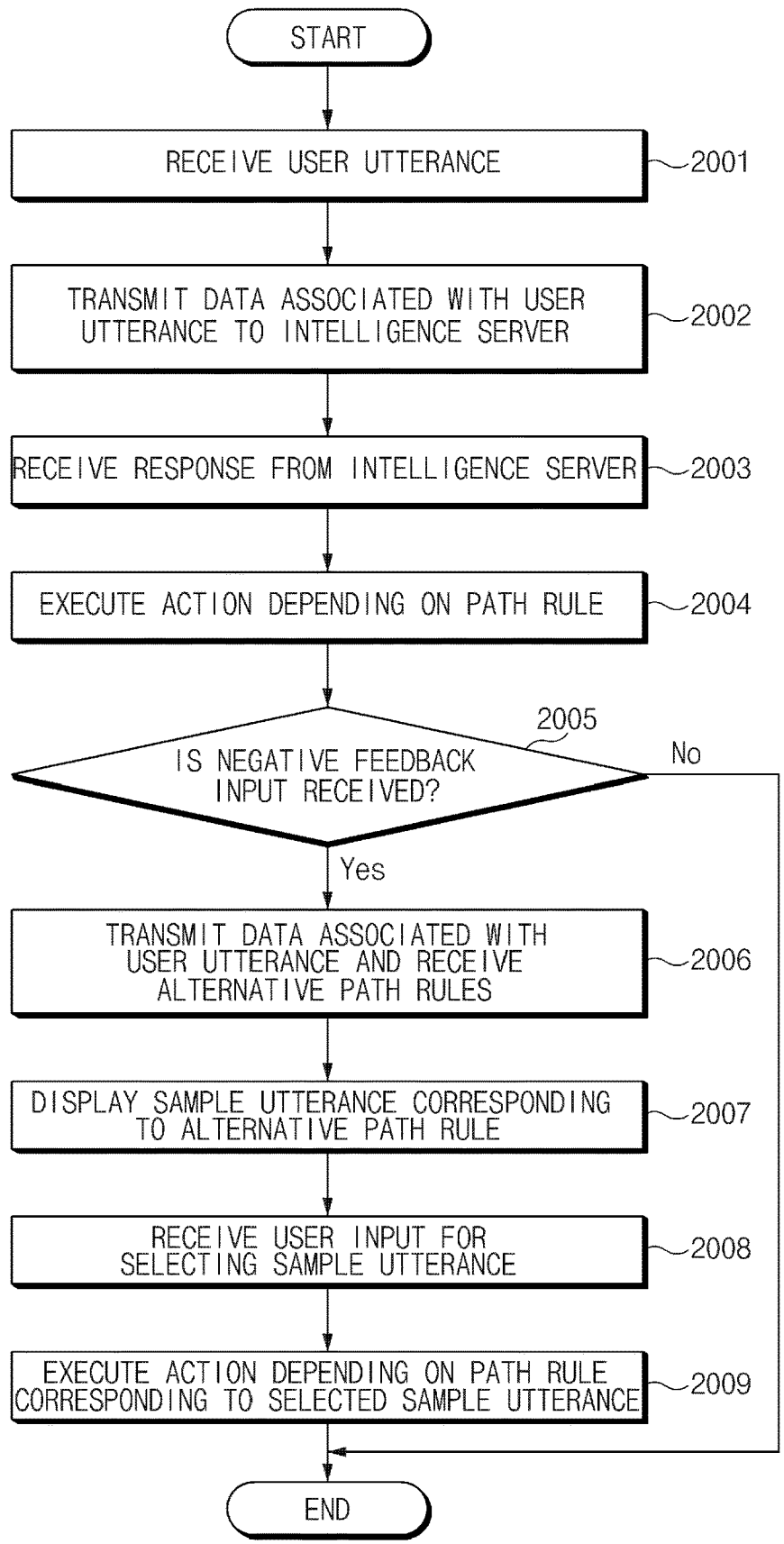
FIG. 20 is a flowchart illustrating a method in which an electronic device receives a feedback input to perform a path rule after performing another path rule, according to an embodiment of the present disclosure.

FIG. 20 is a flowchart illustrating a method in which an electronic device receives a feedback input to perform a path rule after performing another path rule, according to an embodiment of the present disclosure.

In step 2001, the processor 150 may receive a user utterance through the microphone 111.

In step 2002, the processor 150 may transmit data associated with the user utterance to the intelligence server 200 through a wireless communication circuit.

In step 2003, the processor 150 may receive a response from the intelligence server 200 through the wireless communication circuit.

The received response may include one path rule and sample utterance corresponding to the path rule. The path rule and the sample utterance may be generated or selected by the intelligence server 200 based on the user utterance.

In step 2004, the processor 150 may execute an action depending on the received path rule.

In step 2005, the processor 150 may receive a feedback input through the microphone 111 or the touchscreen display 120.

In the case where the feedback input is a negative input, in step 2006, the processor 150 may transmit data, such as user utterance and context information, associated with the user utterance to the intelligence server 200 to receive a plurality of alternative path rules from the intelligence server 200.

When transmitting data associated with the user utterance to the intelligence server 200, the processor 150 may request the transmission of an alternative path rule.

In step 2007, the processor 150 may display the sample utterance corresponding to the received plurality of alternative path rules, in the display 120.

In step 2008, the processor 150 may receive a user input for selecting one of a plurality of sample utterances through the microphone 111 or the touchscreen display 120.

In step 2009, the processor 150 may execute an action depending on the path rule corresponding to the selected sample utterance.

The electronic device 100 may transmit data associated with a user input for selecting the sample utterance to the intelligence server 200, which may use the received data to determine the intent of a user.

Figure 21:
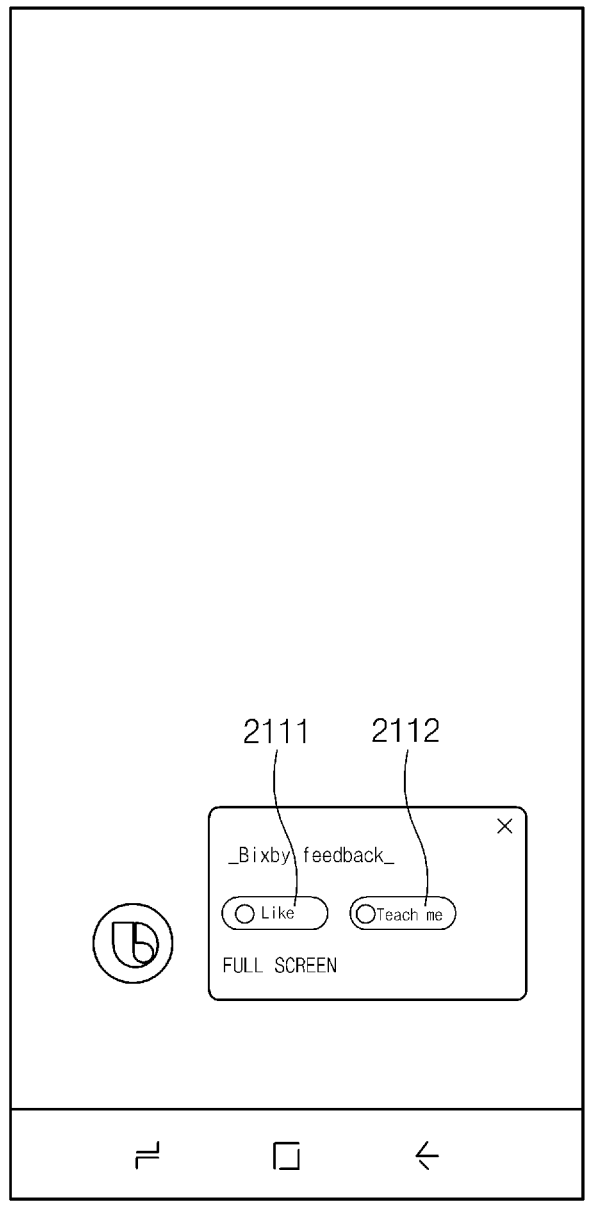
FIG. 21 illustrates a screen in which an electronic device receives a feedback input, according to an embodiment of the present disclosure.

FIG. 21 illustrates a screen in which an electronic device receives a feedback input, according to an embodiment of the present disclosure.

After step 1704 of FIG. 17 or after step 2004 of FIG. 20, the processor 150 may display a screen, as shown in FIG. 21, in the display 120 to receive a feedback input. The processor 150 may receive a touch input, through the touchscreen display 120, for selecting a first object 2111 corresponding to a positive feedback input or may receive a touch input for selecting a second object 2112 corresponding to a negative feedback input.

Figure 22A:
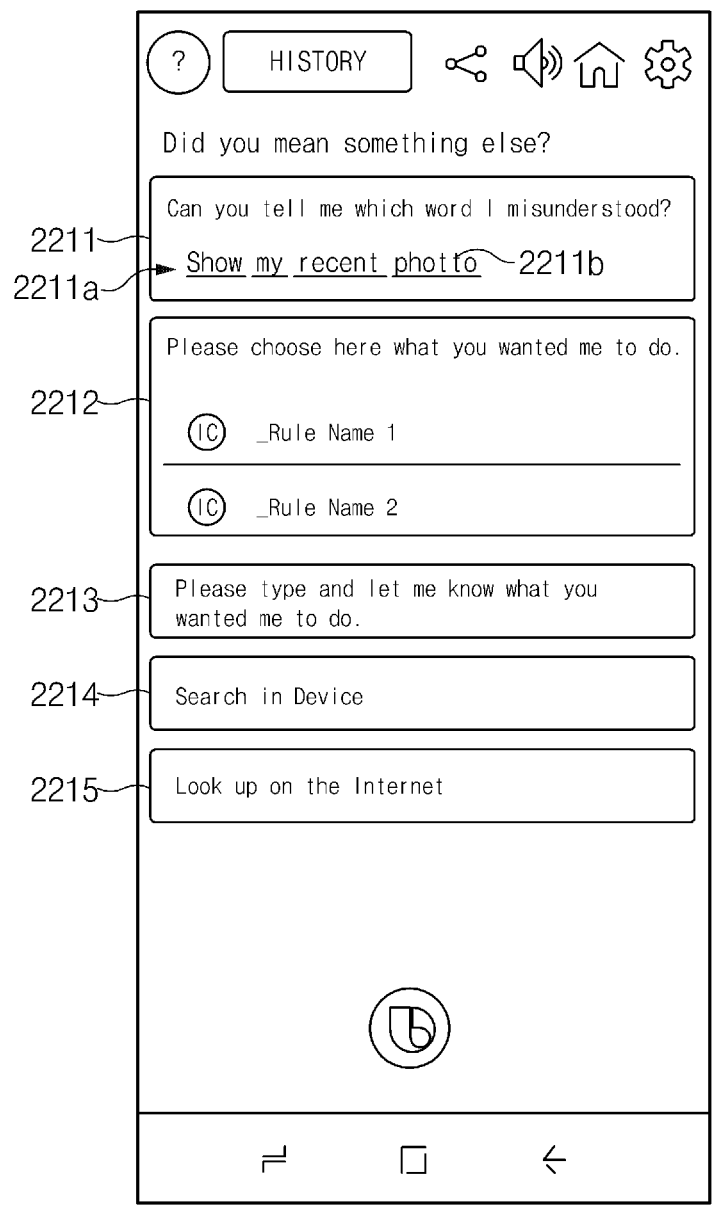
FIGS. 22A and 22B illustrate a screen in which a UI associated with a function provided by the electronic device is displayed in the case where negative feedback is received, according to an embodiment of the present disclosure.
Figure 22B:
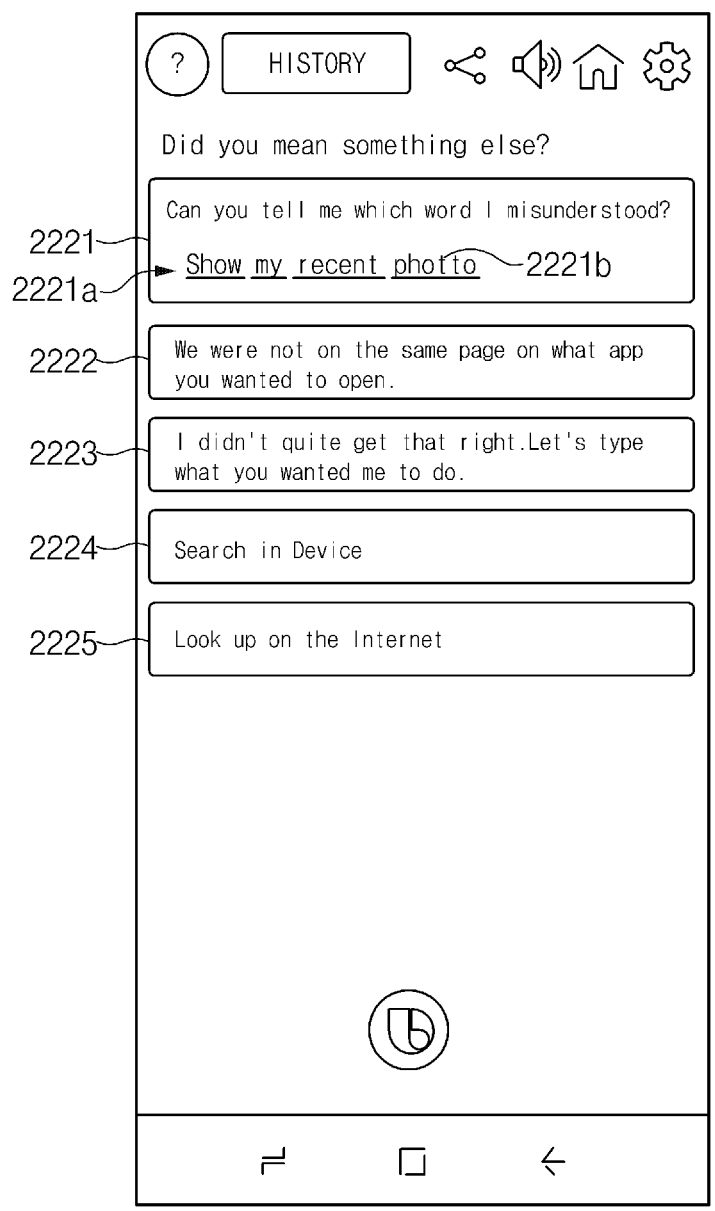

FIGS. 22A and 22B illustrate a screen in which a UI associated with a function provided by the electronic device 100 is displayed in the case where negative feedback is received, according to an embodiment of the present disclosure.

If a negative feedback input is received, the processor 150 may display a screen illustrated in FIG. 22A or 22B.

In the case where a task is a target of negative feedback and is a task of using a screen of an app other than an intelligence app, or in the case where a task is performed depending on a path rule, the processor 150 may display a screen, as illustrated in FIG. 22A. In the case where the task is the target of negative feedback and is a task of searching for a photo by using a gallery application, and the negative feedback input is received after the task is performed, the processor 150 may display the screen, as illustrated in FIG. 22A.

In the case where the task is the target of negative feedback and is a task of using only a screen of the intelligence app, or in the case where a task is not performed depending on the path rule, the processor 150 may display a screen, as illustrated in FIG. 22B. In the case where the task is the target of negative feedback and is a task of providing notification of weather or a task of providing a response according to a question, and the negative feedback input is received after the task is performed, the processor 150 may display the screen, as illustrated in FIG. 22B.

As illustrated in FIG. 22A, the processor 150 may display, on the display 120, a UI 2211 for revising a text corresponding to a misrecognized user utterance, a UI 2212 for selecting a path rule, a UI 2213 for searching for and choosing a path rule, a UI 2214 for performing a search in the electronic device 100, and a UI 2215 for performing a search on the Internet. The processor 150 may receive a user input for selecting one of the displayed UIs 2211, 2212, 2213, 2214, and 2215.

As illustrated in FIG. 22B, the processor 150 may display, on the display 120, a UI 2221 for revising a text corresponding to a misrecognized user utterance, a UI 2222 for feeding back the selection of a domain that is not suitable for user intent, a UI 2223 for searching for and choosing a path rule, a UI 2224 for performing a search in the electronic device 100, and a UI 2225 for performing a search on the Internet. The processor 150 may receive the user input for choosing one of the displayed UIs 2221, 2222, 2223, 2224, and 2225.

The UIs 2211 and 2221 for revising a text corresponding to the misrecognized user utterance may include the texts 2211*a* and 2221*a*, which are received from the intelligence server 200 and which are recognized by the intelligence server 200 from the user utterance. The UI 2212 for choosing the path rule may include a plurality of sample utterances respectively indicating path rules.

An action executed by the processor 150 if each UI is chosen will be described with reference to FIGS. 23A to 27.

Figure 23A:
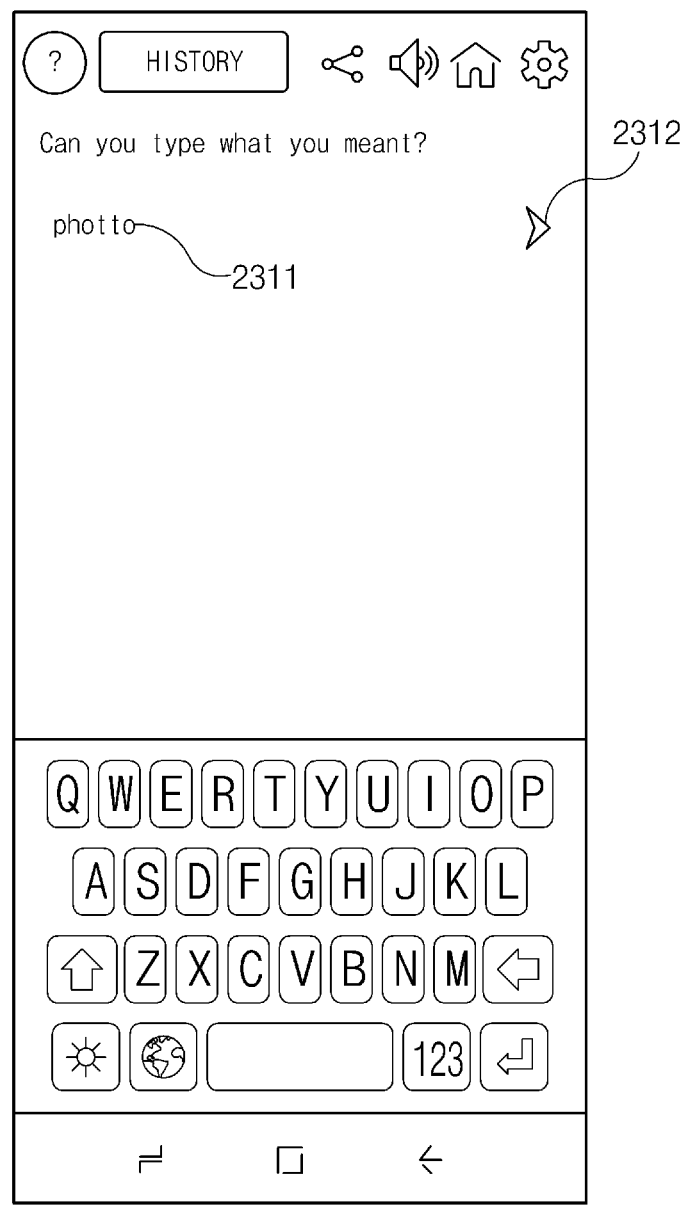
FIG. 23A illustrates a screen in which a revision target text is displayed, according to an embodiment of the present disclosure.
Figure 23B:
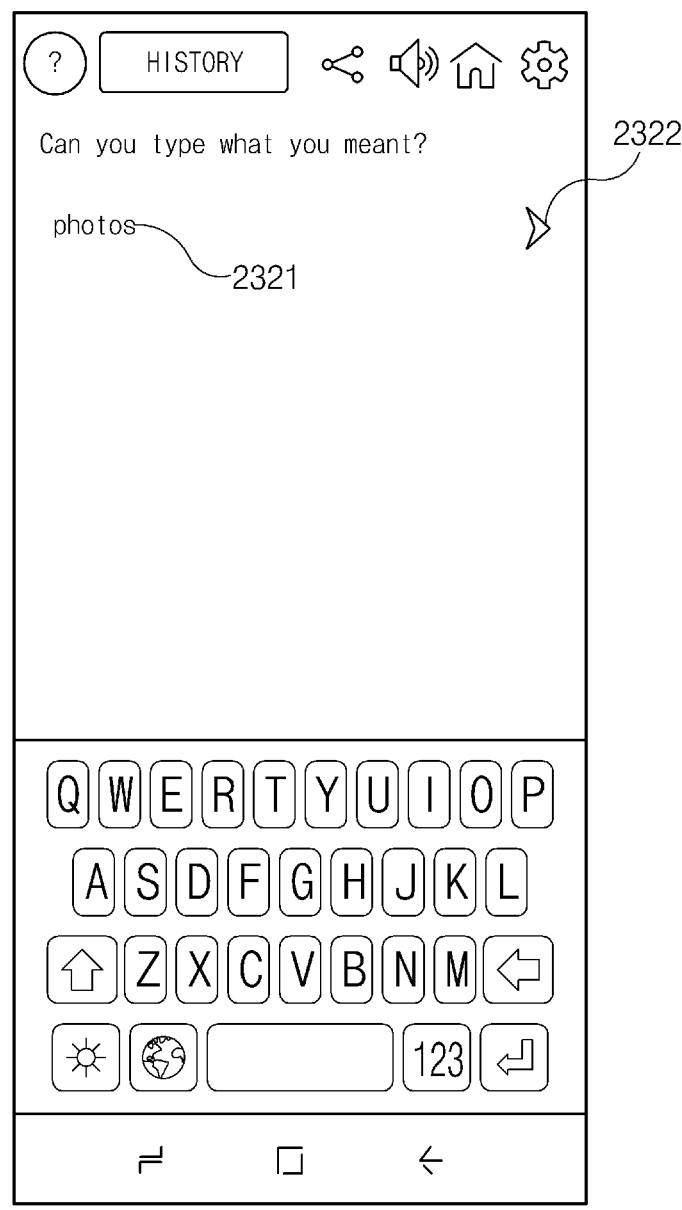
FIG. 23B illustrates a screen in which the revision target text is revised, according to an embodiment of the present disclosure.
Figure 23C:
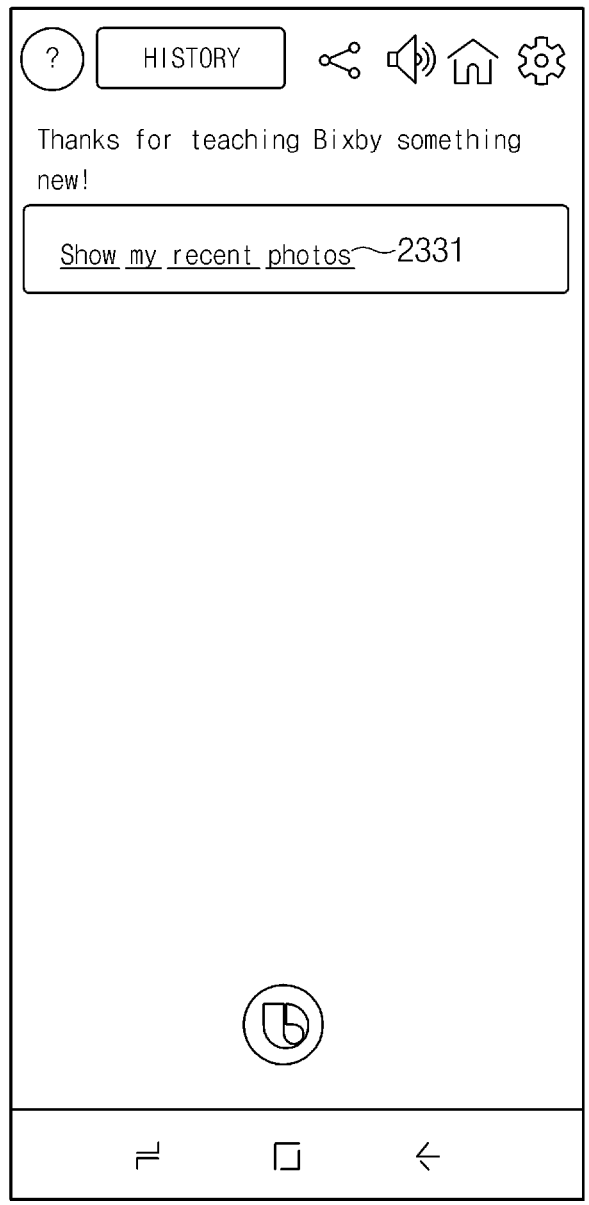
FIG. 23C illustrates a result screen in which a text corresponding to user utterance is revised, according to an embodiment of the present disclosure.
Figure 23D:
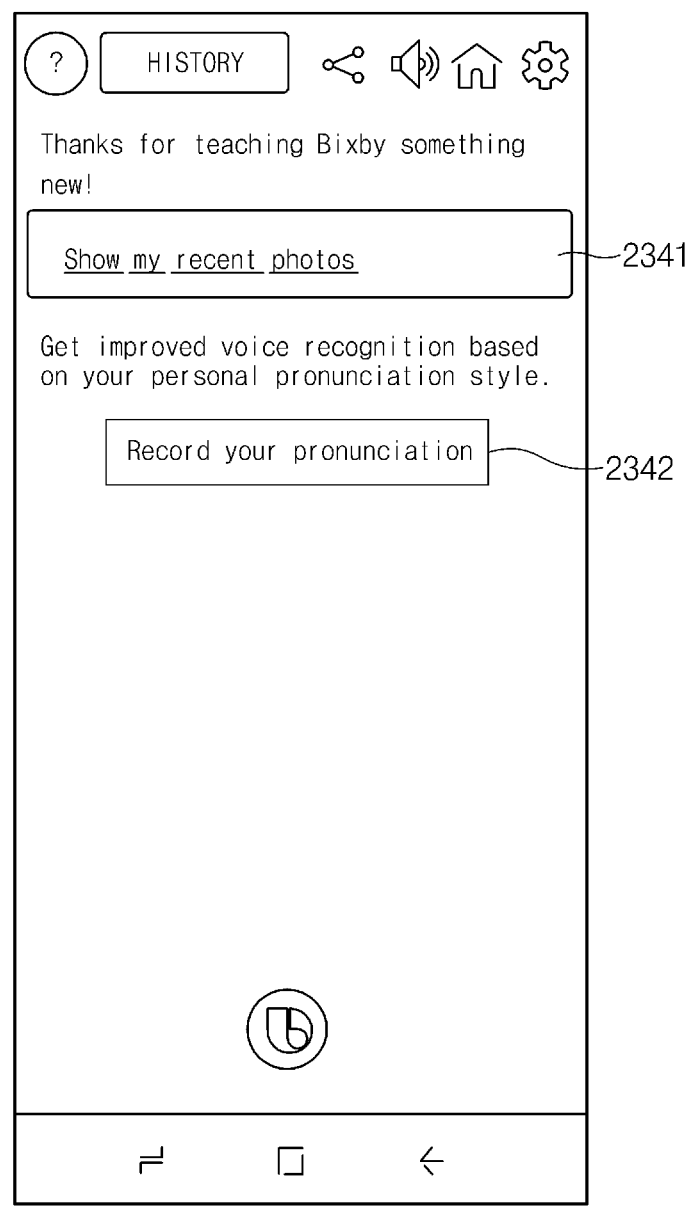
FIG. 23D illustrates a screen including a result in which the text corresponding to the user utterance is revised and a UI for updating a voice model corresponding to the revised text is displayed, according to an embodiment of the present disclosure.
Figure 23E:
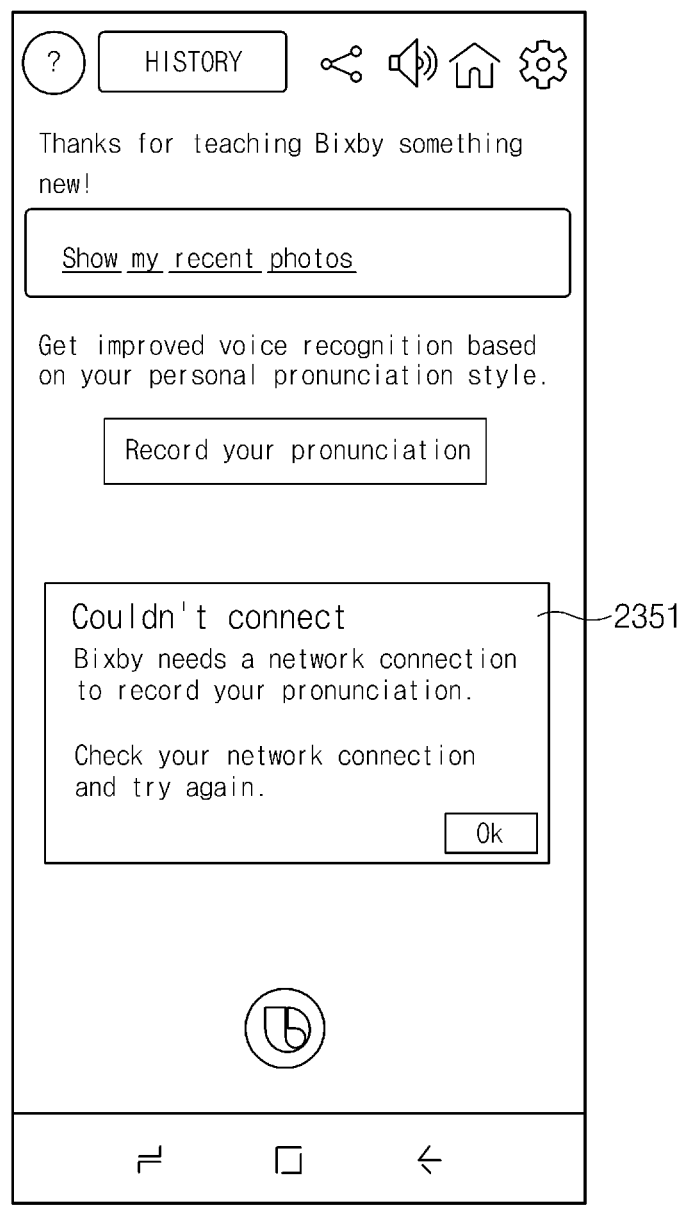
FIG. 23E illustrates a screen including a pop-up box according to a network connection failure, according to an embodiment of the present disclosure.

FIG. 23A is a screen in which a revision target text is displayed, according to an embodiment of the present disclosure. FIG. 23B is a screen in which the revision target text is revised, according to an embodiment of the present disclosure. FIG. 23C is a result screen in which a text corresponding to user utterance is revised, according to an embodiment of the present disclosure. FIG. 23D is a screen including a result in which the text corresponding to the user utterance is revised and a UI for updating a voice model corresponding to the revised text is displayed, according to an embodiment of the present disclosure. FIG. 23E is a screen including a pop-up box according to a network connection failure, according to an embodiment of the present disclosure.

The processor 150 may receive a user input for selecting a part of the texts 2211*b* and 2221*b*, illustrated in FIGS. 22A and 22B, which are received from the intelligence server 200 and the user utterance. The processor 150 may assign the selected part of texts 2211*b* and 2221*b* to a revision target text in response to the reception of the user input. For example, the processor 150 may receive a user input for selecting "photto" among "Show my recent photto" of FIG. 22A or 22B. The processor 150 may assign "photto" to the revision target text.

As illustrated in FIG. 23A, the processor 150 may display a revision target text 2311 and a revision completion object 2312. The revision target text 2311 may be revised to a text 2321 after revision illustrated in FIG. 23B, by an input through a virtual keyboard. For example, "photto" 2311, as illustrated in FIG. 23A, may be revised to "photos" 2321 illustrated in FIG. 23B

After the revision target text 2311 is revised, the processor 150 may receive a user input for selecting a revision completion object 2322. After the user input for selecting the revision completion object 2322 is received, the processor 150 may display a screen illustrated in FIG. 23C or 23D in the display 120.

After the user input for selecting the revision completion object 2322 is received, in the case where the language settings of an intelligence app is different from the language settings of the electronic device 100 or there is a history in which user utterance corresponding to the recognized text, such as "Show my recent photto", is received through the microphone 111, as illustrated in FIG. 23C, the processor 150 may display a screen indicating a result 2331 in which the text corresponding to the user utterance is revised.

The processor 150 may transmit data, such as revised text data, associated with the revised result to the intelligence server 200 through a wireless communication circuit. The data associated with the revised result transmitted to the intelligence server 200 may be stored in the ASR DB 211 of the intelligence server 200.

The data associated with the revised result stored in the ASR DB 211 may be used when the ASR 210 changes the user utterance to text data. The ASR 210 of the intelligence server 200 may apply a weight value to the revised text to change the user utterance to the text data. As the number of revisions of the text increases, the weight value applied to the text may increase, thereby improving the accuracy of automatic speech recognition.

After the user input for selecting the revision completion object 2322 is received, in the case where the language settings of an intelligence app is the same as the language settings of the electronic device 100 or there is no history in which a user utterance corresponding to the recognized text is received through the microphone 111, as illustrated in FIG. 23D, the processor 150 may display a screen including a result 2341, in which the text corresponding to the user utterance is revised, and a UI 2342 for updating a voice model corresponding to the revised text.

If a user input for selecting the UI 2342 for updating the voice model corresponding to the revised text is received, the processor 150 may receive additional user utterance corresponding to the recognized text through the microphone 111.

The processor 150 may transmit data, such as a voice signal, associated with the additional user utterance received through the microphone 111, to the intelligence server 200 through the wireless communication circuit. The data associated with the additional user utterance transmitted to the intelligence server 200 may be stored in the ASR DB 211 of the intelligence server 200 and may be used when the ASR 210 changes the user utterance to text data.

When the electronic device 100 needs to connect with a network, the processor 150 transmits the data associated with the additional user utterance to the intelligence server 200. In the case where the user input for selecting the UI 2342 for updating the voice model corresponding to the revised text is received, and the electronic device 100 does not connect with the network, as illustrated in FIG. 23E, the processor 150 may display, in the display 120, a message 2351 saying that there is a need for network connection.

The processor 150 may receive a user input for selecting one of a plurality of sample utterances that the UI 2212 for selecting the path rule illustrated in FIG. 22A includes. The processor 150 may perform a path rule associated with the selected sample utterance in response to the reception of the user input. The description thereof is the same as the description given with reference to FIGS. 8 and 14A to 14D.

Figure 24A:
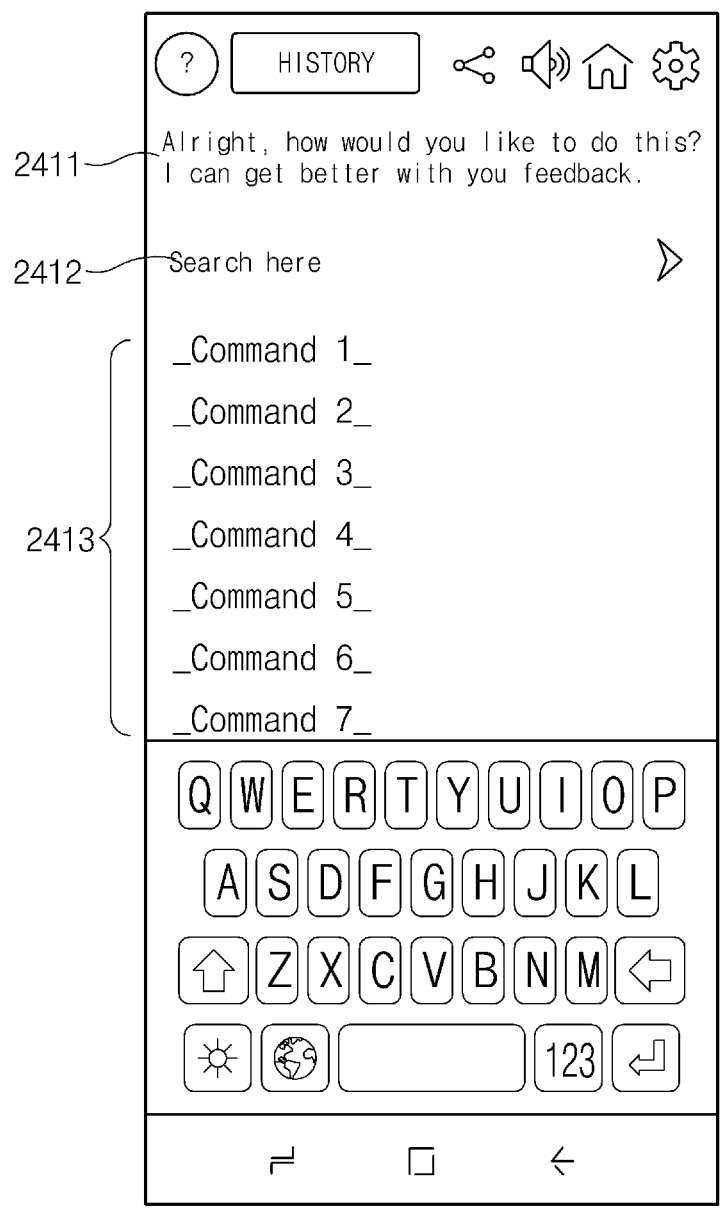
FIG. 24A illustrates a screen for searching for a path rule, according to an embodiment of the present disclosure.
Figure 24B:
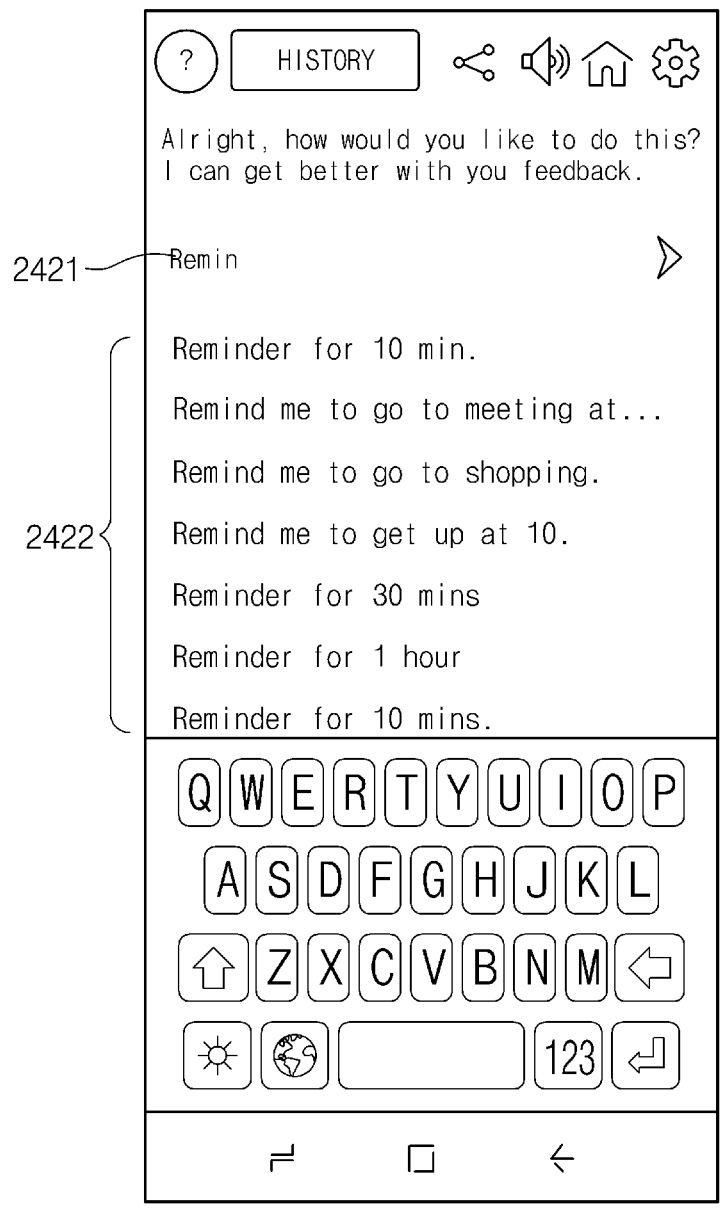
FIG. 24B illustrates a result screen of a path rule according to the entering of a search word, according to an embodiment of the present disclosure.
Figure 24C:
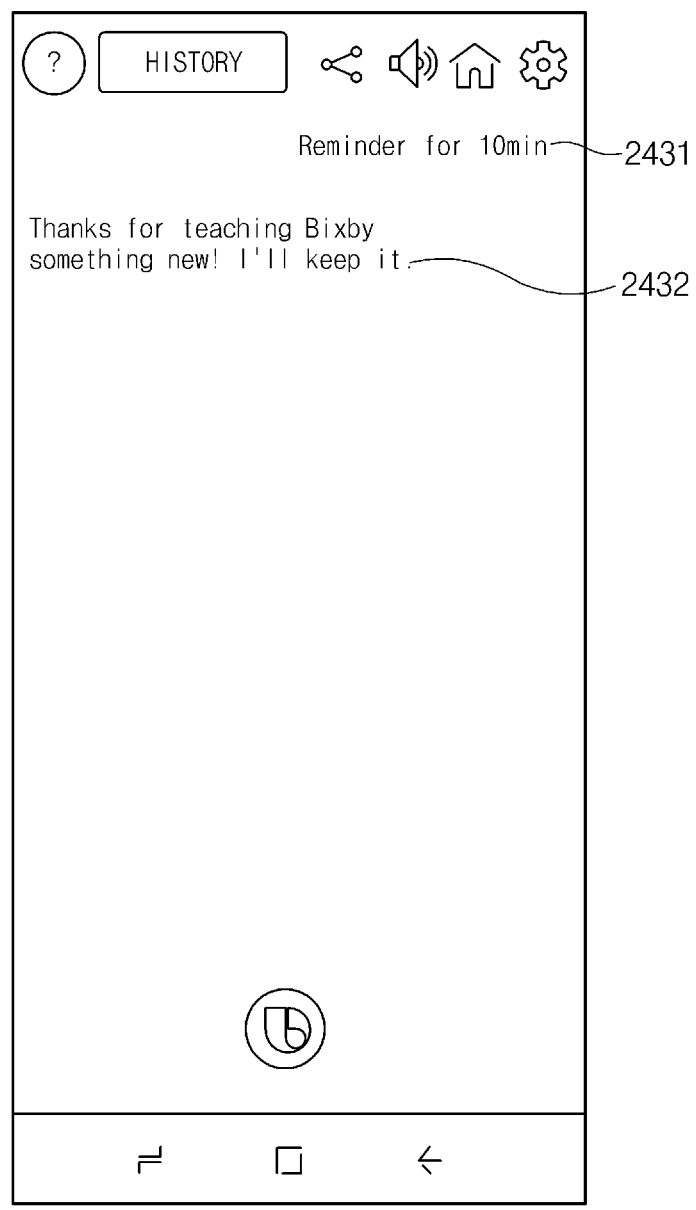
FIG. 24C illustrates a screen after the path rule is selected, according to an embodiment of the present disclosure.

FIG. 24A is a screen for searching for a path rule, according to an embodiment of the present disclosure. FIG. 24B is a result screen of a path rule according to the entering of a search word, according to an embodiment of the present disclosure. FIG. 24C is a screen after the path rule is selected, according to an embodiment of the present disclosure.

The processor 150 may receive a user input for selecting the UIs 2213 and 2223 in which the path rule illustrated in FIGS. 22A and 22B is found and selected. As illustrated in FIG. 24A, the processor 150 may display, in the display 120, a screen for searching for a path rule, in response to the reception of the user input. The screen for searching for the path rule may include a message 2411 for guiding a user to search for and select the path rule, a search box 2412 in which the user input is displayed, and a command sentence list 2413 indicating the path rule.

The processor 150 may receive an input through a virtual keyboard, may display an entered text 2421 in a search box, and may display a command sentence list 2422 including the entered text. The processor 150 may receive a user input for selecting one of command letters included in the displayed command sentence list. For example, the processor 150 may receive a text input of "Remin", may display "Remin" 2421 entered as illustrated in FIG. 24B in a search box, and may display the command sentence list 2422 including "Remin". The processor 150 may receive a user input for selecting a command sentence of "Reminder for 10 min".

If the user input for selecting the command sentence is received, the processor 150 may display a result screen indicating the selected command sentence in the display 120. As illustrated in FIG. 24C, the result screen may include "Reminder for 10 min" 2431 being the selected command sentence and a guide message 2432.

The processor 150 may transmit data associated with the selected command sentence, such as path rule information corresponding to the selected command sentence, to the intelligence server 200. The intelligence server 200 may store the data associated with the command sentence and may generate a path rule by using the data associated with the stored command sentence. In the case where the intelligence server 200 receives data, such as a voice signal, associated with the user utterance recognized as "Show my recent photto" from the electronic device 100, the intelligence server 200 may generate a path rule corresponding to "Reminder for 10 min" by using the data associated with the stored command sentence.

Figure 25:
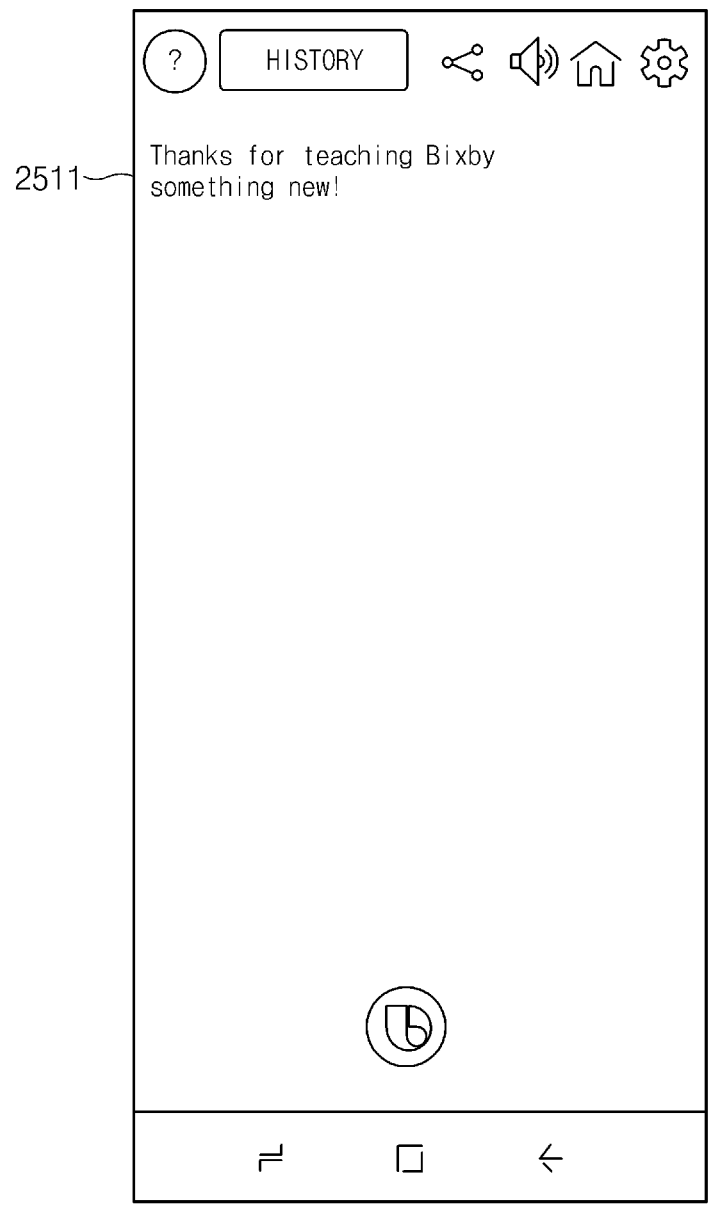
FIG. 25 illustrates a screen after the selection of a UI for feeding back the selection of a domain not suitable for user intent, according to an embodiment of the present disclosure.

FIG. 25 illustrates a screen after the selection of a UI for feeding back the selection of a domain not suitable for user intent, according to an embodiment of the present disclosure.

The domain, or an application, that the intelligence server 200 selects may not be suitable for the user intent. For example, the application that the intelligence server 200 selects may be an "Internet application", but the application suitable for the user intent may be a "gallery application".

The processor 150 may receive a user input for selecting the UI 2222 illustrated in FIG. 22B, for feeding back the selection of a domain not suitable for user intent. As illustrated in FIG. 25, the processor 150 may receive a message 2511, in response to the user input, saying that a feedback input for providing notification that an unsuitable domain for the user intent is selected. The processor 150 may further display a message, such as "this is not a request to use this app", indicating that a wrong application is selected.

The processor 150 may transmit, to the intelligence sever 200, data associated with the user input for providing notification that the unsuitable domain for the user intent is selected. The intelligence server 200 may use the received data, thereby improving the accuracy of domain determination.

Figure 26:
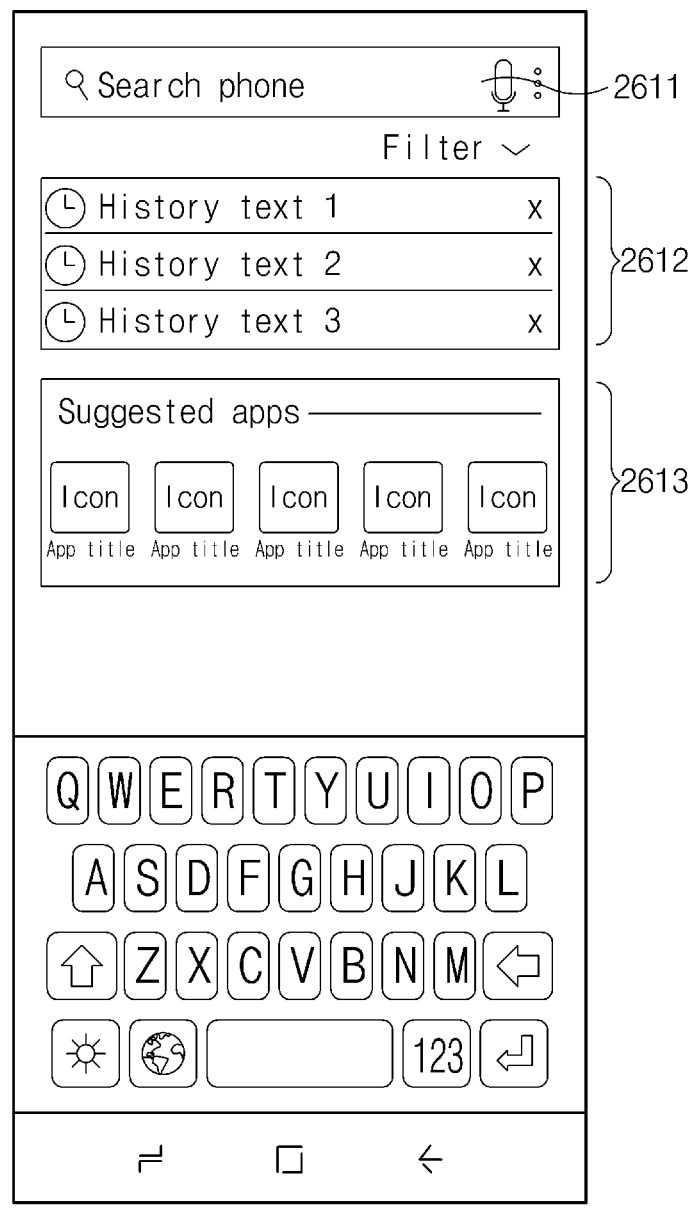
FIG. 26 illustrates a screen for performing a search in an electronic device, according to an embodiment of the present disclosure.

FIG. 26 illustrates a screen for performing a search in an electronic device, according to an embodiment of the present disclosure.

The processor 150 may receive a user input for selecting the UIs 2214 and 2224, which are illustrated in FIGS. 22A and 22B. The user input may also be for performing a search in the electronic device 100. As illustrated in FIG. 26, the processor 150 may display, in the display 120, the screen for performing the search in the electronic device 100 in response to the reception of the user input. The screen for performing the search in the electronic device 100 may include a search box 2611 in which a user input is displayed, a search history list 2612, and a suggested application list 2613. The search box 2611 may be an area in which an input received through a virtual keyboard or the like is displayed, and the search history list 2612 may include search histories, and the suggested application list 2613 may include the applications selected based on at least one of user information or the user input.

The processor 150 may receive an input through the virtual keyboard, may display the entered text in a search box, and may search for an action that the electronic device 100 or the installed application executes, by using the entered text as a search word.

The processor 150 may use a part of a text corresponding to the user utterance as the search word. For example, the processor 150 may display "recent photto" of "Show my recent photto" in the search box 2611, and the processor 150 may perform a search by using the search word itself displayed in the search box 2611 or may perform a search by using a search word revised by the user input.

Figure 27:
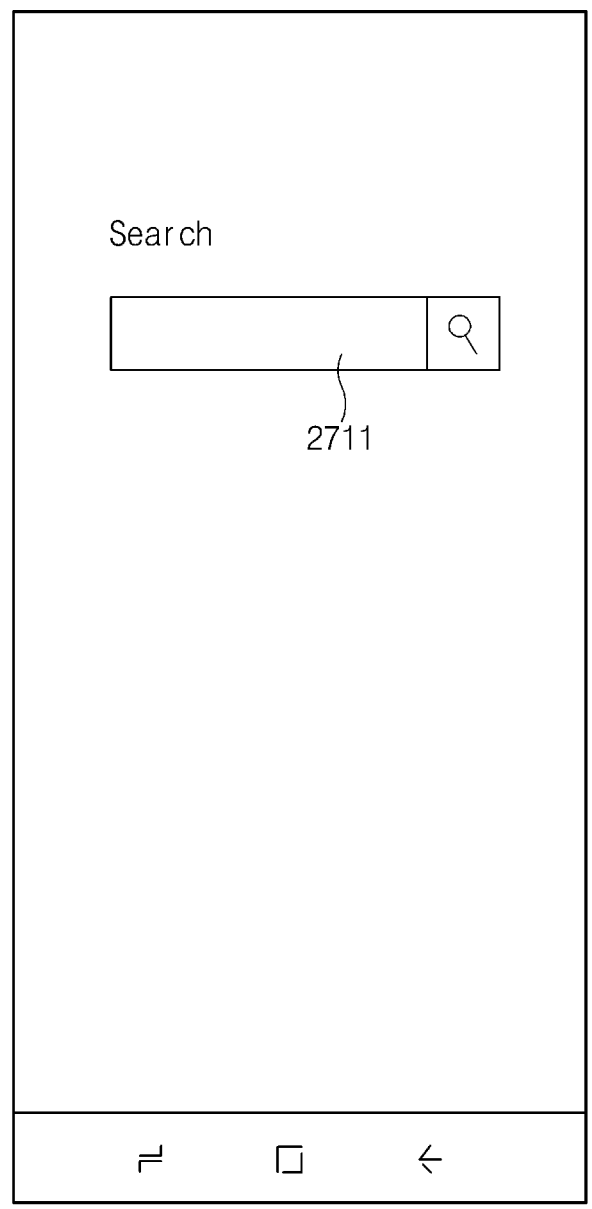
FIG. 27 illustrates a screen for performing a search on the Internet, according to an embodiment of the present disclosure.

FIG. 27 illustrates a screen for performing a search on an Internet, according to an embodiment of the present disclosure.

The processor 150 may receive a user input for selecting the UIs 2215 and 2225, which are illustrated in FIGS. 22A and 22B, for performing a search on the Internet. As illustrated in FIG. 27, the processor 150 may display the screen for performing the search in the electronic device 100, in the display 120 in response to the reception of the user input. The screen for performing the search in the electronic device 100 may include a search box 2711 in which a user input is displayed.

The processor 150 may receive an input through a virtual keyboard or the like, may display the entered text in the search box 2711, and may perform the search on the Internet by using the entered text as a search word.

The processor 150 may use a part of a text corresponding to the user utterance as the search word. The processor 150 may display "recent photto" of "Show my recent photto" in the search box, and the processor 150 may perform a search by using the search word itself displayed in the search box or may perform a search by using a search word revised by the user input.

Figure 28:
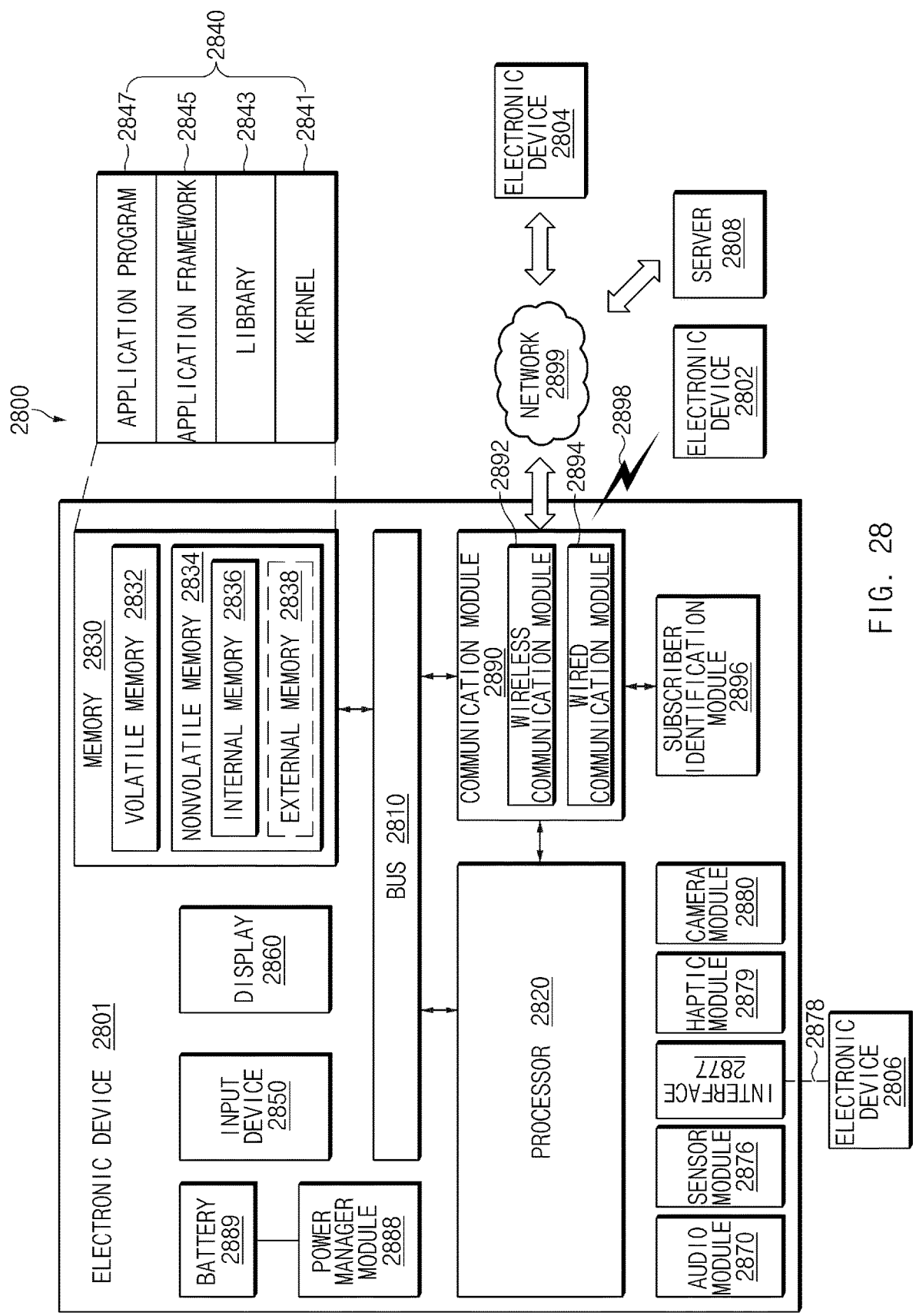
FIG. 28 is a block diagram of an electronic device in a network environment, according to various embodiments of the present disclosure.

FIG. 28 illustrates an electronic device 2801 in a network environment 2800. The electronic device 2801 may include a portable communication device (e.g., a smartphone), a computer device (e.g., a personal digital assistant (PDA), a tablet personal computers (PC), a laptop PC, a desktop PC, a workstation, or a server), a portable multimedia device (PMP) (e.g., an e-book reader or an MP3 player), a portable medical device (e.g., a heart rate, blood glucose, blood pressure, or a thermometer), a camera, or a wearable device. A wearable device may include an accessory type device (e.g., a timepiece, a ring, a bracelet, an anklet, a necklace, glasses, a contact lens, or a head-mounted device (HMD)), a one-piece fabric, electronic clothes, a skin pad, a tattoo, or a bio-implantable circuit.

The electronic device may include televisions (TVs), digital versatile disc (DVD) players, an audio device, an audio accessory device (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

The electronic device may include a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or an Internet of things (IoT) device (e.g., a light bulb, a sprinkler device, a fire alarm, a thermostat, or a street lamp).

The electronic device is not limited to the above-described devices. For example, similarly to a smartphone having a function of measuring personal bio-information (e.g., a heart rate or blood glucose level), the electronic device may provide functions of multiple devices. In the present disclosure, the term "user" may refer to a person who uses the electronic device or may refer to a device, such as an artificial intelligence electronic device, that uses the electronic device.

Referring to FIG. 28, under the network environment 2800, the electronic device 2801 may communicate with an electronic device 2802 through local wireless communication 2898 or may communicate with an electronic device 2804 or an intelligence server 2808 through a network 2899. The electronic device 2801 may communicate with the electronic device 2804 through the server 2808.

The electronic device 2801 may include a bus 2810, a processor 2820, a memory 2830, an input device 2850 (e.g., a microphone or a mouse), a display 2860, an audio module 2870, a sensor module 2876, an interface 2877, a haptic module 2879, a camera module 2880, a power management module 2888, a battery 2889, a communication module 2890, and a subscriber identification module (SIM) 2896. The electronic device 2801 may not include at least one of the above-described elements or may further include other element(s).

The bus 2810 may interconnect the above-described elements 2820 to 2890 and may include a circuit for conveying signals, such as a control message or data, between the above-described elements.

The processor 2820 may include a CPU, an AP, a graphic processing unit (GPU), an image signal processor (ISP) of a camera or a communication processor (CP). The processor 2820 may be implemented with a system on chip (SoC) or a system in package (SiP). The processor 2820 may drive an operating system (OS), or application, to control at least one other element, such as hardware or software element, connected to the processor 2820, and may process and compute various data. The processor 2820 may load an instruction, or data, received from another element, such as the communication module 2890, into the volatile memory 2832 to process the instruction, or data, and store the process result into the nonvolatile memory 2834.

The memory 2830 may include the volatile memory 2832 or the nonvolatile memory 2834. The volatile memory 2832 may include a random access memory (RAM) (e.g., a dynamic random access memory (DRAM), a static RAM (SRAM), or a synchronous DRAM (SDRAM)). The nonvolatile memory 2834 may include a programmable read-only memory (PROM), a one time programmable read-only memory (OTPROM), an erasable programmable read-only memory (EPROM), an electrically erasable programmable read-only memory (EEPROM), a mask ROM, a flash ROM, a flash memory, a hard disk drive, or a solid-state drive (SSD). The nonvolatile memory 2834 may be configured in the form of an internal memory 2836 or the form of an external memory 2838 available according to the connection with the electronic device 2801. The external memory 2838 may further include a flash drive such as compact flash (CF), secure digital (SD), micro secure digital (Micro-SD), mini secure digital (Mini-SD), extreme digital (xD), a multimedia card (MMC), or a memory stick. The external memory 2838 may be operatively or physically be connected with the electronic device 2801 in a wired manner (e.g., by a cable or a universal serial bus (USB)) or in a wireless (e.g., Bluetooth) manner.

The memory 2830 may store at least one different software element, such as an instruction or data associated with the program 2840, of the electronic device 2801. The program 2840 may include a kernel 2841, a library 2843, an application framework 2845 or an application program (an application) 2847.

The input device 2850 may include a microphone, a mouse, a physically connected keyboard, or a keyboard that is virtually displayed through the display 2860.

The display 2860 may include a display, a hologram device or a projector, and a control circuit to control a relevant device. The screen may include a liquid crystal display (LCD), a light emitting diode (LED) display, an organic LED (OLED) display, a microelectromechanical systems (MEMS) display, or an electronic paper display. The display may be flexibly, transparently, or wearably implemented. The display may include touch circuitry able to detect a user's input, such as a gesture input, a proximity input, a hovering input or a pressure sensor input (a force sensor input) able to measure the intensity of pressure by touch. The touch circuit, or the pressure sensor, may be implemented integrally with the display or may be implemented with at least one sensor separately from the display. The hologram device may show a stereoscopic image in a space using interference of light. The projector may project light onto a screen to display an image. The screen may be located inside or outside the electronic device 2801.

The audio module 2870 may convert a sound into an electrical signal, or an electrical signal into a sound. The audio module 2870 may acquire sound through the input device 2850, such as a microphone, or may output sound through an output device, such as a speaker or a receiver, included in the electronic device 2801, 2802, or 2806.

The sensor module 2876 may measure, or detect, an internal operating state, such as power or temperature, or an external environment state, such as an altitude, a humidity, or brightness, of the electronic device 2801 to generate an electrical signal or data value corresponding to the information of the measured state or detected state.

The sensor module 2876 may include a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, or an electrocardiogram (ECG) sensor), a temperature sensor, a humidity sensor, an illuminance sensor, or a UV sensor.

The sensor module 2876 may further include a control circuit for controlling at least one or more sensors included therein. The electronic device 2801 may control the sensor module 2876 by using the processor 2820 or a processor, such as a sensor hub, separate from the processor 2820. In the case that the separate processor is used while the processor 2820 is in a sleep state, the separate processor may operate without awakening the processor 2820 to control at least a portion of the operation or the state of the sensor module 2876.

The interface 2877 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multimedia card) interface, or an audio interface. A connector 2878 may physically connect the electronic device 2801 with the electronic device 2806. The connector 2878 may include a USB connector, an SD card/MMC connector, or an audio connector, such as a headphone connector.

The haptic module 2879 may convert an electrical signal into mechanical stimulation, such as vibration or motion, or into electrical stimulation. The haptic module 2879 may apply tactile or kinesthetic stimulation to a user and may include a motor, a piezoelectric element, or an electric stimulator.

The camera module 2880 may capture a still image and a moving picture. The camera module 2880 may include at least one lens, such as a wide-angle lens, a telephoto lens, a front lens or a rear lens, an image sensor, an image signal processor, or a flash, such as a light emitting diode or a xenon lamp.

The power management module 2888 manages the power of the electronic device 2801 and may constitute at least a portion of a power management integrated circuit (PMIC).

The battery 2889 may include a primary cell, a secondary cell, or a fuel cell, and may be recharged by an external power source to supply power to at least one element of the electronic device 2801.

The communication module 2890 may establish a communication channel between the electronic device 2801 and an external device, such as the first external electronic device 2802, the second external electronic device 2804, or the server 2808. The communication module 2890 may support wired communication or wireless communication through the established communication channel and may include a wireless communication module 2892 or a wired communication module 2894.

The communication module 2890 may communicate with the external device through a first network 2898 (e.g., a wireless local area network, such as Bluetooth or Infrared Data Association (IrDA)) or a second network 2899 (e.g., a wireless wide area network, such as a cellular network) through the wireless communication module 2892 or the wired communication module 2894.

The wireless communication module 2892 may support cellular communication, local wireless communication, GNSS communication. The cellular communication may include long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of a GPS, a global navigation satellite system (Glonass), Beidou navigation satellite system (Beidou), or a European global satellite-based navigation system (Galileo. In the present disclosure, "GPS" and "GNSS" may be interchangeably used.

When the wireless communication module 2892 supports cellular communication, the wireless communication module 2892 may identify or authenticate the electronic device 2801 within a communication network using the subscriber identification module 2896.

The wireless communication module 2892 may include a CP separate from the processor 2820, such as an AP. The communication processor may perform at least a portion of functions associated with at least one of elements 2810 to 2896 of the electronic device 2801 in substitute for the processor 2820 when the processor 2820 is in an inactive (sleep) state, and together with the processor 2820 when the processor 2820 is in an active state. The wireless communication module 2892 may include a plurality of communication modules, each supporting only a relevant communication scheme among cellular communication, short-range wireless communication, or a GNSS communication scheme.

The wired communication module 2894 may include a local area network (LAN) service, a power line communication, or a plain old telephone service (POTS).

The first network 2898 may employ Wi-Fi direct or Bluetooth for transmitting or receiving instructions or data through a wireless direct connection between the electronic device 2801 and the first external electronic device 2802. The second network 2899 may include a telecommunication network (e.g., a computer network, such as a LAN or a WAN, the Internet or a telephone network) for transmitting or receiving instructions or data between the electronic device 2801 and the second electronic device 2804.

The instructions or the data may be transmitted or received between the electronic device 2801 and the second external electronic device 2804 through the server 2808 connected with the second network. Each of the external first and second electronic devices 2802 and 2804 may be a device which is different from or the same as that of the electronic device 2801. All or part of the operations that the electronic device 2801 performs may be executed by another or a plurality of electronic devices, such as the electronic devices 2802 and 2804 or the server 2808.

In the case that the electronic device 2801 executes any function or service automatically or in response to a request, the electronic device 2801 may not perform the function or the service internally, but may transmit requests for at least a part of a function associated with the electronic device 2801 to another device, such as the electronic device 2802 or 2804 or the server 2808. The other electronic device, such as the electronic device 2802 or 2804 or the server 2808, may execute the requested function or additional function and may transmit the execution result to the electronic device 2801. The electronic device 2801 may provide the requested function or service using the received result or may additionally process the received result to provide the requested function or service. To this end, for example, cloud computing, distributed computing, or client-server computing may be used.

According to an embodiment of the present disclosure, an electronic device includes a housing, a touchscreen display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, a processor positioned inside the housing and electrically connected with the touchscreen display, the microphone, the at least one speaker, and the wireless communication circuit, and a memory positioned inside the housing and electrically connected with the processor. The memory may store instructions that cause the processor, in a first instance, to receive a first user utterance through the microphone including a first request for performing a first task with the electronic device, to transmit first data associated with the first user utterance to an external server through the wireless communication circuit, to receive a first response from the external server through the wireless communication circuit including information for performing the first task about a first sequence of states of the electronic device, and to perform the first task by causing the electronic device to follow the first sequence of states, and in a second instance, to receive a second user utterance through the microphone including a second request for performing a second task with the electronic device, to transmit second data associated with the second user utterance to the external server through the wireless communication circuit, to receive a second response from the external server through the wireless communication circuit including one or more sample utterances representative of an intent of the user utterance and the one or more sample utterances being selected by the external server based on the second user utterance, to display the one or more sample utterances on the touchscreen display, to receive a first user input for selecting one of the sample utterances through the microphone or the touchscreen display, and to perform the second task by causing the electronic device to follow a second sequence of states associated with the selected one of the sample utterances.

The one or more sample utterances may include a first sample utterance representative of a first intent and a second sample utterance representative of a second intent different from the first intent.

The instructions may further cause the processor to display one or more images associated with the one or more sample utterances on the touchscreen display.

The one or more images may indicate the second states.

The instructions may cause the processor to determine an order for displaying the one or more sample utterances and to display the one or more sample utterances depending on the determined order.

The second response may further include values corresponding to the one or more sample utterances. The instructions may cause the processor to determine the order for displaying the one or more sample utterances in order of magnitude of the values.

The instructions may cause the processor to display a sample utterance, which corresponds to a first order among the one or more sample utterances, to be visually different from the remaining sample utterances.

The instructions may cause the processor to display information on the second sequence of states associated with the selected sample utterance in response to a reception of the first user input, to receive a second user input for selecting the selected sample utterance again, and to perform the second task in response to a reception of the second user input.

The displayed information may include at least one of an action of the second sequence of states or an utterance making it possible to perform the second task.

According to an embodiment of the disclosure, an electronic device includes a housing, a touchscreen display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, a processor positioned inside the housing and electrically connected with the touchscreen display, the microphone, the at least one speaker, and the wireless communication circuit, and a memory positioned inside the housing and electrically connected with the processor. The memory may store instructions that, when executed, cause the processor to receive a user utterance through the microphone including a request for performing a task with the electronic device, to transmit data associated with the user utterance to an external server through the wireless communication circuit, to receive a response from the external server through the wireless communication circuit including a plurality of sample utterances and the plurality of sample utterances includes a first sample utterance corresponding to a first path rule and a second sample utterance corresponding to a second path rule, and the first path rule and the second path rule are generated by the external server based on the data associated with the user utterance, to display the plurality of sample utterances on the touchscreen display, to receive a first user input for selecting one of the plurality of sample utterances through the microphone or the touchscreen display, and to perform the task by causing the electronic device to follow a sequence of states associated with the selected one of the plurality of sample utterances.

The instructions may cause the processor to display one or more images associated with the plurality of sample utterances on the touchscreen display.

The one or more images may indicate the states.

The instructions may cause the processor to determine an order for displaying the plurality of sample utterances and to display the plurality of sample utterances depending on the determined order.

The response may further include values corresponding to the plurality of sample utterances. The instructions may cause the processor to determine the order for displaying the plurality of sample utterances in order of magnitude of the values.

The instructions may cause the processor to display a sample utterance, which corresponds to a first order, from among the plurality of sample utterances to be visually different from the remaining sample utterances.

The instructions may cause the processor to display information on the sequence of the states associated with the selected sample utterance in response to a reception of the first user input, to receive a second user input for selecting the selected sample utterance again, and to perform a task in response to a reception of the second user input.

The displayed information may include at least one of an action of the sequence of the states or an utterance making it possible to perform the task.

According to an embodiment of the disclosure, a computer-readable storage medium storing instructions, when executed by a processor of an electronic device, cause the electronic device to receive a user utterance, the user utterance including a request for performing a task with the electronic device, to transmit data associated with the user utterance to an external server, to receive a response from the external server, the response including one or more sample utterances representative of an intent of the user utterance and the one or more sample utterances are selected by the external server based on the user utterance, to display the one or more sample utterances, to receive a first user input for selecting one of the one or more sample utterances, and to perform the task by causing the electronic device to follow a sequence of states associated with the selected one of the one or more sample utterances.

The one or more sample utterances may include a first sample utterance representative of a first intent and a second sample utterance representative of a second intent different from the first intent.

When executed by the processor of the electronic device, the instructions may cause the electronic device to further display one or more images associated with the one or more sample utterances.

The term "module" used herein may include a unit implemented with hardware, software, or firmware. For example, the term "module" may be interchangeably used with the terms "logic", "logic block", "component", and "circuit". The "module" may be an integrated component, a minimum unit for performing one or more functions, or a part thereof. The "module" may be implemented mechanically or electronically and may include a well-known or to-be-developed application-specific integrated circuit (ASIC) chip, field-programmable gate arrays (FPGAs), or programmable logic device that performs operations.

According to various embodiments of the present disclosure, at least a part of an apparatus, such as modules or functions thereof, or a method, such as operations or steps, may be, for example, implemented by instructions stored in a computer-readable storage media, such as the memory 2830, in the form of a program module. The instruction, when executed by a processor, such as processor 2820, may cause the processor to perform a function corresponding to the instruction. The computer-readable recording medium may include a hard disk, a floppy disk, a magnetic media such as a magnetic tape, an optical media such as a CD-ROM or a DVD, a magneto-optical media such as a floptical disk, or an embedded memory. The instruction may include codes created by a compiler or codes that are capable of being executed by a computer by using an interpreter.

Each element, such as a module or a program module, may be composed of a single entity or a plurality of entities, and a part of the above-described sub-elements may be omitted or may further include other elements. After being integrated in one entity, some elements, such as a module or a program module, may identically or similarly perform the function executed by each corresponding element before integration. Operations executed by modules, program modules, or other elements may be executed by a successive method, a parallel method, a repeated method, or a heuristic method. Alternatively, at least some of the operations may be executed in another order or may be omitted, or any other operation may be added.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:
1. An electronic device comprising:
a touchscreen display;
a microphone;
at least one speaker;
a wireless communication circuit;
a processor electrically connected to the touchscreen display, the microphone, the at least one speaker, and the wireless communication circuit; and
a memory electrically connected to the processor, wherein the memory stores instructions that, when executed, cause the processor to:

receive natural-language input, wherein the natural-language input includes a request for performing a task with the electronic device;
display sample utterances associated with the natural-language input so that a display size of each of the sample utterances corresponds to a confidence level of each of the sample utterances, on the touchscreen display;
display a plurality of images with each of the sample utterances on the touchscreen display with the sample utterances;
receive a first user input via the microphone or the touchscreen display;
if the first user input is a selection indicating none of the sample utterances, display the natural-language input for selecting and revising a portion that is not suitable for a user intent among the natural-language input; and
if the first user input is a selection of one of the sample utterances, display a representative utterance for immediately performing a path rule corresponding to the selected sample utterance, and perform the task by causing the electronic device to follow a sequence of states associated with the selected one of the sample utterances,
wherein each image of the plurality of images represents a state in the sequence of states that is followed to perform the task after the sample utterance is selected.

2. The electronic device of claim 1, wherein the sample utterances include a sample utterance representative of an intent.

3. The electronic device of claim 1, wherein the instructions further cause the processor to:
determine an order for displaying the sample utterances; and
display the sample utterances depending on the determined order.

4. The electronic device of claim 3, wherein the instructions further cause the processor to:
display a sample utterance, which corresponds to a first order from among the sample utterances, to be visually different from the remaining sample utterances.

5. The electronic device of claim 1, wherein the instructions further cause the processor to:
display information on the sequence of states associated with the selected sample utterance in response to a reception of the first user input;
receive a second user input for selecting the selected sample utterance again; and
perform the task in response to a reception of the second user input.

6. The electronic device of claim 5, wherein the displayed information includes at least one of an action of the sequence of states or an utterance making it possible to perform the task.

7. A non-transitory computer-readable storage medium storing instructions that, when executed by a processor of an electronic device, cause the electronic device to:
receive a natural-language input, wherein the natural-language input includes a request for performing a task with the electronic device;
display sample utterances associated with the natural-language input so that a display size of each of the sample utterances corresponds to a confidence level of each of the sample utterances;
display a plurality of images with each of the sample utterances on the touchscreen display with the sample utterances;
receive a first user input;
if the first user input is a selection indicating none of the sample utterances, display the natural-language input for selecting and revising a portion that is not suitable for a user intent among the natural-language input; and
if the first user input is a selection of one of the sample utterances, display a representative utterance for immediately performing a path rule corresponding to the selected sample utterance, and perform the task by causing the electronic device to follow a sequence of states associated with the selected one of the sample utterances,
wherein each image of the plurality of images represents a state in the sequence of states that is followed to perform the task after the sample utterance is selected.

8. The non-transitory computer-readable storage medium of claim 7, wherein the sample utterances include a first sample utterance representative of a first intent and a second sample utterance representative of a second intent different from the first intent.

* * * * *